United States Patent
Shimazaki et al.

(10) Patent No.: US 8,315,503 B2
(45) Date of Patent: Nov. 20, 2012

(54) LINK INFORMATION GENERATION APPARATUS, PICTURE RECORDING APPARATUS, PICTURE REPRODUCTION APPARATUS, RECORDING MEDIUM, LINK INFORMATION GENERATION METHOD, PICTURE RECORDING METHOD, PICTURE REPRODUCTION METHOD, PROGRAM, AND INTEGRATED CIRCUIT

(75) Inventors: Hiroaki Shimazaki, Osaka (JP); Kenjiro Tsuda, Osaka (JP); Tatsuro Juri, Osaka (JP); Katsuo Saigo, Hyogo (JP); Takashi Masuno, Osaka (JP); Yuki Kobayashi, Osaka (JP); Takuma Chiba, Osaka (JP); Yukinaga Seki, Kyoto (JP)

(73) Assignee: Panasonic Corporation, Osaka (JP)

( * ) Notice: Subject to any disclaimer, the term of this patent is extended or adjusted under 35 U.S.C. 154(b) by 130 days.

(21) Appl. No.: 12/991,612

(22) PCT Filed: May 8, 2009

(86) PCT No.: PCT/JP2009/002025
§ 371 (c)(1),
(2), (4) Date: Nov. 8, 2010

(87) PCT Pub. No.: WO2009/136507
PCT Pub. Date: Nov. 12, 2009

(65) Prior Publication Data
US 2011/0055296 A1    Mar. 3, 2011

(30) Foreign Application Priority Data

May 9, 2008 (JP) ................................. 2008-123089

(51) Int. Cl.
*H04N 5/77* (2006.01)
*G06F 7/00* (2006.01)
*G06F 12/00* (2006.01)
*G06F 17/30* (2006.01)

(52) U.S. Cl. ......... 386/225; 707/793; 707/822; 707/913

(58) Field of Classification Search .................. 386/225; 707/793, 822, 913
See application file for complete search history.

(56) References Cited

U.S. PATENT DOCUMENTS
5,353,063 A * 10/1994 Yagisawa et al. .......... 348/426.1
(Continued)

FOREIGN PATENT DOCUMENTS
JP    2002-209181    *    7/2002
(Continued)

OTHER PUBLICATIONS

International Search Report issued Jun. 16, 2009 in International (PCT) Application No. PCT/JP2009/002025.

*Primary Examiner* — Greta Robinson
*Assistant Examiner* — Brian E. Weinrich
(74) *Attorney, Agent, or Firm* — Wenderoth, Lind & Ponack, L.L.P.

(57) ABSTRACT

A link information generation apparatus records a link information file on a recording medium on which a first folder holding a still picture file that includes still picture data and still picture imaging time information and a second folder holding one or more moving picture files each of which includes moving picture data are recorded at positions that are not in a containment relationship with each other. The link information generation apparatus includes: a moving picture specification unit (1131) that specifies a still-picture-linked moving picture imaged during a time period including a time shown by the still picture imaging time information of the still picture data; a position information obtainment unit (1132) that obtains still-picture-corresponding position information showing a position in the still-picture-linked moving picture corresponding to the still picture imaging time information; and a link information generation unit (1133) that generates link information including still picture identification information for identifying the still picture data, moving picture identification information for identifying the still-picture-linked moving picture, and the still-picture-corresponding position information, and records the link information file including the link information on the recording medium at a position not contained in any of the first and second folders.

4 Claims, 25 Drawing Sheets

U.S. PATENT DOCUMENTS

| | | | |
|---|---|---|---|
| 7,949,680 B2 * | 5/2011 | Yanagita et al. | 707/822 |
| 2003/0118327 A1 | 6/2003 | Um et al. | |
| 2003/0161614 A1 * | 8/2003 | Yanagihara et al. | 386/95 |
| 2003/0212703 A1 * | 11/2003 | Yoshioka | 707/102 |
| 2006/0159429 A1 * | 7/2006 | Sugahara et al. | 386/225 |

FOREIGN PATENT DOCUMENTS

| | | |
|---|---|---|
| JP | 2003-233952 | 8/2003 |
| JP | 2005-260662 | 9/2005 |
| JP | 2006-222930 | 8/2006 |
| JP | 2007-104584 | 4/2007 |
| JP | 2007-181164 | 7/2007 |

* cited by examiner

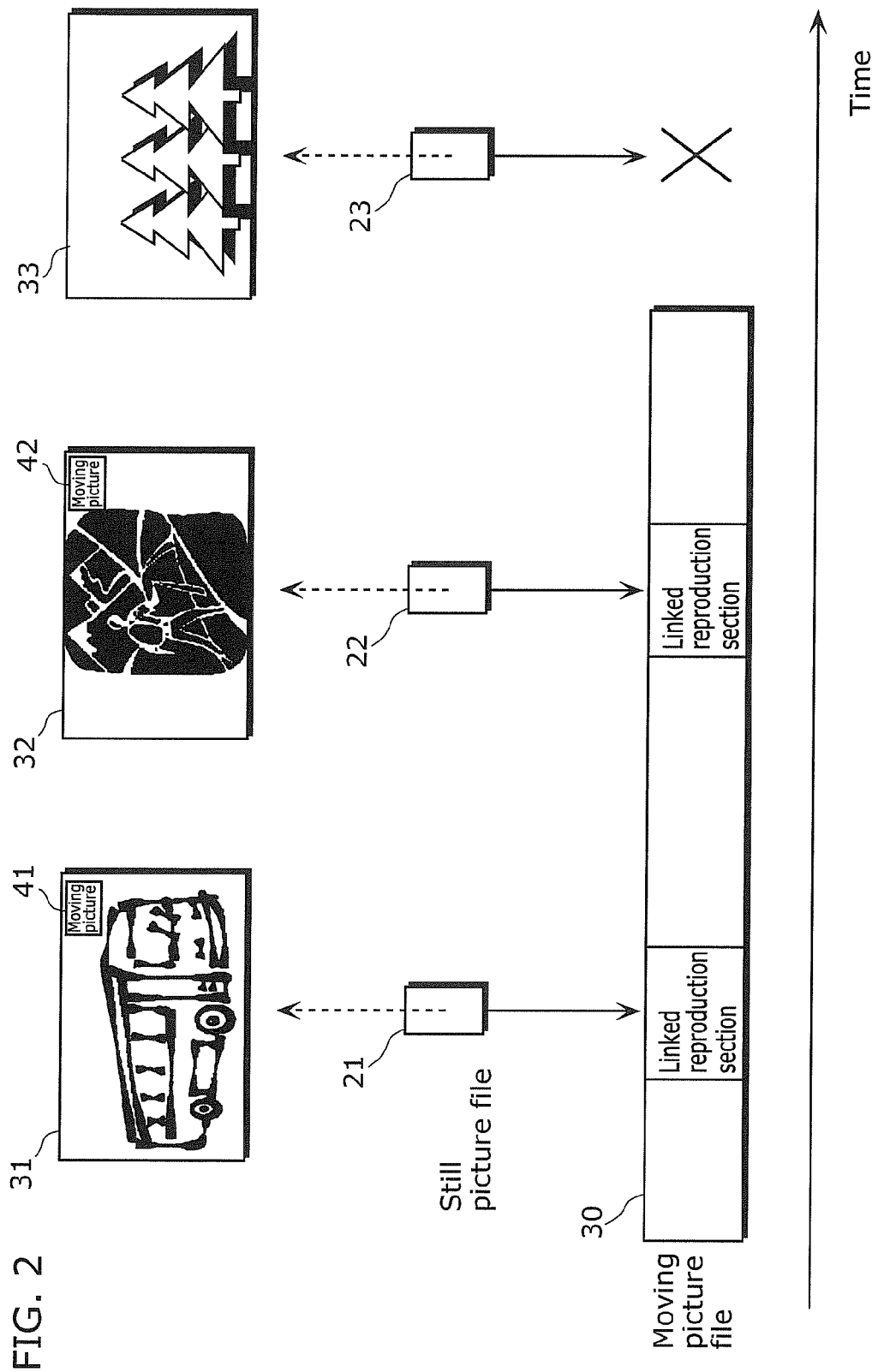

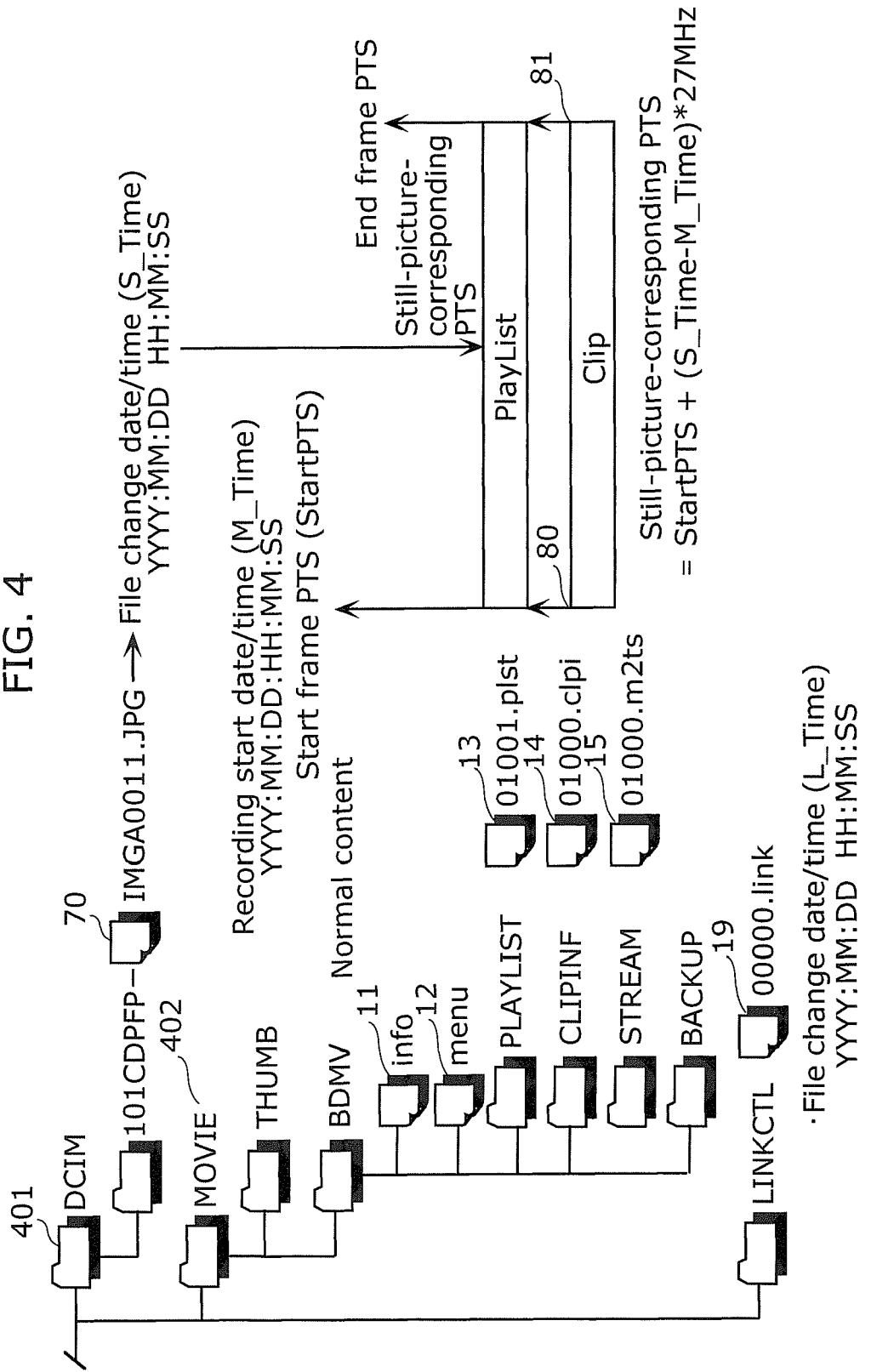

FIG. 5

| Still picture file name | Moving picture clip information file name | Still-picture-corresponding PTS | Reproduction flag information |
|---|---|---|---|
| IMGA0011.JPG | 01000.clpi | 0x001050009 | 0 |
| IMGA0012.JPG | 02000.clpi | 0x000023003 | 0 |
| IMGA0013.JPG | 02000.clpi | 0x000056027 | 1 |
| IMGA0014.JPG | 02000.clpi | 0x000809633 | 0 |
| IMGA0015.JPG | 02000.clpi | 0x001020096 | 1 |

FIG. 13

| Still picture file name | Moving picture clip information file name | Still-picture-corresponding PTS | Reproduction flag information | Digest reproduction flag |
|---|---|---|---|---|
| IMGA0011.JPG | 01000.clpi | 0x001050009 | 0 | 0 |
| IMGA0012.JPG | 02000.clpi | 0x000023003 | 0 | 1 |
| IMGA0013.JPG | 02000.clpi | 0x000056027 | 1 | 0 |
| IMGA0014.JPG | 02000.clpi | 0x000809633 | 0 | 0 |
| IMGA0015.JPG | 02000.clpi | 0x001020096 | 1 | 1 |

| Still picture file name | Moving picture clip information file name | Still-picture-corresponding PTS | High-speed imaging auxiliary file name | Reproduction flag information |
|---|---|---|---|---|
| IMGA0011.JPG | 01000.clpi | 0x001050009 | No_file | 0 |
| IMGA0012.JPG | 02000.clpi | 0x000023003 | 00001.clpe | 0 |
| IMGA0013.JPG | 02000.clpi | 0x000056027 | 00001.clpe | 1 |
| IMGA0014.JPG | 02000.clpi | 0x000809633 | No_file | 0 |
| IMGA0015.JPG | 02000.clpi | 0x001020096 | 00002.clpe | 1 |

LINK INFORMATION GENERATION APPARATUS, PICTURE RECORDING APPARATUS, PICTURE REPRODUCTION APPARATUS, RECORDING MEDIUM, LINK INFORMATION GENERATION METHOD, PICTURE RECORDING METHOD, PICTURE REPRODUCTION METHOD, PROGRAM, AND INTEGRATED CIRCUIT

TECHNICAL FIELD

The present invention relates to a link information generation apparatus and a link information generation method for generating link information between a still picture and a moving picture with audio recorded on a portable recording medium, a picture recording apparatus and a picture recording method for recording the still picture and the moving picture with audio, and a picture reproduction apparatus and a picture reproduction method for reproducing the recorded still picture and the recorded moving picture with audio.

BACKGROUND ART

Conventional digital video cameras for imaging and recording a still picture, a moving picture, and audio on a recording medium and reproducing the recorded still picture, moving picture, and audio include such a type that has a synchronous imaging function for a still picture and a moving picture, namely, a function of imaging a still picture synchronously while imaging a moving picture.

Through the use of this function, the following apparatus has been proposed. When reproducing a recording medium on which still picture recording time information showing a still picture recording time and moving picture recording time information showing a moving picture recording time are recorded, the apparatus specifies a moving picture that includes a still picture imaging time of a selected still picture, and reproduces only a portion of the specified moving picture near the still picture imaging time. Such an apparatus makes it possible to quickly find a scene which a user wants to view in the moving picture, from the still picture (for example, see PTL 1).

Moreover, the following apparatus has been proposed. This apparatus is a picture recording and reproduction apparatus that, when recording a still picture and a moving picture on the same recording medium, records still picture data and moving picture data with audio in different folders according to their different compression formats. Upon recording the still picture data, the apparatus generates a link information file for associating the still picture data with the moving picture data, in the folder in which the moving picture data is generated.

FIG. 24 shows an example of a file structure generated on the recording medium by this apparatus.

A folder named "DCIM (Digital Camera IMages)" and a folder named "VIDEO" are generated in a root folder of the recording medium. Here, "DCIM" is a parent folder for storing a still picture file in accordance with DCF (Design rule for Camera File system).

A subfolder with a name "(a 3-digit number)+(an arbitrary character string)" is created under the DCIM folder, and a still picture file is generated in this subfolder. The still picture file has a name "(an arbitrary character string)+(a 4-digit number)+.JPG". For example, a still picture file 500 named "ABCD0001.JPG" is generated.

On the other hand, "VIDEO" is a parent folder for storing a moving picture file. A subfolder with a name "(a 3-digit number)+(an arbitrary character string)" is created under the VIDEO folder, and a moving picture file is generated in this subfolder. The moving picture file has a name "(an arbitrary character string)+(a 3-digit number)+.MPG". For example, a moving picture file 502 named "EFG002.MPG" is generated.

When imaging the still picture, a link information file 501 is generated in the folder for storing the moving picture file 502. For example, the link information file 501 named "EFG001.lnk" is generated. "EFG001.lnk" stores linkage information designating the still picture file 500. Thus, the still picture data and the moving picture data can be easily associated with each other, with it being possible to achieve functions such as file browsing in chronological order (for example, see PTL 2).

CITATION LIST

Patent Literature
[PTL 1]
    Japanese Unexamined Patent Application Publication No. 2007-181164
[PTL 2]
    Japanese Unexamined Patent Application Publication No. 2005-260662

SUMMARY OF INVENTION

Technical Problem

However, in the conventional techniques, in order to specify the portion of the moving picture data corresponding to the still picture imaging time, search and association need to be performed on the still picture recording time information and the moving picture recording time information upon reproduction. This causes a problem that, from a state in which the still picture is being displayed, it takes time to start reproducing the moving picture corresponding to the displayed still picture. In particular, considerable improvement in recording medium capacity in recent years leads to a significant increase in the number of still picture files and moving picture files. This being so, an enormous amount of processing time is required merely for checking relations between imaging times of all files, and therefore it takes a very long time to start reproducing the moving picture.

Besides, since the link information file 501 showing the association with the still picture data is generated in the folder in which the moving picture data is generated, there is a possibility of a malfunction when the recording medium recorded by this apparatus is connected to a reproduction apparatus that complies with a conventional moving picture recording standard with no link information file support function. For instance, in FIG. 24, the link information file 501 exists in the folder storing the moving picture file. Accordingly, a moving picture reproduction apparatus that does not support the link information file 501 cannot recognize this file. In the worst case, the moving picture reproduction apparatus may regard the folder structure storing the moving picture file itself as a violation of the standard and make it irreproducible. Moreover, in the case where a file operation is performed by a recording and reproducing apparatus that has only one of a still picture recording and reproduction function and a moving picture recording and reproduction function, there is a possibility that consistency is lost between the link information file 501 and the moving picture data or the still picture data.

The present invention has been made in view of the above problems, and has an object of providing a link information generation apparatus, a picture recording apparatus, a picture reproduction apparatus, a recording medium, a link information generation method, a picture recording method, a picture reproduction method, a program, and an integrated circuit that can accelerate a process of specifying a moving picture file corresponding to a still picture file and, even when reproduction is performed by a reproduction apparatus having no link information file support function, prevent a malfunction of the reproduction apparatus.

Solution to Problem

A link information generation apparatus according to the present invention records a link information file on a recording medium on which a first folder and a second folder are recorded at positions that are not in a containment relationship with each other, the first folder holding a still picture file that includes still picture data and still picture imaging time information showing an imaging time of the still picture data, the second folder holding one or more moving picture files each of which includes moving picture data, and the link information file including link information for associating the still picture data with the moving picture data. In detail, the link information generation apparatus includes: a moving picture specification unit that specifies, from among the moving picture data included in each of the one or more moving picture files, a still-picture-linked moving picture imaged during a time period that includes the time shown by the still picture imaging time information of the still picture data; a position information obtainment unit that obtains still-picture-corresponding position information that shows a temporal position in the still-picture-linked moving picture corresponding to the still picture imaging time information; and a link information generation unit that generates the link information that includes still picture identification information for identifying the still picture data, moving picture identification information for identifying the still-picture-linked moving picture, and the still-picture-corresponding position information, and records the link information file including the link information on the recording medium at a position not contained in any of the first folder and the second folder.

According to the above structure, the still-picture-corresponding position information is included in the link information file, so that the portion of the still-picture-linked moving picture corresponding to the still picture data can be instantaneously specified and reproduced. In addition, since the link information file is recorded at the position not contained in any of the first and second folders, no malfunction occurs even when the recording medium is read by an apparatus having no link information file support function. Note that, in this specification, it is assumed that a file held (stored) in a folder not only may exist immediately under the folder but also may exist in a subfolder of the folder.

Moreover, the link information generation apparatus may further include a link information update control unit that controls the moving picture specification unit, the position information obtainment unit, and the link information generation unit to update the link information file, in the case where an update date and time of the link information file is earlier than an update date and time of the still picture file.

Moreover, the link information generation apparatus may further include: a link information reading unit that sequentially reads the link information included in the link information file; and a link information deletion unit that deletes, from the link information file, the link information read by the link information reading unit, in the case where the still picture data identified by the still picture identification information does not exist in the first folder or the moving picture data identified by the moving picture identification information does not exist in the second folder.

Moreover, the link information generation apparatus may further include: a still picture file monitoring unit that monitors the still picture file held in the first folder; and a link information deletion unit that, when the still picture file monitoring unit detects deletion of the still picture file, deletes the link information that includes the still picture identification information corresponding to the still picture file, from the link information file.

For example, in the case where an apparatus having no link information file support function performs a file operation (generation, editing, deletion, or the like) on the recording medium, there is a possibility that inconsistency arises between the contents of the link information file and the files (the still picture file, the moving picture file) actually recorded on the recording medium. According to each of the above structures, however, the contents of the link information file can be always kept up-to-date by updating the link information file, deleting the link information, and the like.

Moreover, the moving picture data may be composed of a plurality of frames imaged at predetermined time intervals. A third folder may be further recorded on the recording medium at a position that is not in a containment relationship with any of the first folder and the second folder, the third folder holding a high-speed imaging auxiliary file that corresponds to a different one of the one or more moving picture files and includes an auxiliary frame imaged during a time period between adjacent frames of the plurality of frames. The moving picture specification unit may further specify the high-speed imaging auxiliary file corresponding to the moving picture file that includes the still-picture-linked moving picture. The link information generation unit may generate the link information that further includes high-speed moving picture identification information for identifying the high-speed imaging auxiliary file specified by the moving picture specification unit. According to the above structure, it is possible to support not only normal reproduction but also slow reproduction of high picture quality for the still-picture-linked moving picture.

Moreover, the second folder may further hold one or more moving picture imaging information files that are in a one-to-one correspondence with the one or more moving picture files, each of the one or more moving picture imaging information files including imaging start time information and imaging end time information of moving picture data included in a corresponding moving picture file. The moving picture specification unit may, in the case where the time shown by the still picture imaging time information is included in a time period between the imaging start time information and the imaging end time information of the moving picture data, specify the moving picture data as the still-picture-linked moving picture.

Moreover, the still picture imaging time information may show an update date and time of the still picture file. The imaging start time information may show a recording start date and time of the moving picture data, and a start frame Presentation Time Stamp (PTS) assigned to a start frame of a plurality of frames that compose the moving picture data. The position information obtainment unit may obtain a still-picture-corresponding PTS calculated according to the still picture imaging time information, the recording start date and time, and the start frame PTS, as the still-picture-corresponding position information.

A picture recording apparatus according to the present invention records imaged still picture data and moving picture data on a recording medium. In detail, the picture recording apparatus includes: an imaging unit that converts light to an electrical signal; a moving picture recording unit that converts the electrical signal outputted from the imaging unit to moving picture data, and records a moving picture file including the moving picture data on the recording medium; a still picture recording unit that converts the electrical signal outputted from the imaging unit to still picture data and records a still picture file including the still picture data on the recording medium, at an arbitrary timing in a time period during which the moving picture data is recorded by the moving picture recording unit; a position information obtainment unit that obtains still-picture-corresponding position information showing a temporal position in the moving picture data corresponding to the still picture data recorded by the still picture recording unit; and a link information generation unit that generates link information that includes still picture identification information for identifying the still picture data, moving picture identification information for identifying a still-picture-linked moving picture which is the moving picture data, and the still-picture-corresponding position information, and records a link information file including the link information on the recording medium. The still picture file is recorded in a first folder on the recording medium, the moving picture file is recorded in a second folder that is not in a containment relationship with the first folder, on the recording medium, and the link information file is recorded on the recording medium at a position not contained in any of the first folder and the second folder.

According to the above structure, the still-picture-corresponding position information is included in the link information file, so that the portion of the still-picture-linked moving picture corresponding to the still picture data can be instantaneously specified and reproduced. In addition, since the link information file is recorded at the position not contained in any of the first and second folders, no malfunction occurs even when the recording medium is read by an apparatus having no link information file support function. Note that the difference from the above-mentioned link information generation apparatus lies in that the link information can be generated in real time while imaging the still picture data and the moving picture data.

A picture reproduction apparatus according to the present invention reproduces the still picture data and the moving picture data recorded on the recording medium described above. In detail, the picture reproduction apparatus includes: a still picture reproduction unit that reproduces the still picture data included in the still picture file read from the recording medium; a link information reading unit that, according to a still-picture-linked moving picture reproduction request from a user, reads the link information that includes the still picture identification information of the still picture data, from the link information file; and a moving picture reproduction unit that reproduces only a linked reproduction section in the still-picture-linked moving picture identified by the moving picture identification information that is included in the link information read by the link information reading unit, the linked reproduction section including the position shown by the still-picture-corresponding position information.

According to the above structure, the linked reproduction section can be determined on the basis of the still-picture-corresponding position information. This contributes to a significant reduction in processing after receiving the still-picture-linked moving picture reproduction request, as compared with the conventional techniques.

Moreover, the link information may further include a reproduction flag showing whether or not the corresponding still-picture-linked moving picture is to be reproduced. The moving picture reproduction unit may reproduce the linked reproduction section, only in the case where the reproduction flag in the link information shows that the still-picture-linked moving picture is to be reproduced. By setting the reproduction flag to "reproduced" or "not reproduced" beforehand in such a way, a linked reproduction section which the user finds not interesting can be skipped in reproduction.

Moreover, the link information reading unit may further sequentially read the link information included in the link information file, according to a digest reproduction request from the user. The moving picture reproduction unit may reproduce only the linked reproduction section of the still-picture-linked moving picture associated by the link information, in order in which the link information is read by the link information reading unit.

In many cases, a scene important for the user is recorded in moving picture data of a time period in which still picture data is imaged. Hence, by extracting and reproducing only linked reproduction sections imaged during such time periods, scenes interesting for the user can be reproduced efficiently.

Moreover, the link information may further include a digest reproduction flag showing whether or not digest reproduction of the corresponding still-picture-linked moving picture is to be performed. The moving picture reproduction unit may reproduce the linked reproduction section, only in the case where the digest reproduction flag in the link information shows that the digest reproduction is to be performed. By setting the digest reproduction flag of a section, among a plurality of linked reproduction sections, which the user finds not interesting to "not reproduced", the section can be skipped in subsequent reproduction.

Moreover, the moving picture data may be composed of a plurality of frames that include I frames coded by intra-picture predication coding and P frames coded by inter-picture prediction coding. The linked reproduction section may be a section from a reproduction start frame to a reproduction end frame, the reproduction start frame being an I frame closest to a position going backward from the position shown by the still-picture-corresponding position information in the still-picture-linked moving picture by a first section, and the reproduction end frame being a frame at a position going forward from the I frame in the still-picture-linked moving picture by a second section larger than the first section.

Moreover, a third folder may be further recorded on the recording medium at a position that is not in a containment relationship with any of the first folder and the second folder, the third folder holding a high-speed imaging auxiliary file that corresponds to a different one of the one or more moving picture files and includes an auxiliary frame imaged during a time period between adjacent frames of the plurality of frames. The moving picture reproduction unit may read frames included in the linked reproduction section from the moving picture file, read auxiliary frames imaged during a time period between the reproduction start frame and the reproduction end frame from the high-speed imaging auxiliary file, rearrange the read frames and auxiliary frames in chronological order, and reproduce the rearranged frames and auxiliary frames. In this way, it is possible to support not only normal reproduction but also slow reproduction of high picture quality for the linked reproduction section.

A recording medium according to the present invention is a recording medium on which a first folder, a second folder, and a link information file are recorded, the first folder holding a still picture file that includes still picture data and still picture imaging time information showing an imaging time of the still picture data, the second folder holding one or more moving picture files each of which includes moving picture data, and the link information file including link information for associating the still picture data with the moving picture data. In detail, the first folder and the second folder are recorded at positions that are not in a containment relationship with each other, and the link information includes still picture identification information for identifying the still picture data, moving picture identification information for identifying, from among the moving picture data included in each of the one or more moving picture files, a still-picture-linked moving picture imaged during a time period that includes the time shown by the still picture imaging time information of the still picture data, and still-picture-corresponding position information showing a temporal position in the still-picture-linked moving picture corresponding to the still picture imaging time information, the link information being recorded at a position not contained in any of the first folder and the second folder.

A reproduction apparatus that reads the recording medium of the above structure can instantaneously specify and reproduce the portion of the still-picture-linked moving picture corresponding to the still picture data. In addition, no malfunction occurs even when the recording medium is read by an apparatus having no link information file support function.

A link information generation method according to the present invention records a link information file on a recording medium on which a first folder and a second folder are recorded at positions that are not in a containment relationship with each other, the first folder holding a still picture file that includes still picture data and still picture imaging time information showing an imaging time of the still picture data, the second folder holding one or more moving picture files each of which includes moving picture data, and the link information file including link information for associating the still picture data with the moving picture data. In detail, the link information generation method includes: specifying, from among the moving picture data included in each of the one or more moving picture files, a still-picture-linked moving picture imaged during a time period that includes the time shown by the still picture imaging time information of the still picture data; obtaining still-picture-corresponding position information that shows a temporal position in the still-picture-linked moving picture corresponding to the still picture imaging time information; and generating the link information that includes still picture identification information for identifying the still picture data, moving picture identification information for identifying the still-picture-linked moving picture, and the still-picture-corresponding position information, and recording the link information file including the link information on the recording medium at a position not contained in any of the first folder and the second folder.

A picture recording method according to the present invention records imaged still picture data and moving picture data on a recording medium. In detail, the picture recording method includes: converting light to an electrical signal; converting the electrical signal outputted in the converting the light to moving picture data, and recording a moving picture file including the moving picture data on the recording medium; converting the electrical signal outputted in the converting the light to still picture data and recording a still picture file including the still picture data on the recording medium, at an arbitrary timing in a time period during which the moving picture data is recorded in the converting the electrical signal to the moving picture data; obtaining still-picture-corresponding position information showing a temporal position in the moving picture data corresponding to the still picture data recorded in the converting the electrical signal to the still picture data; and generating link information that includes still picture identification information for identifying the still picture data, moving picture identification information for identifying a still-picture-linked moving picture which is the moving picture data, and the still-picture-corresponding position information, and recording a link information file including the link information on the recording medium. The still picture file is recorded in a first folder on the recording medium, the moving picture file is recorded in a second folder that is not in a containment relationship with the first folder, on the recording medium, and the link information file is recorded on the recording medium at a position not contained in any of the first folder and the second folder.

A picture reproduction method according to the present invention reproduces the still picture data and the moving picture data recorded on the recording medium described above. In detail, the picture reproduction method includes: reproducing the still picture data included in the still picture file read from the recording medium; reading, according to a still-picture-linked moving picture reproduction request from a user, the link information that includes the still picture identification information of the still picture data, from the link information file; and reproducing only a linked reproduction section in the still-picture-linked moving picture identified by the moving picture identification information that is included in the link information read in the reading, the linked reproduction section including the position shown by the still-picture-corresponding position information.

A program according to the present invention causes a computer to execute a process of recording a link information file on a recording medium on which a first folder and a second folder are recorded at positions that are not in a containment relationship with each other, the first folder holding a still picture file that includes still picture data and still picture imaging time information showing an imaging time of the still picture data, the second folder holding one or more moving picture files each of which includes moving picture data, and the link information file including link information for associating the still picture data with the moving picture data. In detail, the program causes the computer to execute: specifying, from among the moving picture data included in each of the one or more moving picture files, a still-picture-linked moving picture imaged during a time period that includes the time shown by the still picture imaging time information of the still picture data; obtaining still-picture-corresponding position information that shows a temporal position in the still-picture-linked moving picture corresponding to the still picture imaging time information; and generating the link information that includes still picture identification information for identifying the still picture data, moving picture identification information for identifying the still-picture-linked moving picture, and the still-picture-corresponding position information, and recording the link information file including the link information on the recording medium at a position not contained in any of the first folder and the second folder.

An integrated circuit according to the present invention records a link information file on a recording medium on which a first folder and a second folder are recorded at positions that are not in a containment relationship with each other, the first folder holding a still picture file that includes still picture data and still picture imaging time information showing an imaging time of the still picture data, the second folder holding one or more moving picture files each of which includes moving picture data, and the link information file including link information for associating the still picture data with the moving picture data. In detail, the integrated circuit includes: a moving picture specification unit that specifies, from among the moving picture data included in each of the one or more moving picture files, a still-picture-linked moving picture imaged during a time period that includes the time shown by the still picture imaging time information of the still picture data; a position information obtainment unit that obtains still-picture-corresponding position information that shows a temporal position in the still-picture-linked moving picture corresponding to the still picture imaging time information; and a link information generation unit that generates the link information that includes still picture identification information for identifying the still picture data, moving picture identification information for identifying the still-picture-linked moving picture, and the still-picture-corresponding position information, and records the link information file including the link information on the recording medium at a position not contained in any of the first folder and the second folder.

Note that the present invention can be realized not only as each of the apparatuses described above, but also as an integrated circuit for achieving the functions of each of the apparatuses, or a program causing a computer to execute the functions. Such a program can be distributed via a recording medium such as a CD-ROM and a transmission medium such as the Internet.

Advantageous Effects of Invention

According to the present invention, on a recording medium on which a first folder storing a still picture file and a second folder storing a moving picture file are positioned at the same hierarchical level, information for directly associating the still picture file with the moving picture file is generated at a position not contained in any of the first and second folders. This produces an advantageous effect of directly obtaining information of a reproduction part of the moving picture file from a file name of the currently-displayed still picture file on the basis of the link information file, while complying with a conventional moving picture or still picture recording standard.

(Information about Technical Background to this Application)

The disclosure of Japanese Patent Application No. 2008-123089 filed on May 9, 2008 including specification, drawings, and claims is incorporated herein by reference in its entirety.

BRIEF DESCRIPTION OF DRAWINGS

FIG. 2 is a diagram showing an overview of a still picture moving picture linkage function in Embodiment 1 of the present invention.

FIG. 4 is a diagram showing an example of a file structure recorded on a recording medium in Embodiment 1 of the present invention.

FIG. 5 is a diagram showing an example of a structure of a link information table stored in a link information file in Embodiment 1 of the present invention.

FIG. 13 is a diagram showing an example of the link information file that supports the digest reproduction function.

FIG. 15 is a diagram showing a hardware structure of a link information generation apparatus in Embodiment 1 of the present invention.

FIG. 19 is a diagram showing an example of a structure of a link information table stored in a link information file in Embodiment 2 of the present invention.

DESCRIPTION OF EMBODIMENTS

The following describes embodiments of the present invention with reference to drawings.

Embodiment 1

The following describes a recording and reproduction apparatus 100 in Embodiment 1 of the present invention, with reference to drawings.

Figure 1:
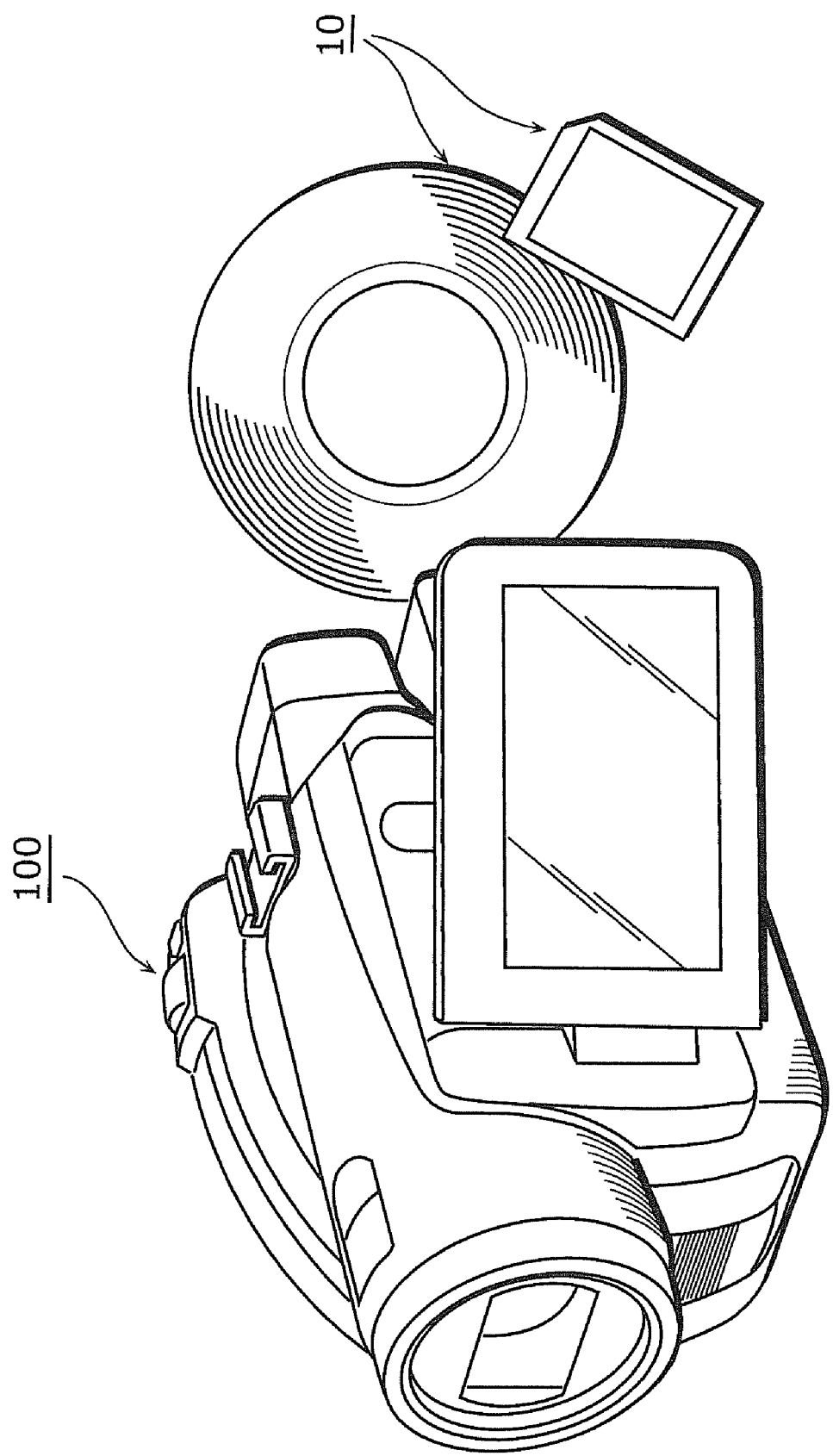
FIG. 1 is a perspective view showing an appearance of a recording and reproduction apparatus in Embodiment 1 of the present invention.

FIG. 1 is a perspective view showing an appearance of the recording and reproduction apparatus 100 in Embodiment 1 of the present invention.

The recording and reproduction apparatus 100 records a still picture file and a moving picture file obtained by imaging, on a recording medium 10. In detail, the still picture file is recorded in a subfolder in a DCIM main folder set beforehand according to the DCF standard which is a conventional standard for still picture files. The moving picture file is recorded in a subfolder in a MOVIE folder set beforehand according to a conventional moving picture recording standard.

The recording and reproduction apparatus 100 has a function of reproducing the still picture file and the moving picture file recorded on the recording medium 10. The recording and reproduction apparatus 100 also has a synchronous imaging function of the still picture file and the moving picture file, namely, a function of imaging the still picture file while imaging the moving picture file and recording them on the recording medium 10. The recording and reproduction apparatus 100 further has a function (hereafter referred to as a still picture moving picture linkage function) of reproducing only a portion of the moving picture file imaged during a time period that includes an imaging time of the still picture file read from the recording medium 10 and displayed, the portion being near the imaging time of the still picture file being displayed.

FIG. 2 is a diagram showing an overview of the still picture moving picture linkage function. FIG. 2 shows a state where, simultaneously with recording of imaged moving picture data on the recording medium 10 as a moving picture file 30, still picture data imaged using the synchronous imaging function is recorded on the recording medium 10 as a still picture file 21 and a still picture file 22. Still picture data may also be imaged alone, without using the synchronous imaging function. For example, a still picture file 23 includes still picture data that is imaged alone and recorded on the recording medium 10.

As an example, when reproducing the still picture file 21, the recording and reproducing apparatus 100 displays a still picture display screen 31 on a liquid crystal display or a connected external display device. The still picture files 21, 22, and 23 recorded on the recording medium 10 are sequentially reproduced by a user operation of a button and the like or a slide show reproduction function, as a result of which still picture display screens 31, 32, and 33 are displayed in this order.

Here, icons 41 and 42 showing that the still picture moving picture linkage function is applicable are displayed respectively on the still picture display screens 31 and 32 corresponding to the moving picture file 30 imaged during a time period that includes imaging times (still picture imaging time information) of the still picture files 21 and 22 according to the synchronous imaging function. On the other hand, no such icon is displayed on the still picture display screen 33 of the still picture file 23 imaged alone.

Note that the still picture display screens 31, 32, and 33 are not limited to the display form described here. For example, instead of displaying the icons 41 and 42 on the still picture display screens 31 and 32, a message indicating that the synchronous imaging function is not used may be displayed on the still picture display screen 33.

By performing a moving picture reproduction operation (still-picture-linked moving picture reproduction request) of reproducing the moving picture file 30 through a button operation, a touch panel operation, or the like while the still picture display screen 31 on which the icon 41 is displayed is being reproduced, the user can have the recording and reproduction apparatus 100 reproduce a neighborhood portion in the moving picture file 30 (hereafter referred to as a "linked reproduction section") that includes the imaging time of the still picture file 21, as a moving picture.

Figure 3A:
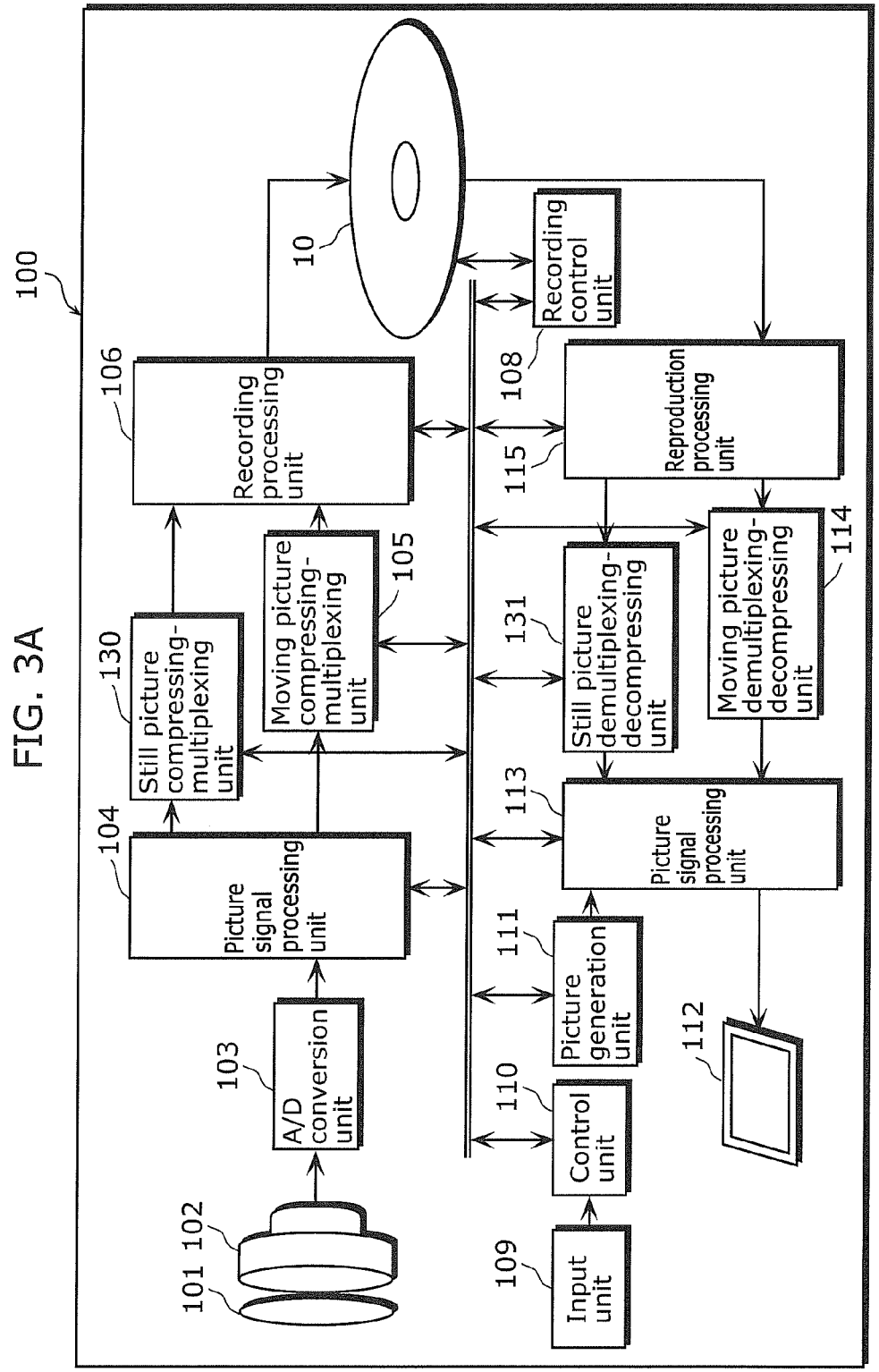
FIG. 3A is a diagram showing a hardware structure of the recording and reproduction apparatus in Embodiment 1 of the present invention.
Figure 3B:
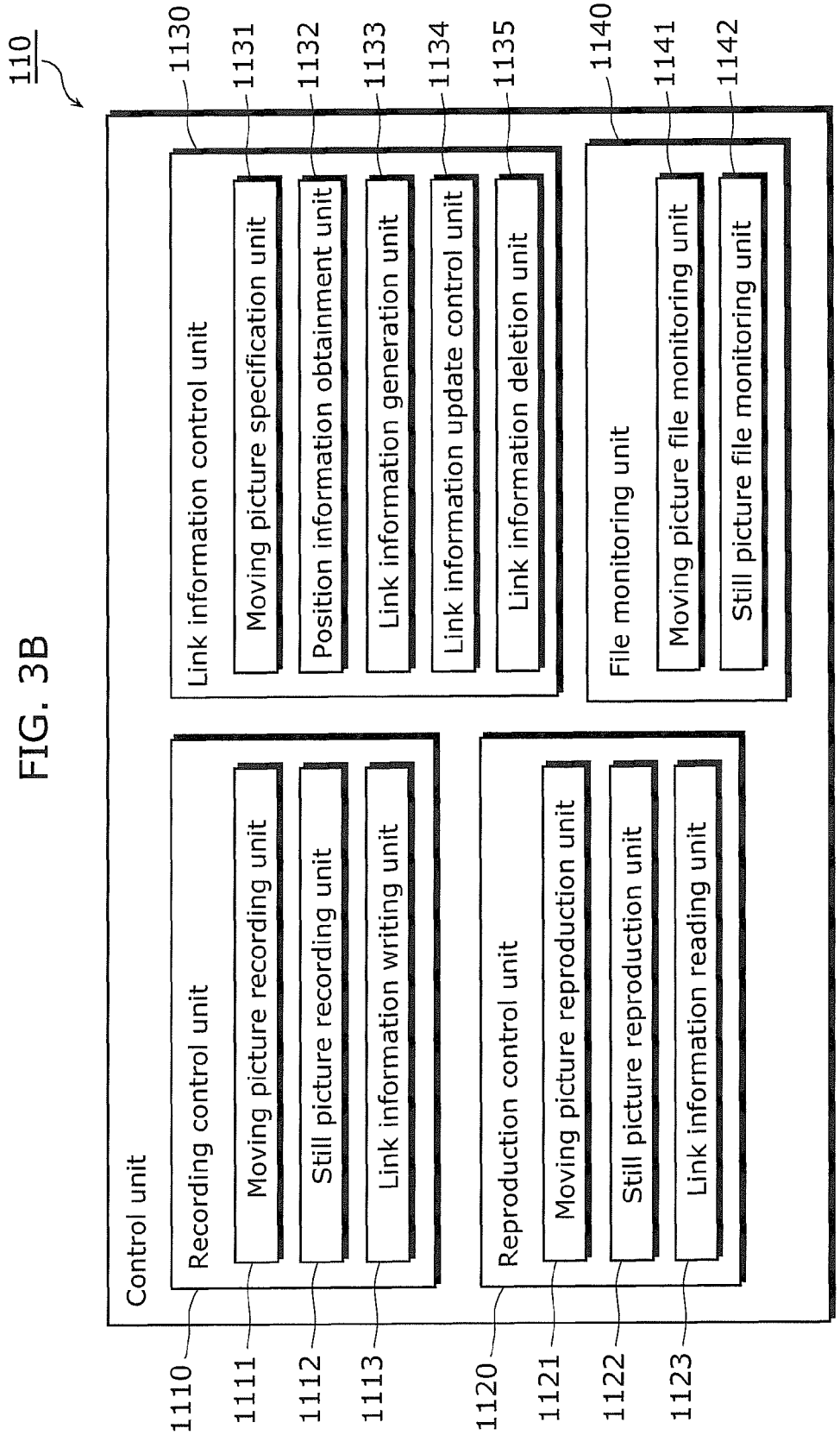
FIG. 3B is a functional block diagram of a control unit in FIG. 3A.

FIG. 3A is a diagram showing a hardware structure of the recording and reproduction apparatus 100 in Embodiment 1. FIG. 3B is a functional block diagram of a control unit 110 in FIG. 3A.

As shown in FIG. 3A, the recording and reproduction apparatus 100 includes a lens group 101, an imaging unit 102, an A/D conversion unit 103, a picture signal processing unit 104, a still picture compressing-multiplexing unit 130, a moving picture compressing-multiplexing unit 105, a recording processing unit 106, a recording control unit 108, an input unit 109, a control unit 110, a picture generation unit 111, a display unit 112, a picture signal processing unit 113, a still picture demultiplexing-decompressing unit 131, a moving picture demultiplexing-decompressing unit 114, a reproduction processing unit 115, and the like.

The lens group 101 is composed of a plurality of optical lenses.

The imaging unit 102 is composed of, for example, an imaging device such as a CCD, and images a picture inputted via the lens group 101. The imaging unit 102 outputs the imaged picture to the A/D conversion unit 103 as an analog signal. Note that the imaging device is not limited to a CCD, and may instead use a CMOS device.

The A/D conversion unit 103 converts the analog signal outputted from the imaging unit 102, to a digital signal. The A/D conversion unit 103 outputs the digital signal obtained as a result of conversion, to the picture signal processing unit 104.

The picture signal processing unit 104 performs processing such as noise removal and picture quality adjustment, on the digital signal outputted from the A/D conversion unit 103. In the case of still picture imaging, the picture signal processing unit 104 outputs a still picture signal to the still picture compressing-multiplexing unit 130. In the case of moving picture imaging, the picture signal processing unit 104 outputs a moving picture signal to the moving picture compressing-multiplexing unit 105.

Though Embodiment 1 describes the case where the picture signal processing unit 104 is capable of simultaneously outputting the still picture signal and the moving picture signal, the present invention is not limited to this. For instance, the same advantageous effect can be attained even in the case where the picture signal processing unit 104 is configured to stop outputting the moving picture signal for a brief time period when outputting the still picture signal.

The still picture compressing-multiplexing unit 130 compresses the still picture signal outputted from the picture signal processing unit 104 according to a coding method such as JPEG which is a conventional still picture compression standard, and multiplexes the compressed still picture signal with attached information such as a picture size and a bit depth. The still picture compressing-multiplexing unit 130 outputs still picture data obtained as a result of multiplexing, to the recording processing unit 106. Alternatively, the still picture compressing-multiplexing unit 130 may multiplex an uncompressed RAW signal with additional information.

The moving picture compressing-multiplexing unit 105 compresses the moving picture signal outputted from the picture signal processing unit 104 according to a coding method such as MPEG-2 or H.264 which is a conventional compression standard, and multiplexes the compressed moving picture signal with attached information and an audio signal. Though a multiplexing method is not particularly limited, for example, MPEG-2 Systems TS (Transport Stream) or PS (Program Stream) may be employed. The moving picture compressing-multiplexing unit 105 outputs moving picture data obtained as a result of multiplexing, to the recording processing unit 106.

The recording processing unit 106 records the still picture data outputted from the still picture compressing-multiplexing unit 130 and the moving picture data outputted from the moving picture compressing-multiplexing unit 105, on the recording medium 10 according to file structures set by their respective standards. Moreover, upon receiving an operation signal to generate, update, edit, or delete a link information file from the control unit 110, the recording processing unit 106 performs a file operation designated by the operation signal, on the link information file recorded on the recording medium 10.

The recording control unit 108 controls a drive device for driving the recording medium 10, or a recording protocol such as a recording address input procedure.

The input unit 109 receives a user operation via an input device, and outputs the received user operation to the control unit 110 as operation information ("still-picture-linked moving picture reproduction request", "digest reproduction request", and the like). The user operation inputted in the input unit 109 is made by using, for example, a touch pad input device, a pointing device, a tablet, or the like.

The control unit 110 executes a recording process, a reproduction process, and the like in the recording and reproduction apparatus 100, by controlling the picture signal processing unit 104, the still picture compressing-multiplexing unit 130, the moving picture compressing-multiplexing unit 105, the recording processing unit 106, the recording control unit 108, the picture generation unit 111, the picture signal processing unit 113, the still picture demultiplexing-decompressing unit 131, the moving picture demultiplexing-decompressing unit 114, and the reproduction processing unit 115. For instance, the control unit 110 may be composed of a CPU capable of executing software. Note that the control unit 110 includes an internal memory for temporarily storing data.

As shown in FIG. 3B, the control unit 110 includes a recording control unit 1110, a reproduction control unit 1120, a link information control unit 1130, and a file monitoring unit 1140.

The recording control unit 1110 records still picture data and moving picture data obtained by imaging, and link information on the recording medium 10, by controlling the lens group 101, the imaging unit 102, the A/D conversion unit 103, the picture signal processing unit 104, the still picture compressing-multiplexing unit 130, the moving picture compressing-multiplexing unit 105, the recording processing unit 106, the recording control unit 108, and the like. In detail, the recording control unit 1110 includes a moving picture recording unit 1111, a still picture recording unit 1112, and a link information writing unit 1113.

The moving picture recording unit 1111 converts an electrical signal outputted from the imaging unit 102 to moving picture data, and records a moving picture file including the moving picture data on the recording medium 10. The still picture recording unit 1112 converts an electrical signal outputted from the imaging unit 102 to still picture data, and records a still picture file including the still picture data on the recording medium 10. The link information writing unit 1113 writes link information obtained from the link information control unit 1130, to the recording medium 10 as a link information file.

The reproduction control unit 1120 reproduces still picture data and moving picture data recorded on the recording medium 10 and also reads link information from the recording medium 10, by controlling the picture generation unit 111, the display unit 112, the picture signal processing unit 113, the still picture demultiplexing-decompressing unit 131, the moving picture demultiplexing-decompressing unit 114, the reproduction processing unit 115, and the like. In detail, the reproduction control unit 1120 includes a moving picture reproduction unit 1121, a still picture reproduction unit 1122, and a link information reading unit 1123.

The moving picture reproduction unit 1121 reproduces moving picture data included in a moving picture file read from the recording medium 10, and displays the moving picture data in the display unit 112. The still picture reproduction unit 1122 reproduces still picture data included in a still picture file read from the recording medium 10, and displays the still picture data in the display unit 112.

The link information reading unit 1123 reads link information from a link information file, according to the "still-picture-linked moving picture reproduction request" from the user. Moreover, upon detecting that the recording medium 10 is newly connected, the link information reading unit 1123 checks whether or not the link information file is recorded. When detecting that the link information file is already recorded, the link information reading unit 1123 reads update date and time (hereafter "date/time") information of the link information file and the link information, and outputs the update date/time information and the link information to a link information update control unit 1134 and a link information deletion unit 1135.

The link information control unit 1130 performs generation, update, editing, deletion, and the like of a link information file, by controlling the recording control unit 1110, the reproduction control unit 1120, and the file monitoring unit 1140. In detail, the link information control unit 1130 includes a moving picture specification unit 1131, a position information obtainment unit 1132, a link information generation unit 1133, the link information update control unit 1134, and the link information deletion unit 1135.

The moving picture specification unit 1131 obtains information about imaging start and end of moving picture data from the moving picture recording unit 1111 and information about imaging of still picture data from the still picture recording unit 1112, and specifies moving picture data being recorded at an imaging time of still picture data, as a still-picture-linked moving picture. The moving picture specification unit 1131 outputs moving picture identification information of the still-picture-linked moving picture, to the link information generation unit 1133. This is equivalent to specifying, from among moving picture data included in each moving picture file, moving picture data whose time period between imaging start time information and imaging end time information stored in a moving picture file includes a time shown by still picture imaging time information stored in a still picture file, as the still-picture-linked moving picture.

The position information obtainment unit 1132 obtains still-picture-corresponding position information that shows a temporal position in the still-picture-linked moving picture corresponding to the still picture imaging time information. In detail, the position information obtainment unit 1132 performs the following process.

When recording the moving picture data, the moving picture recording unit 1111 records a PTS (Presentation Time Stamp) for managing a display time of the moving picture data, on the recording medium 10 together with the moving picture data. This being so, the position information obtainment unit 1132 obtains the PTS being recorded, from the moving picture recording unit 1111. The position information obtainment unit 1132 obtains imaging information of the still picture data from the still picture recording unit 1112. The position information obtainment unit 1132 obtains a PTS of the moving picture data corresponding to the imaging time of the still picture data as the still-picture-corresponding position information (still-picture-corresponding PTS), and outputs the still-picture-corresponding position information to the link information generation unit 1133.

Note that the position information obtainment unit 1132 may read the still picture imaging time information stored in the still picture file and a recording start date/time, a start frame PTS, and the like stored in the moving picture file from the recording medium 10, or obtain them from the moving picture recording unit 1111 and the still picture recording unit 1112. The position information obtainment unit 1132 may then output the still-picture-corresponding PTS calculated from these information according to Math. 2 shown below, to the link information generation unit 1133 as the still-picture-corresponding position information.

The link information generation unit 1133 generates link information that includes still picture identification information for identifying the still picture data obtained from the still picture recording unit 1112, the moving picture identification information for identifying the still-picture-linked moving picture obtained from the moving picture specification unit 1131, and the still-picture-corresponding position information obtained from the position information obtainment unit 1132. The link information generation unit 1133 outputs the link information to the link information writing unit 1113. The link information writing unit 1113 writes the link information file including the link information, to the recording medium 10.

The link information update control unit 1134, when the update date/time of the link information file obtained from the link information reading unit 1123 is earlier than an update date/time of a still picture file obtained from a still picture file monitoring unit 1142, controls the moving picture specification unit 1131, the position information obtainment unit 1132, and the link information generation unit 1133 to update (re-generate) the link information file.

The link information deletion unit 1135, when no still picture identification information obtained from the still picture file monitoring unit 1142 matches still picture identification information included in link information obtained from the link information reading unit 1123, causes the link information generation unit 1133 to delete the link information from the link information file.

Moreover, when no moving picture identification information obtained from a moving picture file monitoring unit 1141 matches moving picture identification information included in link information obtained from the link information reading unit 1123, the link information deletion unit 1135 causes the link information generation unit 1133 to delete the link information from the link information file.

Furthermore, when the moving picture file monitoring unit 1141 described later detects deletion of a moving picture file, the link information deletion unit 1135 causes the link information generation unit 1133 to delete link information that includes moving picture identification information corresponding to the deleted moving picture file, from the link information file. When the still picture file monitoring unit 1142 described later detects deletion of a still picture file, the link information deletion unit 1135 causes the link information generation unit 1133 to delete link information that includes still picture identification information corresponding to the deleted still picture file, from the link information file.

The file monitoring unit 1140 monitors update states of a moving picture file, a still picture file, and a link information file recorded on the recording medium 10, and reads necessary information and outputs it to the link information control unit 1130, by controlling the recording control unit 108, the reproduction processing unit 115, and the like. In detail, the file monitoring unit 1140 includes the moving picture file monitoring unit 1141 and the still picture file monitoring unit 1142.

The moving picture file monitoring unit 1141 checks whether or not a moving picture file is recorded on the recording medium 10, upon detecting that the recording medium 10 is newly connected. When detecting the moving picture file, the moving picture file monitoring unit 1141 reads update date/time information and moving picture identification information of the moving picture file, and outputs the read information to the link information update control unit 1134 and the link information deletion unit 1135. The moving picture file monitoring unit 1141 also monitors whether or not the moving picture file is deleted. When detecting the deletion, the moving picture file monitoring unit 1141 outputs deletion detection information and the moving picture identification information of the deleted moving picture file, to the link information deletion unit 1135.

The still picture file monitoring unit 1142 checks whether or not a still picture file is recorded on the recording medium 10, upon detecting that the recording medium 10 is newly connected. When detecting the still picture file, the still picture file monitoring unit 1142 reads update date/time information and still picture identification information of the still picture file, and outputs the read information to the link information update control unit 1134 and the link information deletion unit 1135. The still picture file monitoring unit 1142 also monitors whether or not the still picture file is deleted. When detecting the deletion, the still picture file monitoring unit 1142 outputs deletion detection information and the still picture identification information of the deleted still picture file, to the link information deletion unit 1135.

Note that the functions of the functional blocks included in the control unit 110 are not limited to such. Besides, though the functional blocks are grouped in the recording control unit 1110, the reproduction control unit 1120, the link information control unit 1130, and the file monitoring unit 1140 in FIG. 3B, the grouping is not limited to this. Furthermore, the control unit 110 does not need to include all functional blocks shown in FIG. 3B. For instance, the present invention may be a picture recording apparatus that includes only the recording control unit 1110 and the link information control unit 1130, a picture reproduction apparatus that includes only the reproduction control unit 1120, or a link information generation apparatus that includes only the link information writing unit 1113, the link information reading unit 1123, the link information control unit 1130, and the file monitoring unit 1140.

The picture generation unit 111 generates a menu picture providing a list of still picture files and moving picture files recorded on the recording medium 10, an icon superimposed on a reproduction display screen and displayed, and so on.

The display unit 112 displays a picture signal outputted from the picture signal processing unit 113, on a monitor or the like. The display unit 112 may be any device capable of displaying a still picture signal outputted from the still picture demultiplexing-decompressing unit 131 and moving picture data outputted from the moving picture demultiplexing-decompressing unit 114. For example, a PDP (Plasma Display Panel), a liquid crystal display, an organic EL (ElectroLuminescence) display, or the like is applicable.

The picture signal processing unit 113 performs processing, such as picture quality adjustment for display, on a still picture signal outputted from the still picture demultiplexing-decompressing unit 131 as a result of decompressing still picture data, and outputs the processed still picture signal to the display unit 112. The picture signal processing unit 113 also performs processing, such as picture quality adjustment for display, on a moving picture signal outputted from the moving picture demultiplexing-decompressing unit 114 as a result of decompressing moving picture data, and outputs the processed moving picture signal to the display unit 112. The picture signal processing unit 113 further outputs a menu picture or the like generated by the picture generation unit 111 according to need to the display unit 112 as a picture signal, as it is or in a state of being superimposed on a decompressed still picture signal outputted from the still picture demultiplexing-decompressing unit 131 or a decompressed moving picture signal outputted from the moving picture demultiplexing-decompressing unit 114.

The still picture demultiplexing-decompressing unit 131 demultiplexes and decompresses still picture data outputted from the reproduction processing unit 115, according to the coding method such as JPEG used by the still picture compressing-multiplexing unit 130. The still picture demultiplexing-decompressing unit 131 outputs a still picture signal obtained as a result of decompression, to the picture signal processing unit 113.

The moving picture demultiplexing-decompressing unit 114 demultiplexes and decompresses moving picture data outputted from the reproduction processing unit 115, according to the coding method such as MPEG-2 or H.264 used by the moving picture compressing-multiplexing unit 105. The moving picture demultiplexing-decompressing unit 114 outputs a moving picture signal obtained as a result of decompression, to the picture signal processing unit 113.

The reproduction processing unit 115 reads a file to be reproduced from the recording medium 10 on the basis of a reproduction signal of still picture data or moving picture data from the control unit 110, and reproduces the read file. In detail, the reproduction processing unit 115 reads still picture data to be reproduced from the recording medium 10, and outputs the still picture data to the still picture demultiplexing-decompressing unit 131. The reproduction processing unit 115 also reads moving picture data to be reproduced from the recording medium 10, and outputs the moving picture data to the moving picture demultiplexing-decompressing unit 114. Note that the present invention is not limited to a structure in which the reproduction processing unit 115 is provided independently of the recording processing unit 106, and a recording and reproduction processing unit having the two functions may instead be used.

The following describes a file structure of the recording medium 10 in Embodiment 1 of the present invention, with reference to drawings.

FIG. 4 is a diagram showing an example of the file structure recorded on the recording medium 10 in Embodiment 1. As shown in FIG. 4, the recording medium 10 has a file structure that supports the DCF standard for storing a still picture file 70 and a file structure that supports the conventional standard for storing a moving picture file, as an example.

The still picture file 70 is stored under a DCIM main folder (first folder) 401, as defined in the DCF standard. In the DCF standard, a subfolder with a name "(a 3-digit number)+(an arbitrary character string)" is created under the DCIM main folder 401, and the still picture file 70 is generated in this subfolder. For example, in the case of using JPEG as the compression format of the still picture file 70, a file name of the still picture file 70 is "(an arbitrary character string)+(a 4-digit number)+.JPG".

In the still picture file 70, additional information including file change date/time information is multiplexed in addition to still picture data compressed according to the still picture compression standard such as JPEG. The file change date/time information is made up of year, month, and day (YYYY:MM:DD, Y is a 4-digit figure representing year, M is a 2-digit figure representing month, and D is a 2-digit figure representing day), and hour, minute, and second (HH:MM:SS, H is a 2 digit figure representing hour, M is a 2-digit figure representing minute, and S is a 2-digit figure representing second).

This file change date/time information shows an imaging time of the still picture file (still picture imaging time information), unless edited after imaging. In Embodiment 1 of the present invention, "101CDPFP" is provided as the subfolder and the still picture file 70 (IMGA0011.JPG) compressed according to JPEG is stored in this subfolder, as an example.

The moving picture file (a stream file 15, a clip information file is 14, a playlist file 13) is a file in which moving picture data, attached information such as PSI (Program Specific Information) and camera information, and an audio signal are multiplexed according to MPEG-2 Systems, and is stored under a MOVIE main folder 402.

The MOVIE main folder 402 has a folder structure in which a thumbnail folder (THUMB) and a content folder (BDMV) are provided at a lower hierarchical level. The BDMV content folder has a folder structure in which an information file 11 (info), a menu file 12 (menu), a playlist folder (PLAYLIST), a clip information folder (CLIPINF), a stream folder (STREAM), a backup folder (BACKUP), and the like are provided at a lower hierarchical level.

In MPEG-2 Systems, compressed moving picture data is divided into small packets and multiplexed with other information, and a PTS is assigned to each frame of the moving picture data in order to manage a display time of the frame.

The PTS is a time stamp that is counted by a STC (System Time Clock) for managing a time axis.

The information file 11 (info) positioned under the BDMV folder includes management information for the whole BDMV content folder. The menu file 12 (menu) includes information constituting a menu and the like.

The clip information file 14 (01000.clpi) and the like are stored in the clip information folder (CLIPINF). The clip information file 14 (01000.clpi) includes a time table for associating a position of an I frame (which may also be called "picture"; hereafter the same) in the moving picture file with time information. In more detail, the time table associates a packet number of a packet storing start data of an I frame, with a PTS assigned to the I frame. Here, the packet number is counted from the start of the file.

The stream file 15 (01000.m2ts) and the like are stored in the stream folder (STREAM). The stream file 15 (01000.m2ts) includes AV data (moving picture data). The stream file 15 and the information such as the time table included in the clip information file 14 are in a one-to-one correspondence with each other, and are regarded together as a unit called a clip.

The playlist file 13 (01001.plst) and the like are stored in the playlist folder (PLAYLIST). The playlist file 13 (01001.plst) includes information about moving picture file reproduction order, a start frame PTS that corresponds to a start frame 80 of a corresponding clip, recording start date/time information (information made up of year, month, day, hour, minute, and second, like the file change date/time information in the still picture file 70), an end frame PTS that corresponds to an end frame 81 of the corresponding clip, and so on.

The playlist file 13 is roughly classified into two types. One type is a playlist file covering information of the whole clip. The other type is a playlist file for controlling reproduction order by connecting a plurality of clip portions for editing. It is assumed that the playlist file 13 in Embodiment 1 of the present invention is a playlist file that covers information of the clip corresponding to the clip information file 14.

A method of using the backup folder (BACKUP) depends on an apparatus to which the recording medium 10 is connected. As an example, the backup folder (BACKUP) is used for storing copies of the information file 11 (info), the menu file 12 (menu), the playlist folder (PLAYLIST), and the clip information folder (CLIPINF), in order to prevent a situation where the moving picture file becomes irreproducible due to power disconnection during editing.

(1. Link Information File Generation Method when Unused Medium is Connected)

The following describes a picture recording operation when the recording medium 10 on which still picture data and moving picture data have not been recorded yet is connected to the recording and reproduction apparatus 100 in Embodiment 1 of the present invention, with reference to drawings. In more detail, this is the following operation. The DCIM main folder 401 including the subfolder for storing the still picture file 70 and the MOVIE folder 402 including the plurality of subfolders for storing the moving picture file are created at the same hierarchical level on the recording medium 10 (that is, the DCIM main folder 401 and the MOVIE folder 402 are positioned so as not to be in a containment relationship with each other; hereafter the same). A link information file 19 that associates the still picture data, the moving picture data, and imaging information at the time of imaging of the still picture data with each other is then generated at a position different from the DCIM main folder 401 and the MOVIE folder 402 (that is, a position not contained in any of the DCIM main folder 401 and the MOVIE folder 402).

In Embodiment 1, a LINKCTL main folder is generated, and the link information file 19 (00000.link) is generated in the LINKCTL main folder. The link information file 19 includes link information showing linkage between the still picture file 70 stored in the DCIM main folder 401 and the moving picture file stored in the MOVIE main folder 402, and is generated as a link information table shown in FIG. 5.

Each set of link information (entry) in the link information table includes a still picture file name 91, a moving picture clip information file name 92, a PTS 93 of the moving picture file corresponding to the imaging time of the still picture file (hereafter abbreviated as "still-picture-corresponding PTS"), and reproduction flag information 94 showing whether or not the moving picture is to be reproduced.

In addition to the link information table, additional information including file change date/time information is multiplexed in the link information file 19. The file change date/time information is made up of year, month, and day (YYYY:MM:DD) and hour, minute, and second (HH:MM:SS), like the file change date/time information of the still picture file 70.

First, when the recording medium 10 on which still picture data and moving picture data have not been recorded yet is connected to the recording and reproduction apparatus 100, the control unit 110 causes the recording processing unit 106 to create the DCIM main folder 401, the subfolders of the MOVIE main folder 402, and the LINKCTL folder shown in FIG. 4. At this point, the still picture file 70, the playlist file 13, the clip information file 14, and the stream file 15 of the moving picture, and the like do not exist because neither still picture data nor moving picture data has been recorded. Likewise, the link information file 19 does not exist because no link information has been generated.

The following describes an operation when, from this state, the recording and reproduction apparatus 100 images still picture data while imaging moving picture data according to the user's operation of the synchronous imaging function, and records the moving picture file including the moving picture data and the still picture file 70 including the still picture data on the recording medium 10.

Figure 6:
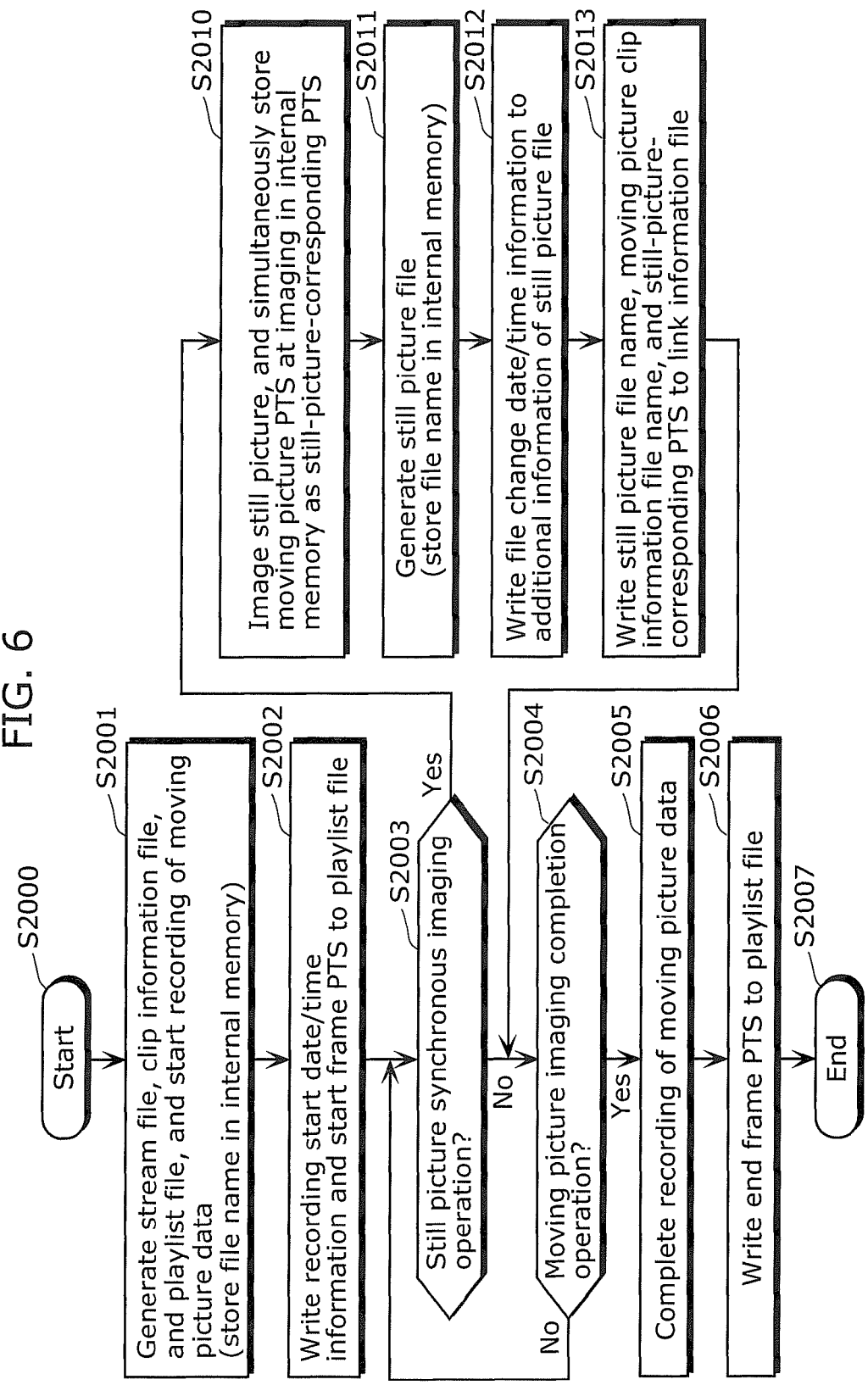
FIG. 6 is a flowchart showing a process of performing still picture imaging from moving picture imaging using a synchronous imaging function by the recording and reproduction apparatus.

FIG. 6 is a flowchart showing a process of performing still picture imaging during moving picture imaging using the synchronous imaging function by the recording and reproduction apparatus 100.

(Step S2000) The control unit 110 receives a moving picture imaging start operation from the user via the input unit 109, and starts moving picture imaging.

(Step S2001) The control unit 110 causes the recording processing unit 106 to generate the stream file 15, the clip information file 14, and the playlist file 13 of the moving picture data, and start recording the moving picture data. The control unit 110 then advances to Step S2002. Here, the control unit 110 stores the file names of the stream file 15, the clip information file 14, and the playlist file 13 in the internal memory.

(Step S2002) The control unit 110 causes the recording processing unit 106 to write the recording start date/time information and the start frame PTS to the playlist file 13. The control unit 110 then advances to Step S2003.

(Step S2003) The control unit 110 determines whether or not the user performs a still picture synchronous imaging operation via the input unit 109. When the still picture synchronous imaging operation is performed, the control unit 110 advances to Step S2010. When the still picture synchronous imaging operation is not performed, the control unit 110 advances to Step S2004.

(Step S2004) The control unit 110 determines whether or not the user performs a moving picture imaging completion operation via the input unit 109. When the moving picture imaging completion operation is performed, the control unit 110 advances to Step S2005. When the moving picture imaging completion operation is not performed, the control unit 110 repeats the user operation determination of Steps S2003 and S2004.

(Step S2005) The control unit 110 completes the recording of the moving picture data. The control unit 110 then advances to Step S2006.

(Step S2006) The control unit 110 causes the recording processing unit 106 to write the end frame PTS to the playlist file 13. Having done so, the control unit 110 ends the picture recording process (Step S2007).

(Step S2010) Upon receiving the still picture synchronous imaging operation from the user in Step S2003, the control unit 110 performs a link information addition process of Steps S2010 to S2013. First, the control unit 110 images the still picture data, and simultaneously stores the moving picture PTS at the time of imaging in the internal memory as the still-picture-corresponding PTS. The control unit 110 then advances to Step S2011.

(Step S2011) The control unit 110 generates the still picture file 70, and writes the still picture data to the still picture file 70. The control unit 110 then advances to Step S2012. Here, the control unit 110 stores the file name of the still picture file 70 in the internal memory.

(Step S2012) The control unit 110 writes the file change date/time information to the additional information in the still picture file 70. The control unit 110 then advances to Step S2013.

(Step S2013) The control unit 110 causes the recording processing unit 106 to generate the link information file 19. The control unit 110 then causes the recording processing unit 106 to write the link information including the still picture file name 91, the moving picture clip information file name 92, the still-picture-corresponding PTS 93, and the reproduction flag information 94, to the link information file 19. After this, the control unit 110 advances to Step S2004 to return to the user operation determination loop of Steps S2003 and S2004. Note that, at this point, the reproduction flag information 94 is set to a default flag value "1" indicating that the moving picture is to be reproduced.

According to the above process, when the synchronous imaging of the still picture data is performed during the imaging of the moving picture data, the link information file 19 is generated and the link information is added.

According to the above structure in Embodiment 1 of the present invention, on the recording medium 10 on which the DCIM main folder 401 (first folder) that includes the still picture folder for storing the still picture file and the MOVIE main folder 402 (second folder) that includes the moving picture folder for storing the moving picture file are positioned at the same hierarchical level, the file name of the still picture file 70, the file name of the moving picture clip information file 14, the still-picture-corresponding PTS, and the reproduction flag information at the point when synchronous imaging is executed can be generated together as one set of link information (entry) in the link information file 19.

Since the link information file 19 not defined in any of the conventional moving picture recording standard and the conventional still picture recording standard does not exist in the DCIM main folder 401 (still picture folder) or the MOVIE main folder 402 (moving picture folder) on the recording medium 10, no malfunction occurs even when the recording medium 10 is connected to a still picture recording and reproduction apparatus or a moving picture recording apparatus that supports only the conventional standard.

Moreover, the reproduction position of the moving picture data corresponding to the still picture data being reproduced can be directly specified from the moving picture clip information file name 92 and the still-picture-corresponding PTS 93 of the link information that is extracted from the link information file 19 in correspondence with the still picture file name as a key. This produces an advantageous effect of accelerating file search. In particular, an increase in the number of files merely causes an increase in the number of rows in the link information table shown in FIG. 5. Since there is no need to search the moving picture file or the additional information from the information added to the still picture data to specify the moving picture position in each operation as has been conventionally done, a decrease in processing speed can be prevented.

Though the above describes the case where the reproduction flag information 94 in the link information file 19 is set to the default value "1" indicating that the moving picture is to be reproduced, the user may selectively set "0 (not reproduced)" or "1 (reproduced)" after checking the contents of the picture. By providing the reproduction flag information 94 in the link information file 19 in this way, it is possible to edit whether or not each individual scene is to be reproduced when reproducing the moving picture file. This produces an advantageous effect of skipping, in reproduction, a scene for which still picture data is synchronously imaged but which is not very interesting as moving picture data.

Here, intentionally skipping a moving picture portion (linked reproduction section) for which still picture data is synchronously imaged can also be realized merely by deleting corresponding link information from the link information file 19. According to this method, however, in the case of detecting that the still picture file 70 exists but the corresponding link information does not exist in a consistency check and repair operation described later, it is impossible to determine whether the link information is intentionally deleted for skipping or the lack of the link information is due to inconsistency caused as a result of recording by an apparatus that does not support the still picture moving picture linkage function. On the other hand, by recording "0" showing that the moving picture is not to be reproduced as the reproduction flag information 94 for skipping intended by the user, only the inconsistency caused regardless of the user's intension can be properly fixed.

Moreover, in addition to the reproduction flag information 94, a digest reproduction flag 95 (not shown in FIG. 5) may separately be provided in the case of installing a digest reproduction function described later. This makes it possible to separately designate whether or not digest reproduction is to be performed and whether or not reproduction by the still picture moving picture linkage function is to be performed.

For example, to realize this feature by editing the playlist file 13 (01001.plst) stored in the playlist folder (PLAYLIST), it is necessary to perform complex editing and recording of the information about the moving picture data reproduction order, which causes a significant processing load on the recording and reproduction apparatus 100 that is portability-oriented. According to the structure of Embodiment 1, however, the above feature can be realized with a small processing load.

Note that the link information file 19 may not include the reproduction flag information 94.

Moreover, instead of storing the link information file 19 in the LINKCTL main folder at the same hierarchical level as the DCIM main folder 401 and the MOVIE main folder 402, the link information file 19 may be stored immediately under a root folder so as to be positioned side by side with the DCIM main folder 401 and the MOVIE main folder 402. In this case, when inserting the recording medium 10 in the recording and reproduction apparatus 100, there is no need to determine whether or not the LINKCTL main folder exists on the recording medium 10. This produces an advantageous effect of reducing the processing load of the recording and reproduction apparatus 100.

Note that any format may be employed for the folder structure of the recording medium 10 in Embodiment 1 of the present invention, so long as it includes the folder structure in the recording format that supports the conventional standard for recording still picture data and the folder structure in the recording format that supports the conventional standard for recording moving picture data.

Besides, the link information file 19 is not limited to the data structure in table form, and any data form is applicable so long as the still picture file name 91, the moving picture clip information file name 92, and the still-picture-corresponding PTS 93 of the moving picture file corresponding to the imaging time of the still picture file are in a one-to-one correspondence.

In addition, the link information file 19 may include the file change date/time information of the still picture file, instead of the still-picture-corresponding PTS 93. Furthermore, information (such as a packet number) other than time information may be used so long as it is the information (still-picture-corresponding position information) showing the temporal position in the moving picture data corresponding to the imaging time of the still picture data.

(2. Moving Picture File Reproduction Method Using Link Information File)

The following describes a reproduction operation using the still picture moving picture linkage function by the recording and reproduction apparatus 100 in Embodiment 1 of the present invention, with reference to drawings. In more detail, this is an operation of reproducing the moving picture data (still-picture-linked moving picture) imaged near the imaging time of the still picture file 70 being reproduced, when the recording medium 10 on which the DCIM main folder 401 including the subfolder for storing the still picture file 70, the MOVIE folder 402 including the plurality of subfolders for storing the moving picture file, and the link information file 19 generated by the recording and reproduction apparatus 100 in Embodiment 1 of the present invention are positioned at the same hierarchical level is connected.

It is assumed that the moving picture file stored under the MOVIE folder 402 on the recording medium 10 is compressed according to the coding method such as MPEG-2 or H.264. That is, the moving picture data included in the moving picture file includes I frames 50, 51, 52, 53, 54, 55, 56, 57, 58, and 59 which are intra-picture prediction coded (intra-frame coded) and P frames (P frames and B frames) which are inter-picture prediction coded.

When reproducing the moving picture file compressed according to such a coding method, it is impossible for the recording and reproduction apparatus 100 to start decompression at any frame in the moving picture file. The recording and reproduction apparatus 100 can only start decompression at an intra-frame coded frame which is typically called an I frame.

Figure 7:
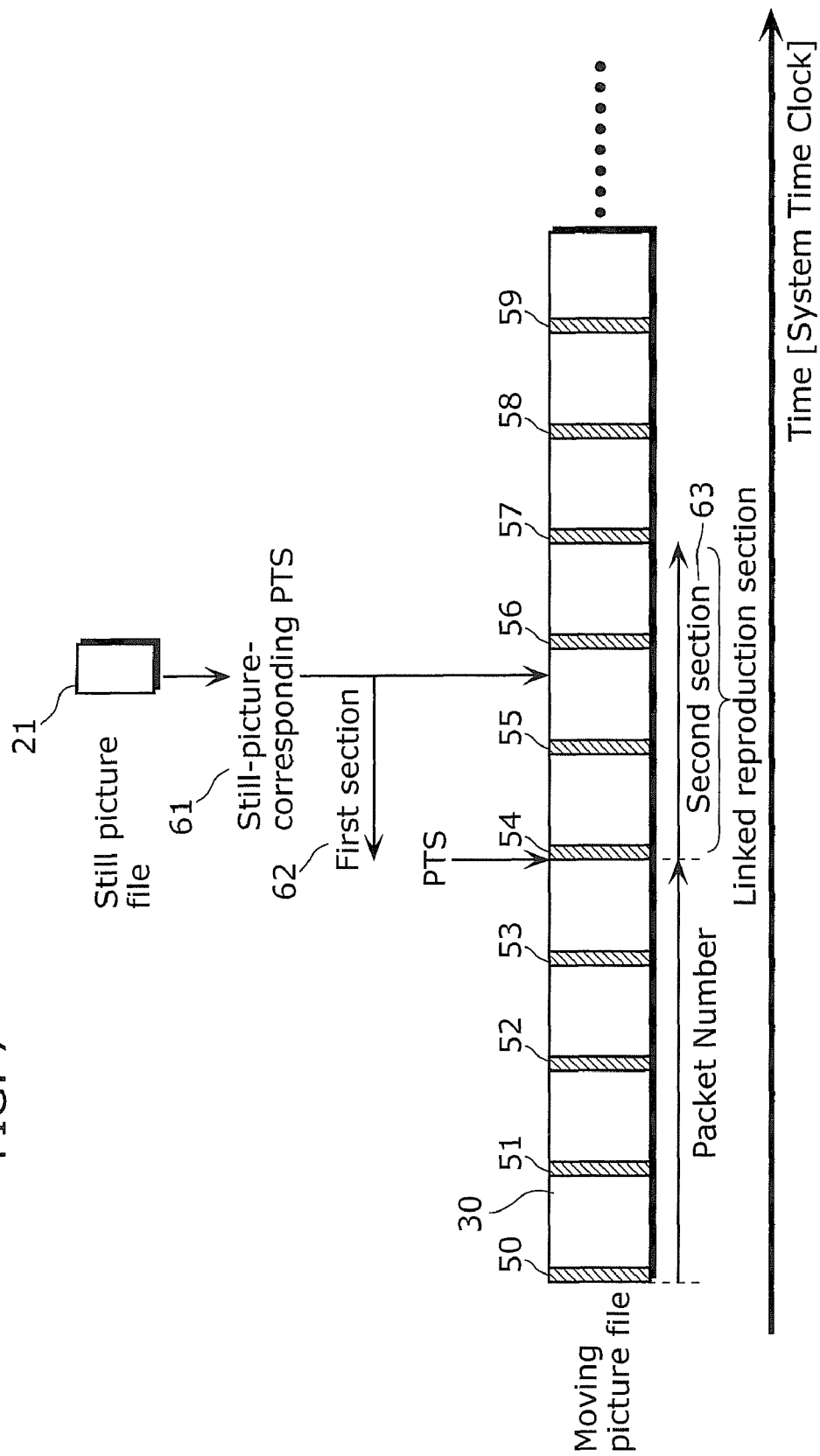
FIG. 7 is a diagram explaining processing of the still picture moving picture linkage function in Embodiment 1 of the present invention.

Accordingly, the recording and reproduction apparatus 100 determines a linked reproduction section using a still-picture-corresponding PTS 61 of the still picture file 21 as a point of origin, as shown in FIG. 7. Note that the still picture file 21 shown in FIG. 7 corresponds to the still picture file 70 (IMGA0012.JPG) in the link information table included in the link information file 19 shown in FIG. 5.

The following describes the moving picture file reproduction operation using the link information file 19 by the recording and reproduction apparatus 100 in Embodiment 1 of the present invention, with reference to drawings.

Figure 8:
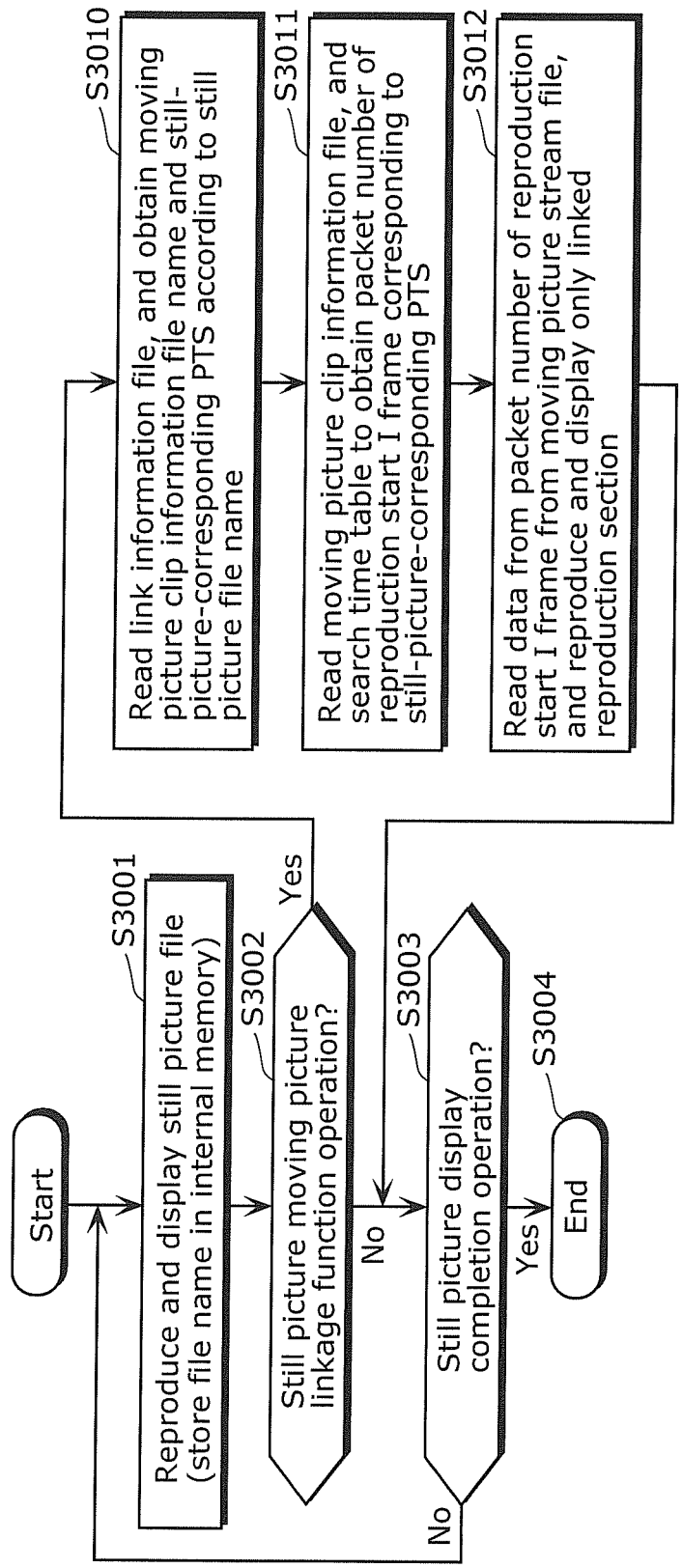
FIG. 8 is a flowchart showing an operation of reproducing, when the recording medium is connected to the recording and reproduction apparatus, a moving picture file using the still picture moving picture linkage function from a state where a still picture file is being reproduced and displayed, on the basis of the link information file recorded on the recording medium.

FIG. 8 is a flowchart showing the operation of reproducing, when the recording medium 10 is connected to the recording and reproduction apparatus 100, the moving picture file using the still picture moving picture linkage function from the state in which the still picture file 21 is being reproduced and displayed, on the basis of the link information file 19 stored on the recording medium 10.

(Step S3001) First, the control unit 110 causes the reproduction processing unit 115 to reproduce and display the still picture file 21 shown in FIG. 7. The control unit 110 then advances to Step S3002. Here, the control unit 110 stores the file name of the still picture file 21 in the internal memory.

(Step S3002) The control unit 110 determines whether or not the user performs an operation of the still picture moving picture linkage function via the input unit 109. When the operation of the still picture moving picture linkage function is performed, the control unit 110 advances to Step S3010. When the operation of the still picture moving picture linkage function is not performed, the control unit 110 advances to Step S3003.

(Step S3003) The control unit 110 determines whether or not the user performs a still picture display completion operation via the input unit 109. When the still picture display completion operation is performed, the control unit 110 ends the still picture display (Step S3004). When the still picture display completion operation is not performed, the control unit 110 returns to Step S3001 to repeat the process from reproducing and displaying the next still picture file.

(Step S3010) Upon detecting that the user instructs to start the still picture moving picture linkage function in Step S3002, the control unit 110 executes a still picture moving picture linkage reproduction process of Steps S3010 to S3012. First, the control unit 110 causes the reproduction processing unit 115 to read the link information file 19 (00000.link) in the LINKCTL main folder. On the basis of the file name (IMGA0012.JPG) of the still picture file 70 being reproduced, the control unit 110 obtains the file name (02000.clpi) of the moving picture clip information file 14 from the item of the moving picture clip information file name 92 in the link information file 19, and the still-picture-corresponding PTS 61 (0x000023003) from the item of the still-picture-corresponding PTS 93 in the link information file 19. The control unit 110 then advances to Step S3011.

(Step S3011) The control unit 110 reads the moving picture clip information file 14 to enable the stored time table to be searched. As mentioned earlier, a packet number of a packet storing start data of an I frame and a PTS assigned to the I frame are associated with each other in the time table, where the packet number is counted from the start of the file.

The control unit 110 determines a predetermined linked reproduction section on the basis of the still-picture-corresponding PTS 61, as shown in FIG. 7. In detail, the control unit 110 sets, as a is reproduction start frame, an I frame 54 that is closest to a position going backward in the moving picture data from the still-picture-corresponding PTS 61 by a first section 62, and obtains a packet number of the reproduction start frame. The control unit 110 further sets, as a reproduction end frame, a frame 57 at a position going forward from the I frame 54 by a second section 63 larger than the first section 62, and obtains a packet number of the reproduction end frame. Note that the first section 62 and the second section 63 may be time information (for example, 3 seconds, 6 seconds), the number of frames, the number of packets, and the like.

(Step S3012) The control unit 110 causes the reproduction processing unit 115 to reproduce and display the stream file 15 corresponding to the moving picture clip information file 14 (02000.clpi), only for the obtained linked reproduction section. The control unit 110 then returns to Step S3003.

According to the above structure in Embodiment 1 of the present invention, on the recording medium 10 on which the DCIM main folder 401 that includes the still picture folder for storing the still picture file 70, the MOVIE main folder 402 that includes the moving picture folder for storing the moving picture file, and the LINKCTL folder that includes the link information file 19 are positioned at the same hierarchical level, the moving picture file can be reproduced using the still picture moving picture linkage function.

In detail, upon detecting the instruction to execute the still picture moving picture linkage function, the recording and reproduction apparatus 100 obtains the still-picture-corresponding PTS 61 (0x001050009) corresponding to the still picture file 70 (IMGA0011.JPG) being reproduced, from the link information file 19. The recording and reproduction apparatus 100 then obtains the packet number of the I frame 54 having a PTS of an earliest object in the range going backward from the obtained still-picture-corresponding PTS 61 in the time table by the predetermined first section 62. The recording and reproduction apparatus 100 reproduces the moving picture file up to the position going forward from the obtained packet number by the second section 63.

According to the above operation, when the still picture file 70 is designated, the linked reproduction section to be reproduced can be calculated and reproduced from the link information table shown in FIG. 5 and the time table in the clip information file 14.

Though the time table in the clip information file 14 is used here, the link information table in FIG. 5 may include a packet number so that, when synchronous imaging is performed, a packet number of an I frame is directly written to the link information table. This makes it unnecessary to search the time table, thereby producing an advantageous effect of a shorter processing time before starting moving picture reproduction.

(3. Link Information File Modification Method Upon File Deletion)

The following describes an operation of deleting the still picture file 70 or the moving picture file by the recording and reproduction apparatus 100 in Embodiment 1 of the present invention, with reference to drawings. In more detail, this is an operation of modifying the link information file 19, when the recording medium 10 on which the DCIM main folder 401 including the subfolder for storing the still picture file 70, the MOVIE folder 402 including the plurality of subfolders for storing the moving picture file, and the link information file 19 generated by the recording and reproduction apparatus 100 in Embodiment 1 of the present invention are positioned at the same hierarchical level is connected.

The following describes the operation of modifying the link information file 19 by the recording and reproduction apparatus 100 in Embodiment 1 of the present invention, with reference to drawings.

Figure 9:
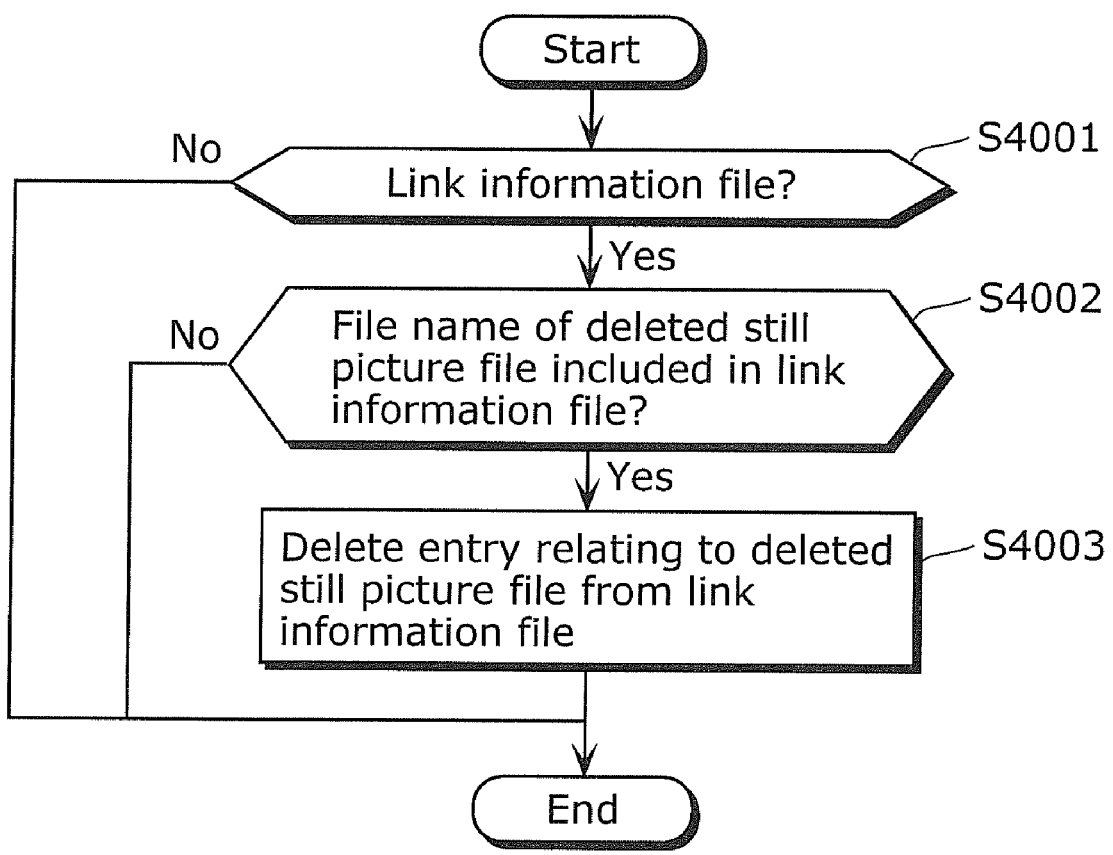
FIG. 9 is a flowchart showing a modification operation of the link information file upon deletion of the still picture file recorded on the recording medium, when the recording medium is connected to the recording and reproduction apparatus.

FIG. 9 is a flowchart showing the modification operation of the link information file 19 upon deletion of the still picture file 70 stored on the recording medium 10, when the recording medium 10 is connected to the recording and reproduction apparatus 100.

(Step S4001) First, upon detecting an operation signal of deleting the still picture file via the input unit 109, the control unit 110 determines whether or not the link information file 19 (00000.link) exists on the recording medium 10. When the link information file 19 exists, the control unit 110 advances to Step S4002. When the link information file 19 does not exist, the control unit 110 ends the operation.

(Step S4002) Next, the control unit 110 determines whether or not the link information having the file name of the deleted still picture file 70 is included in the link information file 19. When the link information is included in the link information file 19, the control unit 110 advances to Step S4003. When the link information is not included in the link information file 19, the control unit 110 ends the operation.

(Step S4003) The control unit 110 deletes the link information relating to the deleted still picture file 70 from the link information file 19, and ends the operation. For example, upon detecting that IMGA0015.JPG is deleted, the control unit 110 deletes the bottom row in FIG. 5.

In the case of deleting the moving picture file, too, the control unit 110 performs the same process as in the case of the still picture file 70 described above, thereby modifying the link information file.

(4. Link Information File Consistency Check and Repair Method when Recorded Medium is Connected)

The following describes an operation of checking the consistency of the link information file 19 and, in the case where inconsistency is detected, repairing the link information file 19 by the recording and reproduction apparatus 100 in Embodiment 1 of the present invention, with reference to drawings.

Figure 10:
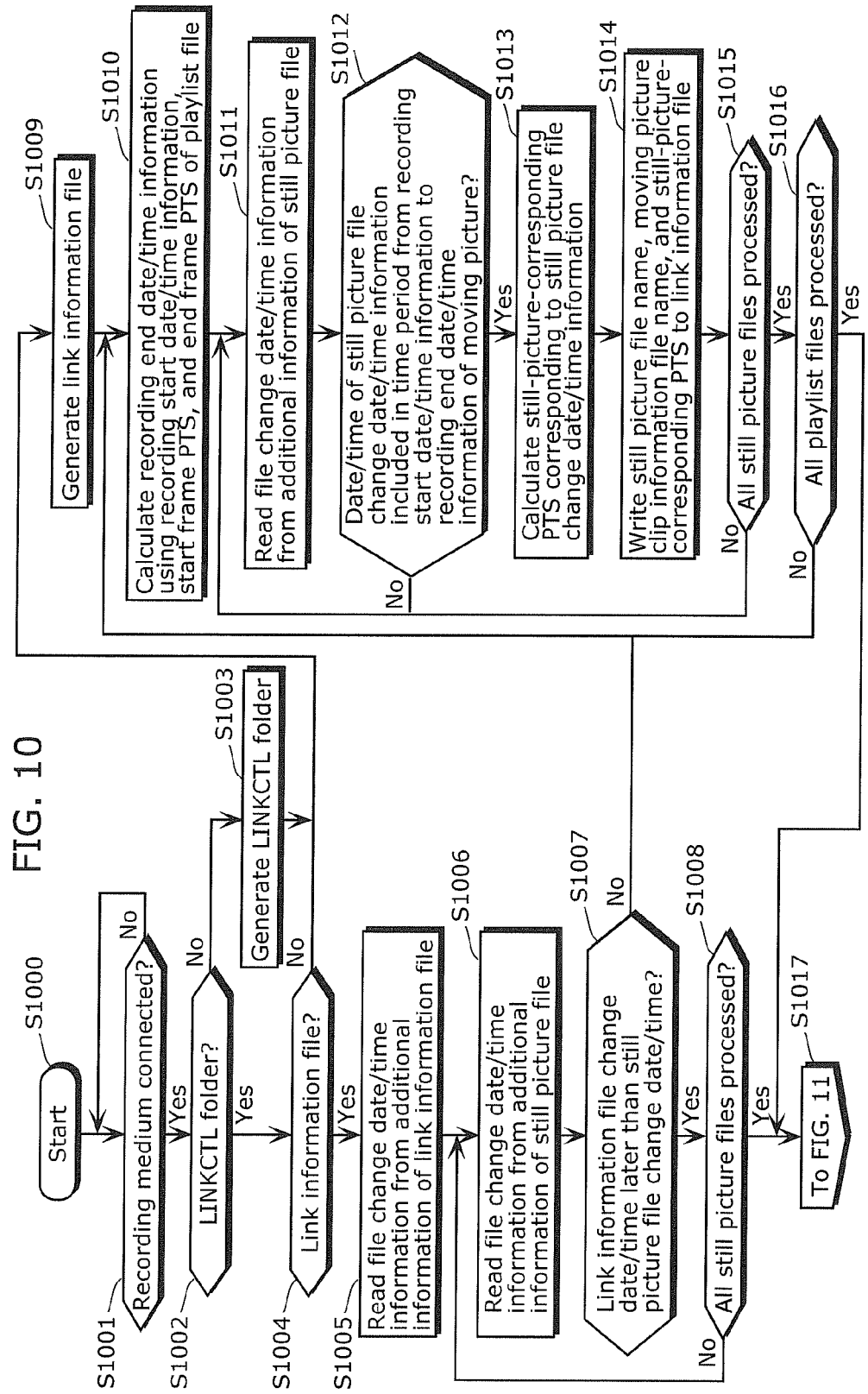
FIG. 10 is a first flowchart showing an operation of checking, when the recording medium is connected to the recording and reproduction apparatus, whether or not the link information file exists on the recording medium, and repairing the link information file when the link information file does not exist or there is inconsistency between the link information and the still picture file or the moving picture file.
Figure 11:
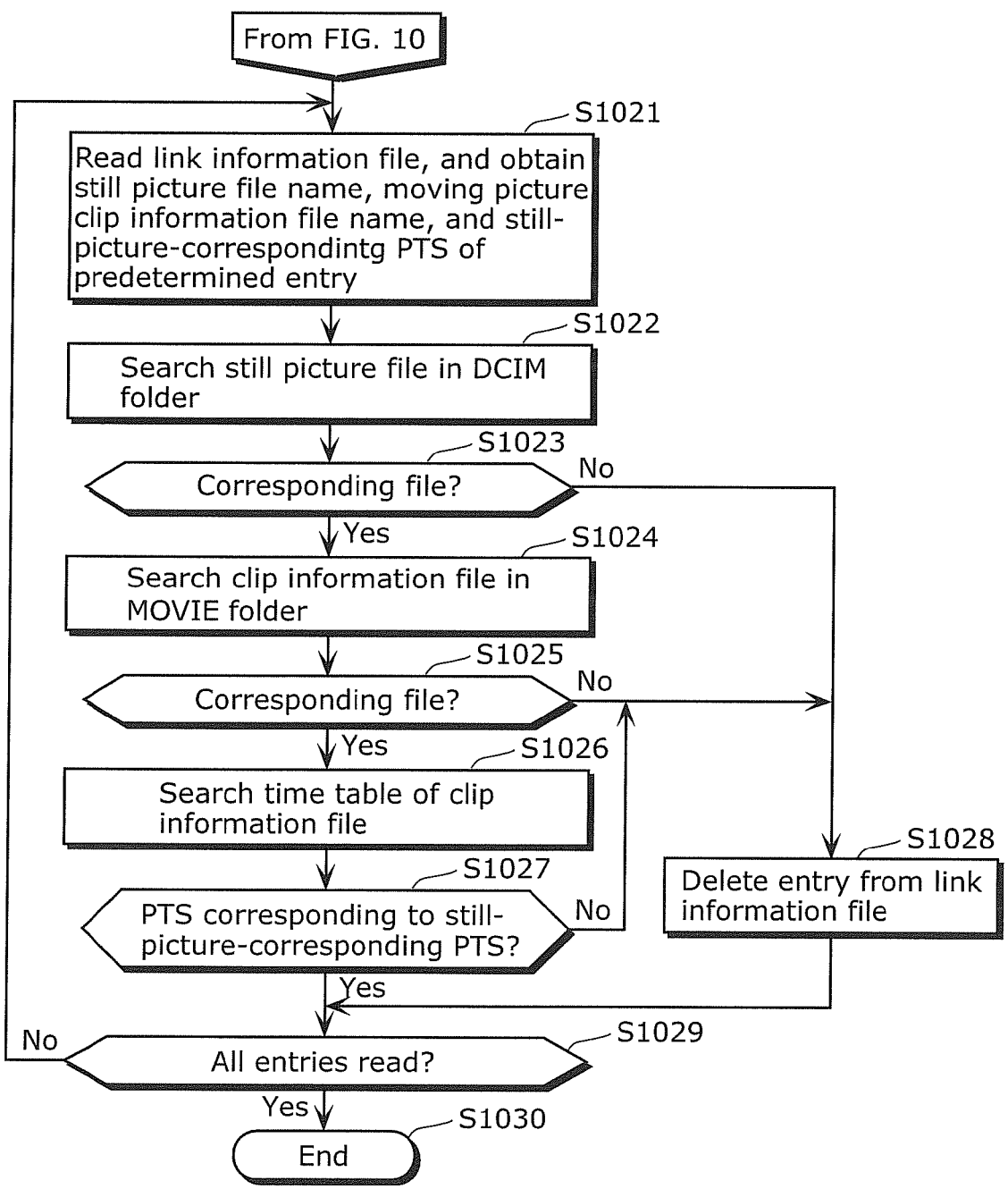
FIG. 11 is a second flowchart showing the operation of checking, when the recording medium is connected to the recording and reproduction apparatus, whether or not the link information file exists on the recording medium, and repairing the link information file when the link information file does not exist or there is inconsistency between the link information and the still picture file or the moving picture file.

FIGS. 10 and 11 are flowcharts showing an operation of checking whether or not the link information file 19 exists on the recording medium 10 when the recording medium 10 is connected to the recording and reproduction apparatus 100 and, in the case where the link information file 19 does not exist or there is inconsistency between the link information and the still picture file or between the link information and the moving picture file, repairing the link information file 19.

(Step S1000) For example, the recording and reproduction apparatus 100 starts this process immediately after activation completion.

(Step S1001) The recording and reproduction apparatus 100 detects whether or not the recording medium 10 on which the DCIM main folder 401 and the MOVIE folder 402 are positioned at the same hierarchical level is connected. When detecting the connection of the recording medium 10, the recording and reproduction apparatus 100 advances to Step S1002.

(Step S1002) The recording and reproduction apparatus 100 detects whether or not the LINKCTL main folder exists on the recording medium 10. When the LINKCTL main folder exists, the recording and reproduction apparatus 100 advances to Step S1004. When the LINKCTL main folder does not exist, the recording and reproduction apparatus 100 generates the LINKCTL main folder (Step S1003), and advances to Step S1009.

(Step S1004) The recording and reproduction apparatus 100 further detects whether or not the link information file 19 exists in the LINKCTL main folder. When the link information file 19 exists, the recording and reproduction apparatus 100 advances to Step S1005. When the link information file 19 does not exist, the recording and reproduction apparatus 100 advances to Step S1009.

(Step S1005) Next, the control unit 110 causes the reproduction processing unit 115 to read the file change date/time information from the additional information of the link information file 19. The control unit 110 then advances to Step S1006.

(Step S1006) Following this, the control unit 110 causes the reproduction processing unit 115 to read the file change date/time information from the additional information of the still picture file 70. The control unit 110 then advances to Step S1007.

(Step S1007) The control unit 110 compares the file change date/time information of the link information file 19 with the file change date/time information of the still picture file 70. When the file change date/time information of the link information file 19 is earlier than the file change date/time information of the still picture file 70, the control unit 110 advances to Step S1010. When the file change date/time information of the link information file 19 is later than the file change date/time information of the still picture file 70, the control unit 110 advances to Step S1008.

(Step S1008) The control unit 110 repeats Steps S1006 and S1007 for each still picture file 70. Having completed the process for all still picture files 70, the control unit 110 advances to the process in FIG. 11 (Step S1017).

(Step S1009) When the link information file 19 does not exist, the control unit 110 generates the link information file 19. The control unit 110 then advances to Step S1010.

(Step S1010) The control unit 110 causes the reproduction processing unit 115 to read each playlist file 13 in order of increasing file number, and performs a loop process of Steps S1010 to S1016. First, the control unit 110 reads the recording start date/time information, the start frame PTS, and the end frame PTS from the playlist file 13. On the basis of the read information, the control unit 110 calculates recording end date/time information in seconds in the moving picture data stored in the MOVIE main folder 402, according to Math. 1. The control unit 110 then advances to Step S1011. Note that the control unit 110 may instead cause the reproduction processing unit 115 to read each playlist file 13 in order of decreasing file number.

[Math. 1]

$$\text{(Recording end date/time information)} = \text{(recording start date/time information)} + ((\text{end frame } PTS) - (\text{start frame } PTS))/27 \text{ MHz} \quad \text{(Math. 1)}$$

(Step S1011) Next, the control unit 110 causes the reproduction processing unit 115 to read the file change date/time information from the additional information of the still picture file 70. The control unit 110 then advances to Step S1012. Here, the information read in Step S1006 may be stored in the memory or the like and put to use.

(Step S1012) The control unit 110 determines whether or not the clip corresponding to the playlist file 13 includes the imaging time of the still picture file 70, by comparing the recording start date/time information read in Step S1010, the recording end date/time information calculated in Step S1010, and the file change date/time information of the still picture file 70 read in Step S1011. When determining that the clip includes the imaging time of the still picture file 70, the control unit 110 advances to Step S1013. When determining that the clip does not include the imaging time of the still picture file 70, the control unit 110 returns to Step S1011 to perform the process for the next still picture file 70.

(Step S1013) The control unit 110 calculates the still-picture-corresponding PTS corresponding to the file change date/time information of the still picture file 70 through the recording processing unit 106, according to Math. 2. The control unit 110 then advances to Step S1014.

[Math. 2]

$$\text{(Still-picture-corresponding } PTS) = \text{(start frame } PTS) + \left( \frac{\text{(file change date/time)} -}{\text{(recording start date/time)}} \right) \times 27 \text{ MHz} \quad \text{(Math. 2)}$$

(Step S1014) The control unit 110 generates, in the link information file 19, the link information including the still-picture-corresponding PTS (0x001050009) calculated in Step S1013, the file name (IMGA0011.JPG) of the still picture file 70, the file name (01000.clpi) of the clip information file 14 of the moving picture file, and the reproduction flag information 94. Note that the reproduction flag information 94 is set to the default flag value "1" indicating that the moving picture is to be reproduced, or set beforehand on a menu screen or the like.

(Step S1015) The control unit 110 repeats the entry generation process from Step S1011 onward, for each still picture file 70 included in the DCIM main folder 401.

(Step S1016) Having performed the entry generation process for all playlist files 13, the control unit 110 ends the process of generating the link information file 19 and adding missing link information, and advances to the process in FIG. 11 (Step S1017).

FIG. 11 is a flowchart showing the process of deleting link information for which no corresponding still picture file 70 or moving picture file exists, after the process of generating the link information file 19 and adding missing link information in FIG. 10.

(Step S1021) The control unit 110 reads the link information file 19, and obtains the still picture file name 91, the moving picture clip information file name 92, and the still-picture-corresponding PTS 93. The control unit 110 then advances to Step S1022.

(Step S1022) The control unit 110 searches each still picture file 70 in the DCIM main folder 401 for the same file as the still picture file name 91 read in Step S1021, and determines whether or not the corresponding file exists (Step S1023). When the corresponding file exists, the control unit 110 advances to Step S1024. When the corresponding file does not exist, the control unit 110 advances to Step S1028.

(Step S1024) The control unit 110 searches each clip information file 14 in the MOVIE main folder 402 for the same file as the moving picture clip information file name 92 read in Step S1021, and determines whether or not the corresponding file exists (Step S1025). When the corresponding file exists, the control unit 110 advances to Step S1026. When the corresponding file does not exist, the control unit 110 advances to Step S1028.

(Step S1026) The control unit 110 searches the time table in the clip information file 14 of the file name read in Step S1021 for the PTS corresponding to the still-picture-corresponding PTS read in Step S1021, and determines whether or not the corresponding PTS exists (Step S1027). When the corresponding PTS exists, the control unit 110 determines that the link information read in Step S1021 is valid, and advances to Step S1029. When the corresponding PTS does not exist, the control unit 110 advances to Step S1028.

(Step S1028) In the case where the corresponding file or PTS does not exist in any of Steps S1023, S1025, and S1027, the control unit 110 deletes the link information from the link information file 19. The control unit 110 then advances to Step S1029.

(Step S1029) The control unit 110 repeats the process from Step S1021 onward, for each set of link information in the link information file 19. Having completed the reading of all sets of link information, the control unit 110 ends the consistency check and repair process for the link information file 19 (Step S1030).

As a result of the above process, the link information file 19 that properly reflects the contents of the DCIM main folder 401 and the MOVIE folder 402 at the time of connection is recorded on the connected recording medium 10.

When the recording medium 10 on which the still picture file 70 and the moving picture file have already been recorded is connected, the recording and reproduction apparatus 100 of the above structure reads the file change date/time information showing the imaging time from the additional information of the still picture file 70. The recording and reproduction apparatus 100 calculates the recording end date/time information of the moving picture, from the recording start date/time information, the start frame PTS, and the end frame PTS included in the playlist file 13.

Following this, the recording and reproduction apparatus 100 determines whether or not the clip corresponding to the playlist file 13 includes the imaging time of the still picture file 70, from the recording start date/time information, the recording end date/time information, and the file change date/time information of the still picture. When determining that the imaging time is included, the recording and reproduction apparatus 100 calculates the still-picture-corresponding PTS corresponding to the file change date/time information of the still picture file 70. The recording and reproduction apparatus 100 then combines the calculated still-picture-corresponding PTS 93, the still picture file name 91, the moving picture clip information file name 92, and the reproduction flag information 94, thereby generating or editing one set of link information in the link information file 19.

According to the above structure, even in the case where a folder or a file recorded on the recording medium 10 is deleted by a still picture recording and reproduction apparatus that supports only the conventional still picture recording standard or deleted or edited by a moving picture recording and reproduction apparatus that supports only the conventional moving picture recording standard, no contradiction arises on the part that complies with the conventional standard, and also the link information file 19 can be easily repaired to the state in which the still picture moving picture linkage function can be achieved.

Note that the recording and reproduction apparatus 100 in Embodiment 1 of the present invention may be provided with a start button and the like for receiving, from the user, an instruction to start generating the link information file 19 or to start repairing the link information file 19. In this case, when the start button is operated by the user, the recording and reproduction apparatus 100 determines whether or not the recording medium 10 is connected, as in the flowcharts shown in FIGS. 10 and 11. When the recording medium 10 is connected, the recording and reproduction apparatus 100 executes Steps S1002 to S1029. This allows the link information file 19 to be generated or repaired at an arbitrary time designated by the user.

(5. Digest Reproduction Using Link Information File)

The recording and reproduction apparatus 100 is capable of the digest reproduction function that sequentially reproduces linked reproduction sections while skipping a section between the linked reproduction sections, thereby reproducing only scenes which the user wants to view. An example of this is described below.

Figure 12:
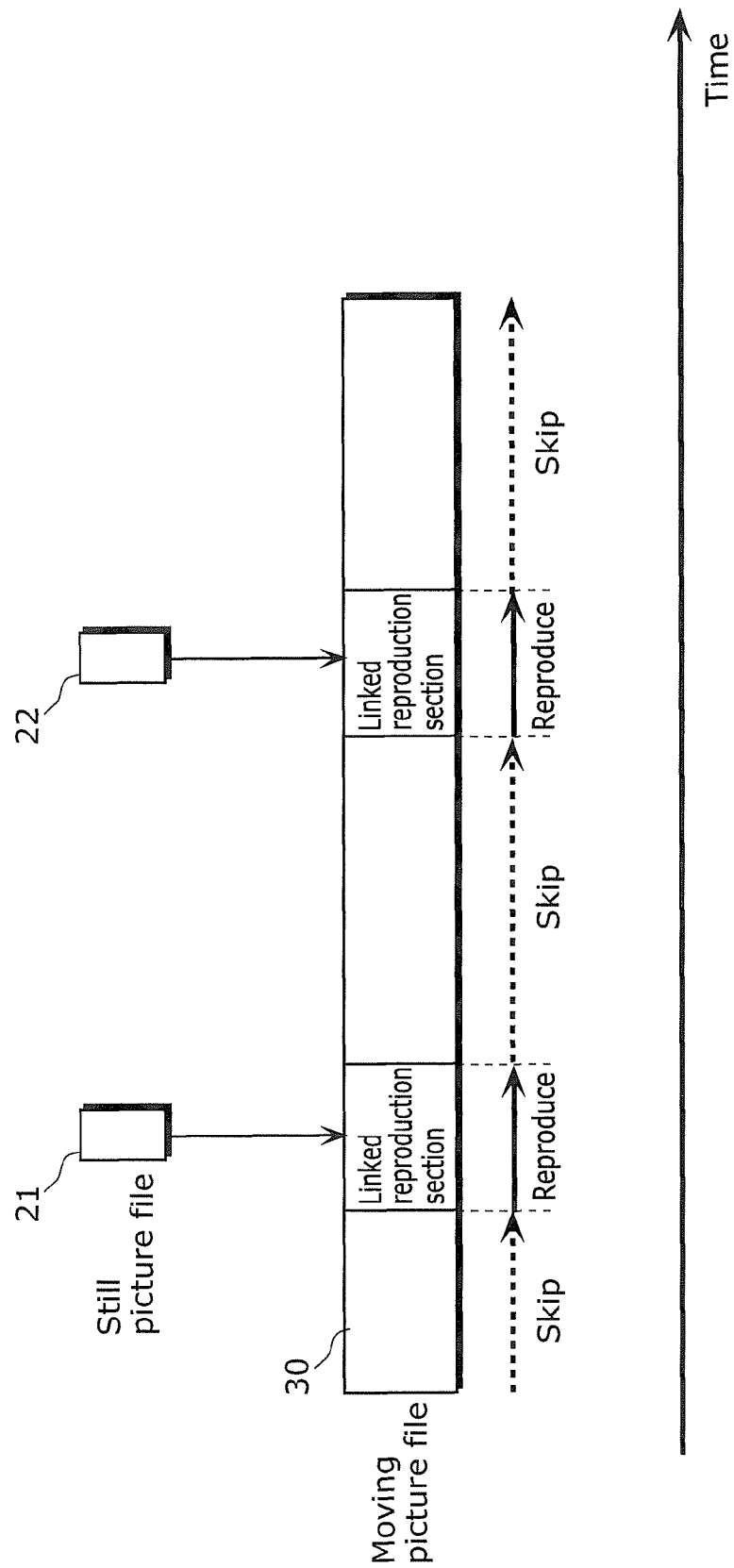
FIG. 12 is a diagram showing an overview of a digest reproduction function in Embodiment 1 of the present invention.

FIG. 12 is a diagram showing an overview of the digest reproduction function. The imaging times of the still picture files 21 and 22 imaged synchronously with the moving picture file 30 can be considered to correspond to time periods that include the contents which the user wants to view as the moving picture file 30, too. This being so, the digest reproduction function of reproducing only the desired scenes can be achieved by sequentially reproducing, in the moving picture file 30, the moving picture data imaged around the synchronous imaging times, namely, the linked reproduction sections, while skipping the section between the linked reproduction sections.

In Embodiment 1 of the present invention, the reproduction flag information 94 is provided in the link information table in FIG. 5. When executing synchronous imaging, this reproduction flag information 94 is always set to the value indicating "reproduced" ("1" in this example). In the case of executing digest reproduction, each set of link information whose reproduction flag information 94 is "1" is obtained, and reproduction is sequentially performed according to the procedure in FIG. 8. Thus, digest reproduction can be achieved.

Alternatively, the digest reproduction flag 95 may be added to the link information table in FIG. 5, as shown in FIG. 13. This allows the reproduction flag information 94 to be used solely for editing whether or not each individual scene is to be reproduced upon reproducing the moving picture file, with it being possible to produce an advantageous effect of separately setting whether or not digest reproduction is to be performed.

Figure 14:
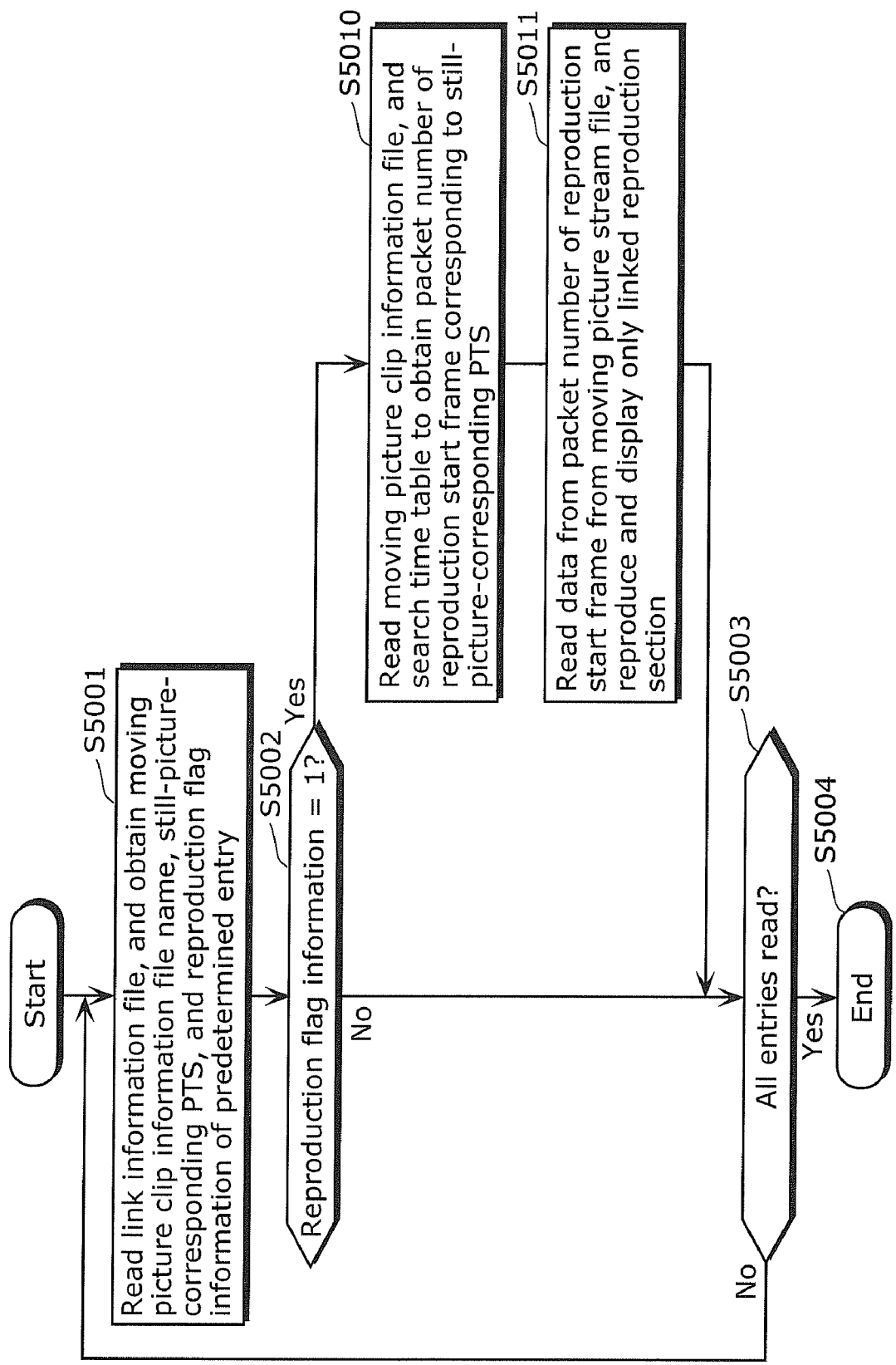
FIG. 14 is a flowchart showing a digest reproduction process.

FIG. 14 is a flowchart for such digest reproduction. The following description is based on an assumption that the link information table shown in FIG. 5 is used.

(Step S5001) First, the control unit 110 causes the reproduction processing unit 115 to read the link information file 19 (00000.link) in the LINKCTL main folder, and obtain the moving picture clip information file name 92 (01000.clpi), the still-picture-corresponding PTS 93 (0x001050009), and the reproduction flag information 94 (0) included in the first link information. The control unit 110 then advances to Step S5002.

(Step S5002) The control unit 110 checks the value of the reproduction flag information 94. When the reproduction flag information 94 is "1" indicating that the moving picture is to be reproduced, the control unit 110 advances to Step S5010. When the reproduction flag information 94 is "0" indicating that the moving picture is not to be reproduced, the control unit 110 advances to Step S5003.

(Step S5003) When the reading of all sets of link information has not been completed, the control unit 110 returns to Step S5001 to read the next link information. When the reading of all sets of link information has been completed, on the other hand, the control unit 110 ends the digest reproduction process (Step S5004).

For example, in the case of the link information table in FIG. 5, the reproduction flag information 94 of the first link information is "0", so that the control unit 110 advances to Step S5003. Since all sets of link information have not been read, the control unit 110 returns to Step S5001 to read the next link information. Upon reading the third link information whose reproduction flag information is "1", the control unit 110 stores the moving picture clip information file name (02000.clpi) and the still-picture-corresponding PTS 93

(0x000056027) of the third link information in the internal memory, and advances to Step S5010.

(Step S5010) The control unit 110 reads the clip information file 14 of the file name obtained from the link information whose reproduction flag information 94 is "1", to enable the stored time table to be searched. As mentioned earlier, a packet number of a packet storing start data of an I frame and a PTS assigned to the I frame are associated with each other in the time table, where the packet number is counted from the start of the file. As shown in FIG. 7, the control unit 110 sets, as a reproduction start I frame, the I frame 54 having the earliest (smallest) PTS when going backward in the time table from the still-picture-corresponding PTS 61 by the first section 62, and obtains a packet number of the reproduction start I frame. The control unit 110 then advances to Step S5011.

(Step S5011) The control unit 110 causes the reproduction processing unit 115 to reproduce and display the stream file 15 corresponding to the moving picture clip information file 14 (02000.clpi) only for the second section 63 from the obtained packet number. The control unit 110 then returns to Step S5003.

This produces the following advantageous effect. When actually performing digest reproduction, in the case where there is a scene not very interesting as moving picture data despite synchronous imaging of still picture data, such a scene can be skipped in subsequent digest reproduction by operating the recording and reproduction apparatus 100 to rewrite the reproduction flag information 94 to "0".

There is also the following advantageous effect. The information for realizing such digest reproduction does not adversely affect an operation when the recording medium 10 is connected to another recording and reproduction apparatus that supports only the conventional still picture standard or moving picture standard.

Furthermore, the provision of the reproduction flag information 94 in the link information table makes it possible to edit whether or not each individual scene is to be reproduced at the time of digest reproduction. For example, to realize such editing by editing the playlist file 13 (01001.plst) stored in the playlist folder (PLAYLIST), it is necessary to perform complex editing and recording of the information about the moving picture data reproduction order, which causes a significant processing load on the recording and reproduction apparatus 100 that is portability-oriented. According to the structure of Embodiment 1, however, an advantageous effect of realizing such editing with a small processing load can be attained.

Note that the linked reproduction section may be arbitrarily set by the user through the recording and reproduction apparatus 100, or set beforehand according to the performance of the recording and reproduction apparatus 100.

As described above, according to the recording and reproduction apparatus 100 in Embodiment 1, by performing an operation such as pressing a button when desired still picture data is being displayed during sequential display of still picture data, the still picture moving picture linkage function of starting reproducing moving picture data near the desired still picture data can be achieved.

Moreover, the moving picture position corresponding to the still picture data can be directly specified from the moving picture clip information file name 92 and the still-picture-corresponding PTS 93, which contributes to high-speed processing. An increase in the number of files merely causes an increase in the number of rows of the link information table in FIG. 5. Since there is no need to search the moving picture file or the additional information from the information added to the still picture data to specify the moving picture position as has been conventionally done, a decrease in processing speed can be prevented.

Besides, even when an apparatus that supports only the conventional still picture standard or moving picture standard performs reproduction, editing, or file deletion on the recording medium 10 recorded by the recording and reproduction apparatus 100, no contradiction arises on the part that complies with the conventional standard, and also the still picture moving picture linkage function can be easily repaired upon connection of the recording medium 10.

Furthermore, the digest reproduction function can be achieved by sequentially reproducing neighborhoods of scenes imaged as still pictures. The information for realizing such digest reproduction does not adversely affect an operation when the recording medium 10 is connected to a recording and reproduction apparatus that supports only the conventional still picture standard or moving picture standard.

In addition, the provision of the reproduction flag information 94 or the digest reproduction flag 95 in the link information table makes it possible to edit whether or not each individual scene is to be reproduced at the time of digest reproduction. For example, to realize such editing by editing the playlist file 13 (01001.plst) stored in the playlist folder (PLAYLIST), it is necessary to perform complex editing and recording of the information about the moving picture data reproduction order, which causes a significant processing load on the recording and reproduction apparatus 100 that is portability-oriented. According to the structure of Embodiment 1, however, such editing can be realized with a small processing load.

Though the above describes the case where the recording and reproduction apparatus 100 is a video camera, the recording and reproduction apparatus is not limited to this. Moreover, the recording and reproduction apparatus does not need to have all functions including still picture imaging and moving picture imaging. As an example, the following describes the case of realizing the present invention as a stationary link information generation apparatus that has only the editing function.

Figure 15:
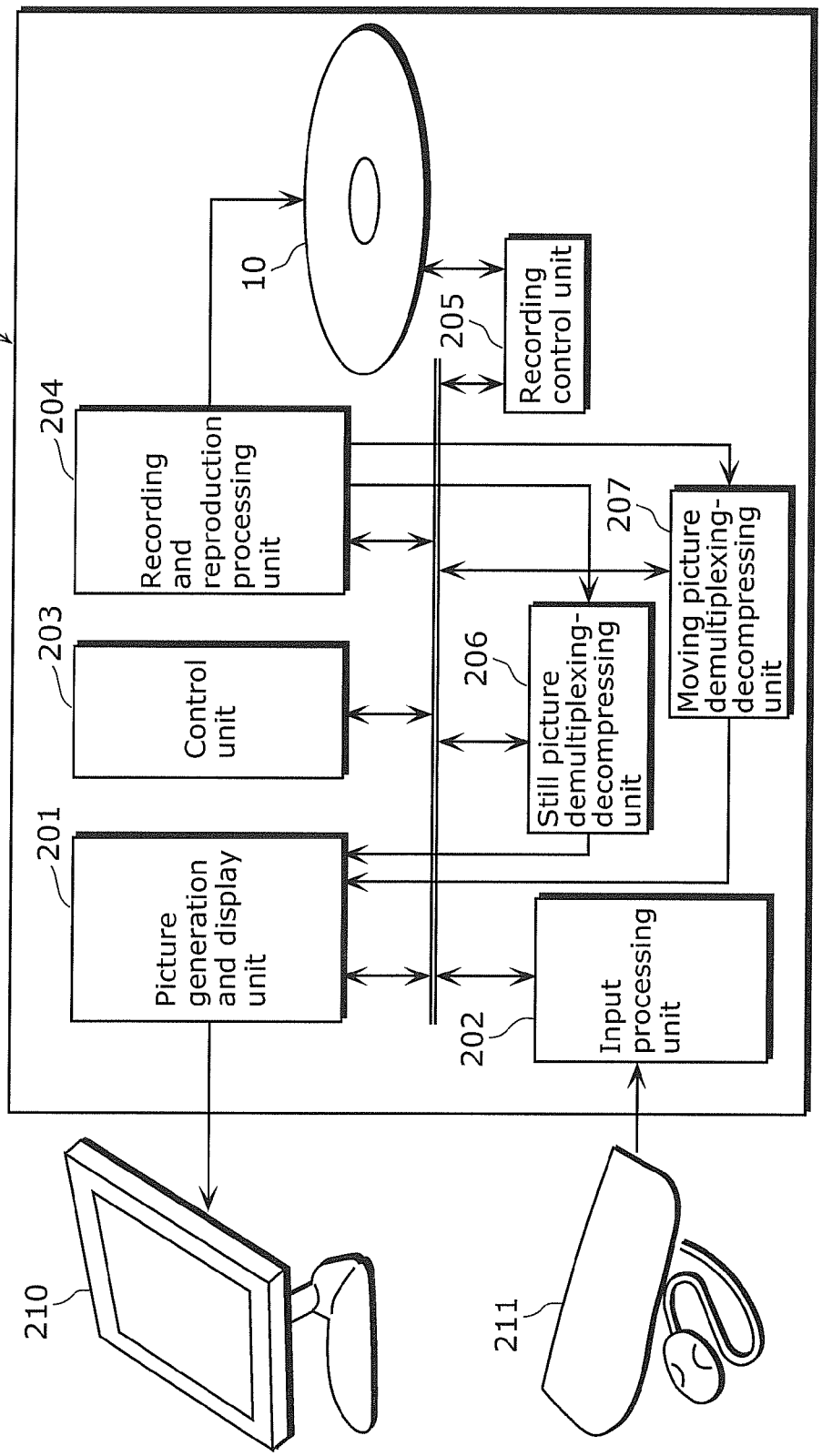
[FIG 15]

FIG. 15 is a diagram showing a hardware structure of a link information generation apparatus 200 in Embodiment 1 of the present invention. The following describes an apparatus that generates link information, when the recording medium 10 on which the still picture and the moving picture with audio have been recorded by the recording and reproduction apparatus 100 having the synchronous imaging function is connected.

As shown in FIG. 15, the link information generation apparatus 200 includes a picture generation and display unit 201, an input processing unit 202, a control unit 203, a recording and reproduction processing unit 204, a recording control unit 205, a still picture demultiplexing-decompressing unit 206, a moving picture demultiplexing-decompressing unit 207, and the like. The link information generation apparatus 200 also connects to and uses a display device 210, an input device 211, and the like outside the apparatus.

Each unit of the link information generation apparatus 200 operates under control of the control unit 203. For instance, the control unit 203 may be composed of a CPU capable of executing software. The picture generation and display unit 201 generates a GUI screen for allowing the user to select an operation, and outputs the GUI screen to the external display device 210. The input processing unit 202 obtains an input operation from the user via the external input device 211, and outputs the input operation to the control unit 203.

The control unit 203 has the same functional blocks as in FIG. 3B, though the moving picture recording unit 1111, the still picture recording unit 1112, and the like can be omitted.

The recording and reproduction processing unit 204 performs a file operation designated by the control unit 203, on the recording medium 10. Moreover, the recording and reproduction processing unit 204 reads still picture data to be reproduced from the recording medium 10, and outputs the still picture data to the still picture demultiplexing-decompressing unit 206. The recording and reproduction processing unit 204 also reads moving picture data to be reproduced from the recording medium 10, and outputs the moving picture data to the moving picture demultiplexing-decompressing unit 207.

The recording control unit 205 controls a drive device for driving the recording medium 10, or a recording protocol such as a recording address input procedure.

The still picture demultiplexing-decompressing unit 206 demultiplexes and decompresses the still picture data outputted from the recording and reproduction processing unit 204, according to the coding method such as JPEG used at the time of recording. The still picture demultiplexing-decompressing unit 206 outputs a still picture signal obtained as a result of decompression, to the picture generation and display unit 201.

The moving picture demultiplexing-decompressing unit 207 demultiplexes and decompresses the moving picture data outputted from the recording and reproduction processing unit 204, according to the coding method such as MPEG-2 or H.264 used at the time of recording. The moving picture demultiplexing-decompressing unit 207 outputs moving picture data obtained as a result of decompression, to the picture generation and display unit 201.

The link information generation apparatus 200 of the above structure does not include the imaging unit 102 and the like, and therefore does not have the function of imaging still picture data and moving picture data. However, the link information generation apparatus 200 is capable of operations such as reproduction by the still picture moving picture linkage function, file deletion and editing and associated link information file modification, link information file consistency check and repair upon connection of the recorded medium, digest reproduction using the link information file, editing of the reproduction flag information or the digest reproduction flag, and so on. For the portable recording and reproduction apparatus 100, the link information generation apparatus 200 can be realized as a PC editing system with a substantial user interface, as an example.

Note that the still picture demultiplexing-decompressing unit 206 and the moving picture demultiplexing-decompressing unit 207 in the link information generation apparatus 200 are described as independent processing means. Realizing these units as hardware (integrated circuit) produces an advantageous effect of shortening a time required for picture display and, especially in the case of the moving picture demultiplexing-decompressing unit 207, displaying a high-resolution moving picture such as HDTV in real time.

As an alternative, these units may each be realized as software that runs on the control unit 203. In this case, though the control unit 203 needs to have extremely high processing performance in order to display moving picture data in real time, there is an advantageous effect of allowing the link information generation apparatus 200 to be realized by a typical personal computer.

Embodiment 2

Support for High-speed Imaging

The following describes a recording and reproduction apparatus 300 in Embodiment 2 of the present invention, with reference to drawings. The recording and reproduction apparatus 300 in Embodiment 2 is capable of supporting for a picture imaged at high speed, in addition to the operation of the recording and reproduction apparatus 100 in Embodiment 1.

Figure 16:
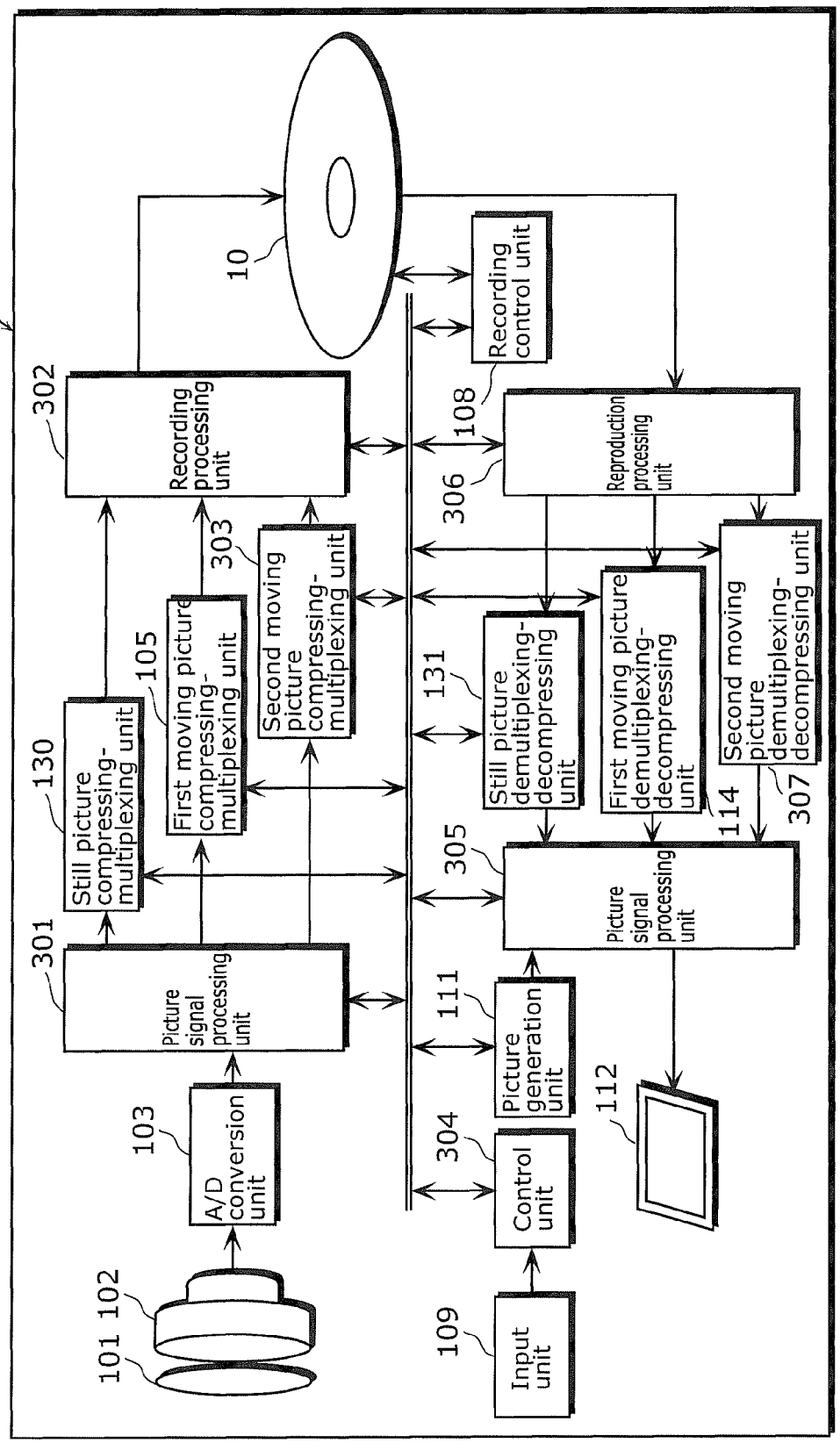
FIG. 16 is a diagram showing a hardware structure of a recording and reproduction apparatus in Embodiment 2 of the present invention.

FIG. 16 is a diagram showing a hardware structure of the recording and reproduction apparatus 300 in Embodiment 2 of the present invention. Note that the same components as the hardware structure in Embodiment 1 are given the same reference numerals and their detailed description is omitted.

The recording and reproduction apparatus 300 in Embodiment 2 differs from the recording and reproduction apparatus 100 in Embodiment 1 in that a picture signal processing unit 301, a recording processing unit 302, a second moving picture compressing-multiplexing unit 303, a control unit 304, a picture signal processing unit 305, a reproduction processing unit 306, and a second moving picture demultiplexing-decompressing unit 307 corresponding to high-speed imaging are included. Note that a first moving picture compressing-multiplexing unit 105 and a first moving picture demultiplexing-decompressing unit 114 are the same as the moving picture compressing-multiplexing unit 105 and the moving picture demultiplexing-decompressing unit 114 in FIG. 3A.

The picture signal processing unit 301 performs processing such as noise removal and picture quality adjustment, on a digital signal outputted from the A/D conversion unit 103. In the case of still picture imaging, the picture signal processing unit 301 outputs a still picture signal to the still picture compressing-multiplexing unit 130. In the case of moving picture imaging, the picture signal processing unit 301 outputs a moving picture signal to the first moving picture compressing-multiplexing unit 105 and the second moving picture compressing-multiplexing unit 303.

Figure 17:
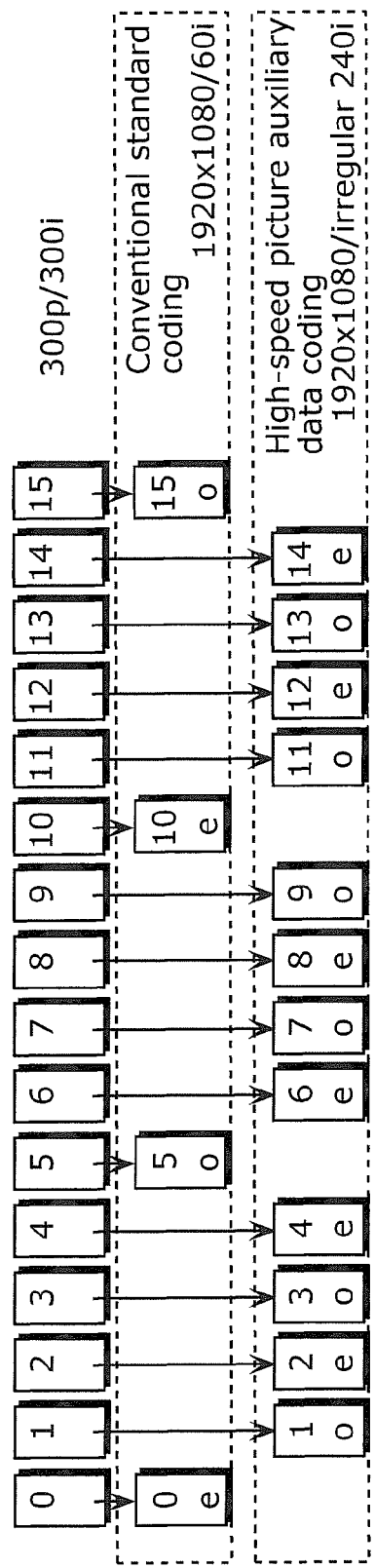
FIG. 17 is a diagram showing an overview of a process in a picture signal processing unit, a first compressing-multiplexing unit, and a second compressing-multiplexing unit in Embodiment 2 of the present invention.

In the case of normal-speed imaging, the picture signal processing unit 301 outputs the moving picture signal only to the first moving picture compressing-multiplexing unit 105. The moving picture signal outputted here may be an interlaced picture of 60 fields per second (hereafter referred to as a 60i picture) obtained by extracting every five frames from a progressive scan picture of 300 frames per second (hereafter referred to as a 300p picture) and alternately taking out only even lines or odd lines for the extracted frames, as shown in FIG. 17. Alternatively, the moving picture signal may be a 60i picture obtained by taking out one field of picture for every five fields from an interlaced scan picture of 300 fields per second (hereafter referred to as a 300i picture).

Note that, since the 60i picture is a video signal in compliance with a conventional standard such as BD or AVCHD, the 60i picture can be subject to compression coding according to the conventional standard in the first moving picture compressing-multiplexing unit 105 and directly recorded, as a moving picture file, on the recording medium 10 in a recording format corresponding to the conventional standard.

In the case of high-speed imaging, on the other hand, the 60i picture is outputted to the first moving picture compressing-multiplexing unit 105, and the rest of the 300p picture of high-speed imaging from which the 60i picture has been taken out is outputted to the second moving picture compressing-multiplexing unit 303. That is, an interlaced picture of 240 fields per second (hereafter referred to as a 240i picture) obtained by alternately taking out only even lines or odd lines from a picture signal of four frames between every five frames is outputted to the second moving picture compressing-multiplexing unit 303.

As shown in FIG. 17, these 240 fields per second are not at regular intervals, but constitute an irregular 240*i* picture. Alternatively, the irregular 240*i* picture may be obtained by taking out the rest of the 300*i* picture of high-speed imaging from which the 60*i* picture has been taken out, that is, by taking out four fields between every five fields.

This irregular 240*i* picture does not comply with the conventional standard. However, since there is still a frame-field correlation, the irregular 240*i* picture can be compression-coded by the second moving picture compressing-multiplexing unit 303 according to hybrid coding such as MPEG-2 or H.264, and recorded on the recording medium 10 in an independent format as a high-speed imaging auxiliary file.

The second moving picture compressing-multiplexing unit 303 compresses and multiplexes a picture signal that is outputted from the picture signal processing unit 301 and composed of frames which are not compressed by the first moving picture compressing-multiplexing unit 105 during high-speed imaging, according to the coding method such as MPEG-2 or H.264. The second moving picture compressing-multiplexing unit 303 outputs a picture signal obtained as a result of multiplexing, to the recording processing unit 302 as a high-speed imaging auxiliary file.

The recording processing unit 302 records still picture data outputted from the still picture compressing-multiplexing unit 130, moving picture data outputted from the first moving picture compressing-multiplexing unit 105, and high-speed imaging auxiliary data outputted from the second moving picture compressing-multiplexing unit 303, on the recording medium 10 according to file structures set by their respective standards.

The control unit 304 executes a recording process, a reproduction process, and the like in the recording and reproduction apparatus 300, by controlling the picture signal processing unit 301, the still picture compressing-multiplexing unit 130, the first moving picture compressing-multiplexing unit 105, the recording processing unit 302, the second moving picture compressing-multiplexing unit 303, the recording control unit 108, the picture generation unit 111, the picture signal processing unit 305, the still picture demultiplexing-decompressing unit 131, the first moving picture demultiplexing-decompressing unit 114, the reproduction processing unit 306, and the second moving picture demultiplexing-decompressing unit 307.

Note that the control unit 304 has the same functional blocks as in FIG. 3B. However, the moving picture specification unit 1131 specifies a high-speed imaging auxiliary file corresponding to a moving picture file that includes a still-picture-linked moving picture, in addition to the above function. Likewise, the link information generation unit 1133 generates link information including high-speed moving picture identification information for identifying the high-speed imaging auxiliary file specified by the moving picture specification unit 1131, in addition to the above function.

The picture signal processing unit 305 performs processing, such as picture quality adjustment for display, on a still picture signal outputted from the still picture demultiplexing-decompressing unit 131 as a result of decompressing still picture data, and outputs the processed still picture signal to the display unit 112. The picture signal processing unit 305 also performs processing, such as picture quality adjustment for display, on a moving picture signal outputted from the first moving picture demultiplexing-decompressing unit 114 as a result of decompressing moving picture data (normal reproduction data), and outputs the processed moving picture signal to the display unit 112. In the case of obtaining high-speed imaging auxiliary data from the second moving picture demultiplexing-decompressing unit 307, the picture signal processing unit 305 generates a smooth slow reproduction picture using the moving picture signal and the high-speed imaging auxiliary data according to need, and outputs the slow reproduction picture to the display unit 112. The picture signal processing unit 305 further outputs a menu picture or the like generated by the picture generation unit 111 according to need to the display unit 112 as a picture signal, as it is or in a state of being superimposed on a decompressed still picture signal outputted from the still picture demultiplexing-decompressing unit 131 or a decompressed moving picture signal outputted from the first moving picture demultiplexing-decompressing unit 114.

The second moving picture demultiplexing-decompressing unit 307 demultiplexes and decompresses the high-speed imaging auxiliary data outputted from the reproduction processing unit 306, according to the coding method such as MPEG-2 or H.264 used by the second moving picture compressing-multiplexing unit 303. The second moving picture demultiplexing-decompressing unit 307 outputs high-speed imaging auxiliary data obtained as a result of decompression, to the picture signal processing unit 305.

The reproduction processing unit 306 reads a moving picture file to be reproduced from the recording medium 10, and outputs the moving picture file to the first moving picture demultiplexing-decompressing unit 114. The reproduction processing unit 306 also reads a high-speed imaging auxiliary file relating to the moving picture data to be reproduced from the recording medium 10, and outputs the high-speed imaging auxiliary file to the second moving picture demultiplexing-decompressing unit 307.

The following describes a file structure of the recording medium 10 in Embodiment 2 of the present invention, with reference to drawings.

Figure 18:
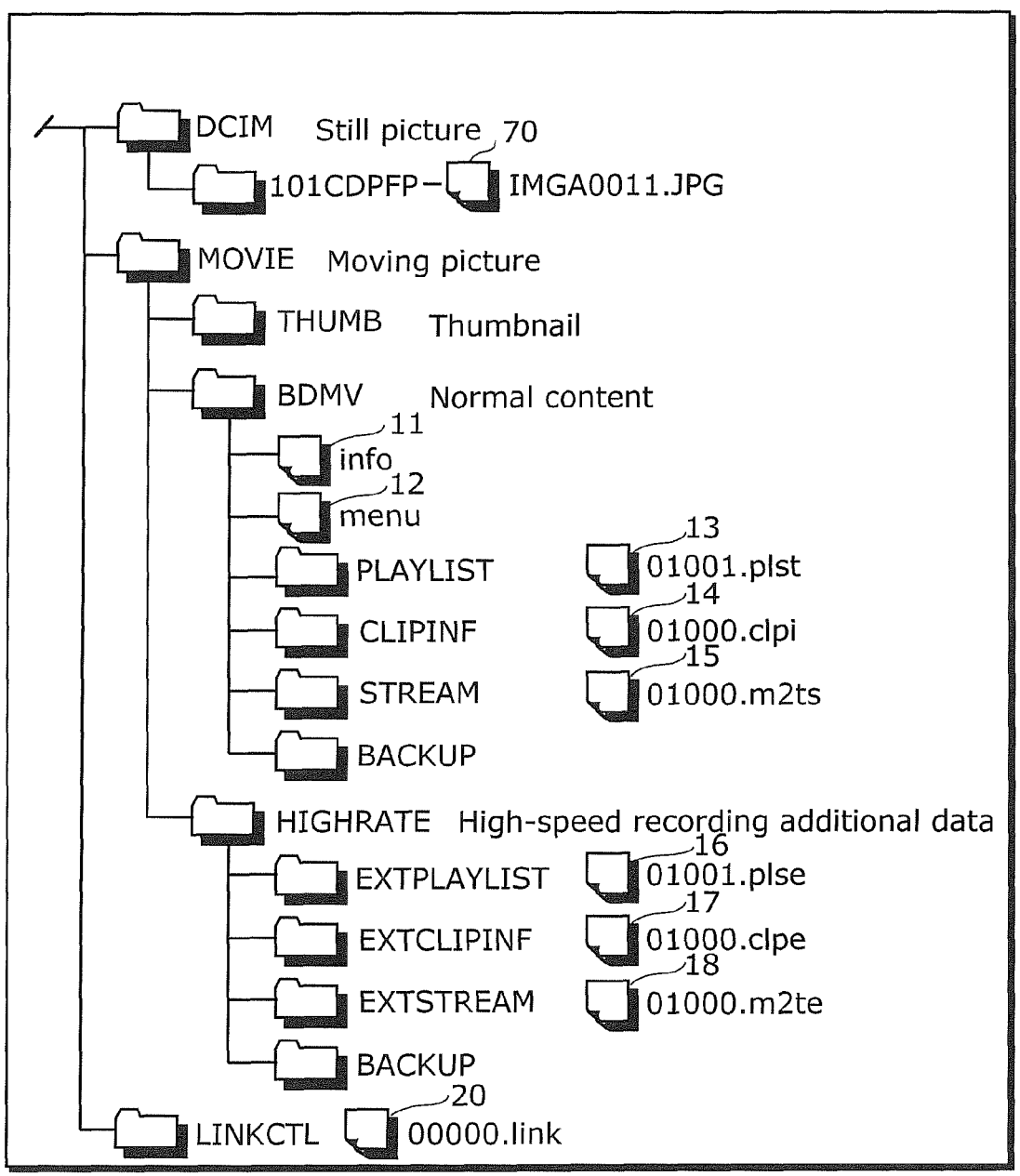
FIG. 18 is a diagram showing an example of a file structure recorded on a recording medium in Embodiment 2 of the present invention.

FIG. 18 is a diagram showing an example of the file structure recorded on the recording medium 10 in Embodiment 2. As shown in FIG. 18, the recording medium 10 has a file structure of storing the still picture file 70 according to the DCF standard, as an example. Since this file structure is the same as in Embodiment 1, its detailed description is omitted.

The moving picture file is a file in which moving picture data, attached information, and an audio signal are multiplexed according to MPEG-2 Systems, and is stored under a MOVIE main folder, as in Embodiment 1. The MOVIE main folder has a folder structure in which a thumbnail folder (THUMB), a content folder (BDMV) for storing a normal moving picture file, and a HIGHRATE folder for storing a high-speed imaging auxiliary file are provided at a lower hierarchical level.

Note that Embodiment 2 is not limited to a structure in which the HIGHRATE folder is positioned immediately under the MOVIE main folder. Instead, the HIGHRATE folder may be generated immediately under a root folder so as to be positioned at the same hierarchical level as the DCIM main folder, the MOVIE folder, and a LINKCTL folder.

In the case of storing the normal moving picture file, the BDMV folder has the same file structure as described in Embodiment 1 with reference to FIG. 4, and so its detailed description is omitted.

The HIGHRATE folder has a folder structure including a playlist folder (EXTPLAYLIST), a clip information folder (EXTCLIPINF), a stream folder (EXTSTREAM), a backup folder (BACKUP), and the like, as with the folder structure of the BDMV folder.

Moreover, a playlist file 16 (01001.plse) and the like are stored in the playlist folder (EXTPLAYLIST). A clip information file 17 (01000.clpe) and the like are stored in the clip information folder (EXTCLIPINF). A stream file 18 (01000.m2te) and the like are stored in the stream folder (EXTSTREAM).

The playlist file 16 (01001.plse) includes information relating to reproduction order of picture frames or fields for a high-speed imaging picture, and the like.

The clip information file 17 (01000.clpe) includes a time table that associates time information with a position of picture data and realizes partial reproduction and special reproduction, and the like.

The stream file 18 (01000.m2te) includes a high-speed imaging auxiliary file.

Furthermore, the LINKCTL main folder is provided to record linkage information between the still picture file stored in the DCIM main folder, the moving picture file stored in the MOVIE main folder, and the high-speed imaging auxiliary file stored in the HIGHRATE folder. A link information file 20 (00000.link) is stored in the LINKCTL main folder. Note that the link information file 20 may be positioned immediately under the root folder side by side with the DCIM main folder and the MOVIE main folder, without providing the LINKCTL main folder.

FIG. 19 is a diagram showing an example of a structure of a link information table stored in the link information file 20. In addition to the still picture file name 91, the moving picture clip information file name 92, the still-picture-corresponding PTS 93, and the reproduction flag information 94 shown in Embodiment 1, a high-speed imaging auxiliary file name 96 is registered in each set of link information in the link information table. By adding the high-speed imaging auxiliary file name 96 to the link information, a reproduction position of the high-speed imaging auxiliary file corresponding to the still picture file 70 can be directly specified from the high-speed imaging auxiliary file name 96 and the still-picture-corresponding PTS 93. This produces an advantageous effect of accelerating file search. Moreover, a "high-speed imaging" icon for smooth slow reproduction display can be displayed on the display screen of the still picture data shown in FIG. 2. In the case where the high-speed imaging icon is displayed, normal reproduction or slow reproduction can be selected by an operation upon reproducing the moving picture.

(1. Link Information File Generation Method when Unused Medium is Connected to Recording and Reproduction Apparatus Capable of High-speed Imaging)

The following describes a picture recording operation when the recording medium 10 on which still picture data and moving picture data have not been recorded yet is connected to the recording and reproduction apparatus 300 in Embodiment 2 of the present invention.

In Embodiment 2, it is assumed that normal imaging or high-speed imaging is selected before performing imaging. In this case, when performing high-speed imaging, high-speed imaging auxiliary data corresponding to one clip of moving picture data is generated. The clip information file 17 and a reproduction time of the high-speed imaging auxiliary data usable upon reproduction in correspondence with the moving picture data are shown in the playlist file 16 of the high-speed imaging auxiliary data. Here, the reproduction time is expressed in units of high-speed imaging frames.

A basic process in this case is the same as the process described in Embodiment 1 with reference to FIG. 6. The process in Embodiment 2 differs from that in Embodiment 1, only in the following two points.

(1) In the process of recording the moving picture (Steps S2001, S2002, and S2006), the normal moving picture file (the stream file 15, the clip information file 14, and the playlist file 13) is recorded in the BDMV main folder, and simultaneously the high-speed imaging auxiliary file (the stream file 18, the clip information file 17, and the playlist file 16) is recorded in the HIGHRATE main folder.

When doing so, the corresponding files between the normal moving picture file and the high-speed imaging auxiliary file have the same file name except the file name extension. For instance, in FIG. 18, when the playlist file 13 of the normal moving picture file has the file name 01001.plst, the corresponding playlist file 16 of the high-speed imaging auxiliary file is generated with the file name 01001.plse. The same applies to the clip information file and the stream file.

(2) When writing the entry to the link information file 20 in Step S2013, the high-speed imaging auxiliary file name 96 is written, too. In the case of performing still picture/moving picture synchronous imaging not during high-speed imaging but during normal imaging, the high-speed imaging auxiliary file name 96 is set to "No_file".

According to the above structure, it is possible to produce an advantageous effect of enabling the recording and reproduction apparatus 300 capable of high-speed imaging to generate the link information file 20, with there being no need for substantial processing addition.

(2. Moving Picture File Reproduction Method Using Link Information File In Recording and Reproduction Apparatus Capable of High-speed Imaging)

The following describes the recording and reproduction apparatus 300 in Embodiment 2 of the present invention that, when the recording medium 10 having the file structure shown in FIG. 18 is connected, reproduces a normal moving picture file or a high-speed imaging moving picture file imaged near an imaging time of still picture data being reproduced, with reference to drawings. It is assumed here that the link information file 20 shown in FIG. 19 is recorded on the recording medium 10.

First, the reproduction of the normal moving picture file is described below, with reference to drawings.

Figure 20:
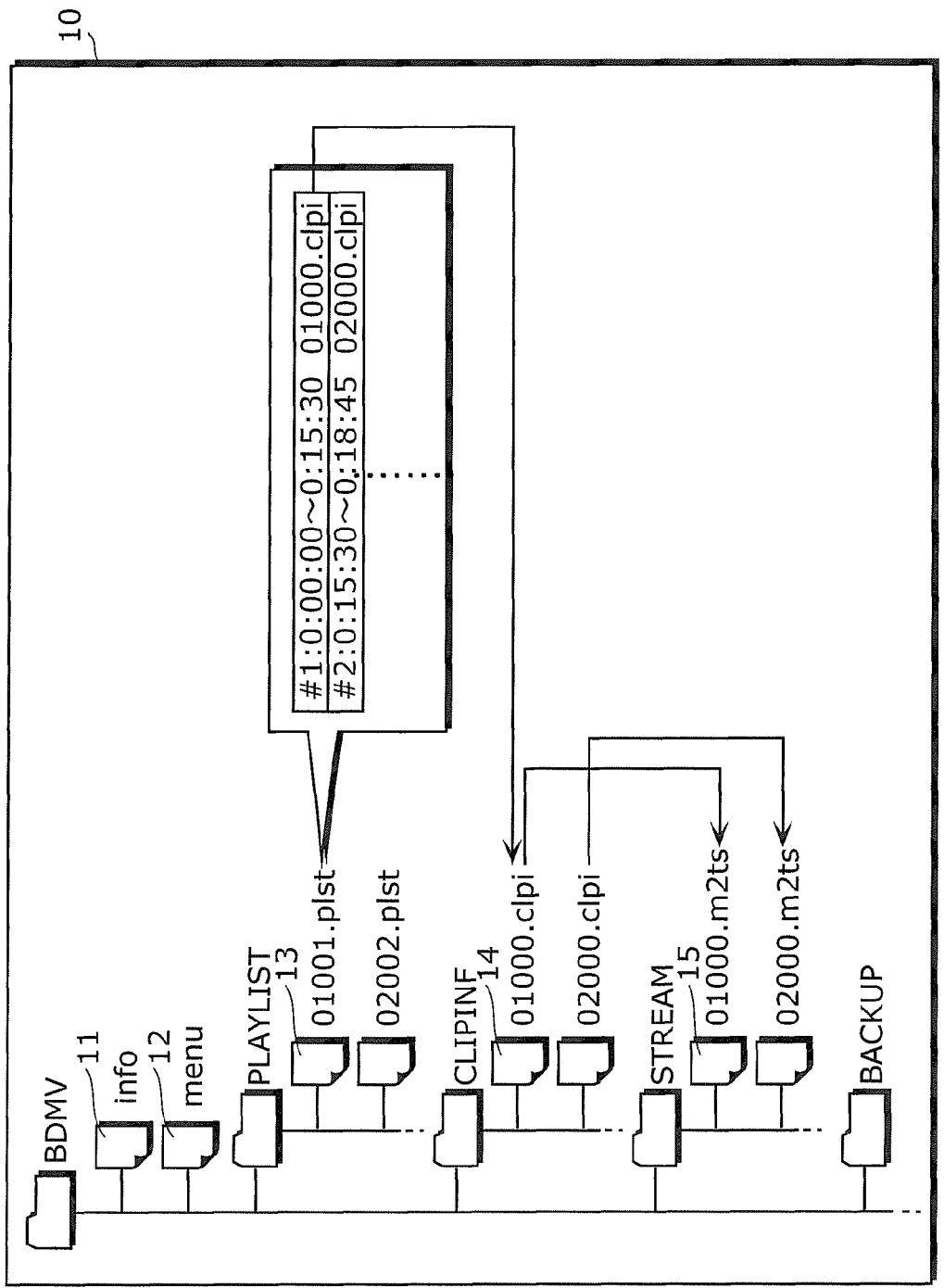
FIG. 20 is a diagram explaining relations of files under a BDMV folder in the file structure in FIG. 18.

FIG. 20 is a diagram explaining relations of files under the BDMV folder in the file structure in FIG. 18. In the case of reproducing only the normal moving picture file, the control unit 304 uses the playlist file 13, the clip information file 14, and the stream file 15 for reproduction control.

The clip information file 14 to be reproduced and the reproduction time are written in the playlist file 13. When this playlist file 13 is reproduced, the indicated clip information file 14 is referenced, and the stream file 15 designated using information such as the time table of the clip information file 14 is reproduced.

For instance, the playlist file 13 (01001.plst) indicates that clips #1, #2, and the like are reproduced in this order. For the clip #1, the stream file 15 (01000.m2ts) associated by the clip information file 14 (01000.clpi) is reproduced. For the clip #2, the stream file 15 (02000.m2ts) associated by the clip information file 14 (02000.clpi) is reproduced.

By conforming this file structure under the BDMV folder to the folder structure of the conventional standard, even in the case where the recording medium 10 is reproduced by a picture reproduction apparatus of the conventional standard incapable of high-speed imaging, a moving picture of 30 frames per second can be reproduced, and also functions such as playlist editing can be used as has been conventionally done.

Next, the reproduction of the high-speed imaging moving picture file using the high-speed imaging auxiliary file is described below, with reference to drawings.

Figure 21:
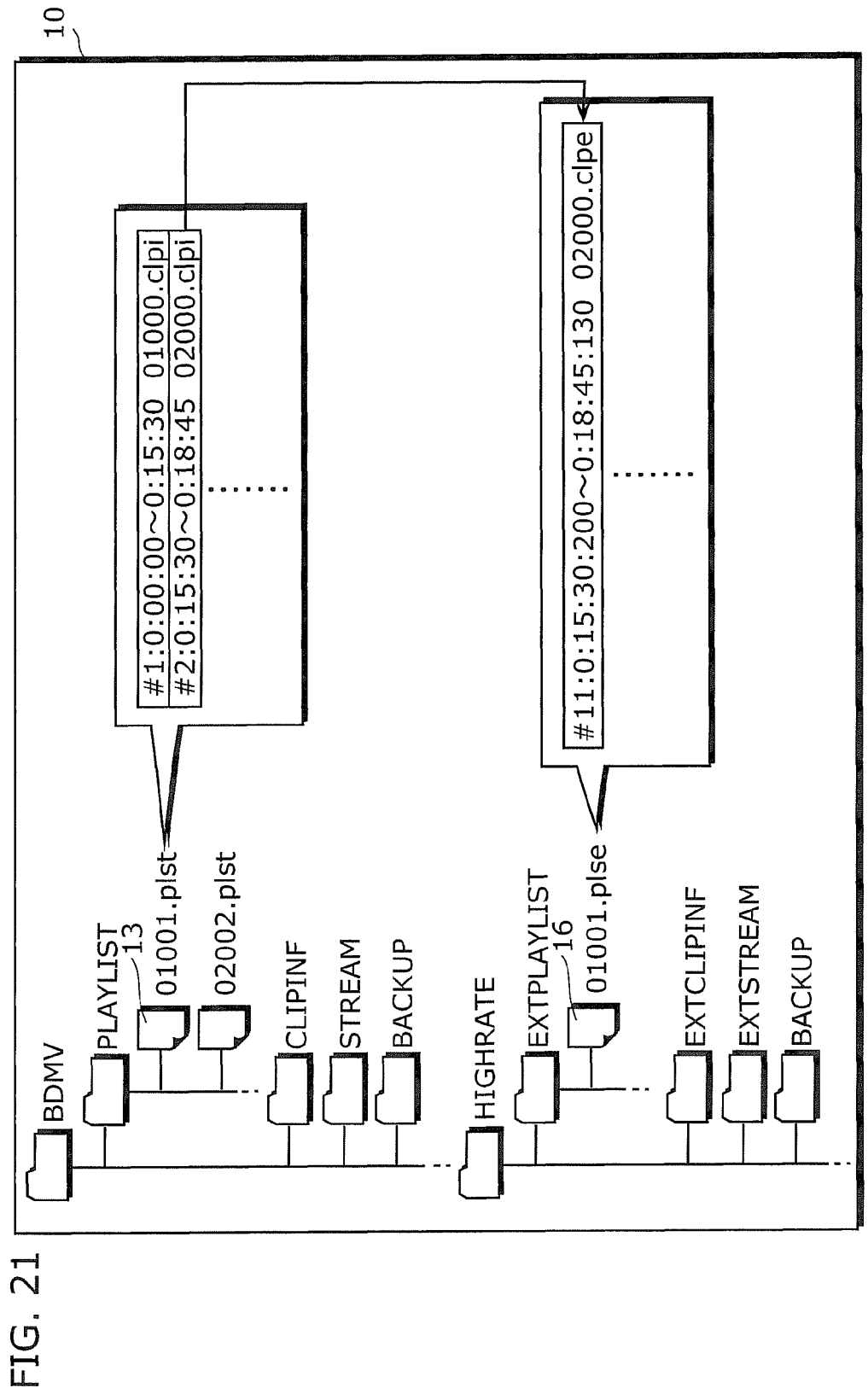
FIG. 21 is a diagram explaining relations of files under the BDMV folder and files under a HIGHRATE folder in the file structure in FIG. 18.

FIG. 21 is a diagram explaining relations of files under the BDMV folder and files under the HIGHRATE folder in the file structure in FIG. 18.

In the case of performing smooth slow reproduction using the high-speed imaging auxiliary file, the control unit 304 references the playlist file 13 under the BDMV folder. For example, when referencing the playlist file 13 (01001.plst), the control unit 304 checks the EXTPLAYLIST folder under the HIGHRATE main folder, and also references the playlist file 16 (01001.plse) having the same file number as the referenced playlist file 13.

Figure 22:
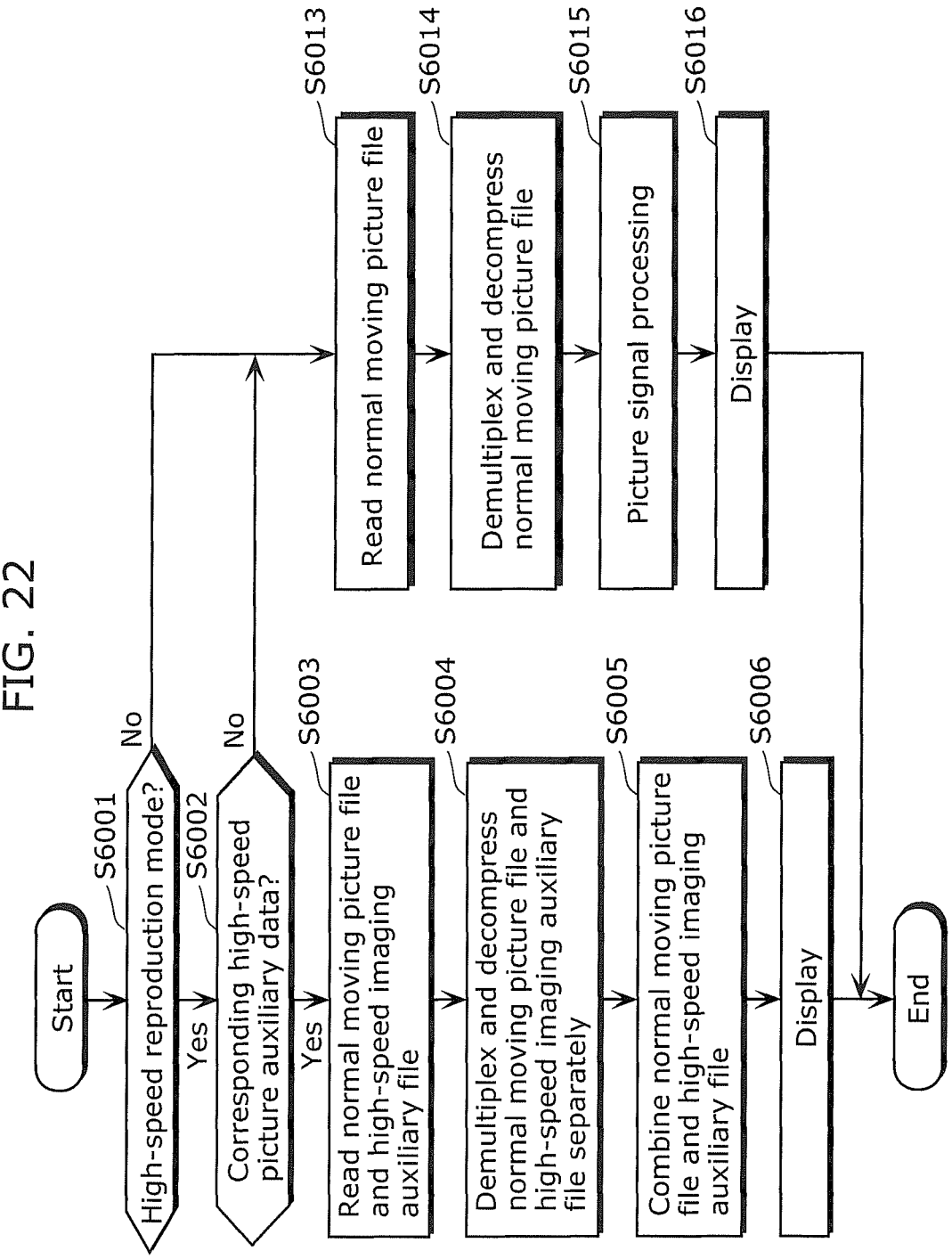
FIG. 22 is a flowchart showing a reproduction process corresponding to high-speed imaging in the case of performing reproduction using a playlist, without using the still picture moving picture linkage function.

FIG. 22 is a flowchart in the case where reproduction is performed using not the still picture moving picture linkage function but the playlist.

(Step S6001) First, the control unit 304 determines a reproduction mode set by the user via the input unit 109. When the reproduction mode is a normal reproduction mode, the control unit 304 advances to Step S6013. When the reproduction mode is a high-speed reproduction mode, the control unit 304 advances to Step S6002.

(Step S6013) Steps S6013 to S6016 constitute a process in the normal reproduction mode. The reproduction processing unit 306 reads a normal moving picture file to be reproduced, from the recording medium 10.

(Step S6014) The first moving picture demultiplexing-decompressing unit 114 demultiplexes and decompresses moving picture data included in the normal moving picture file read by the reproduction processing unit 306.

(Step S6015) The picture signal processing unit 305 performs picture signal processing such as picture quality adjustment for display, on the decompressed normal moving picture data outputted from the first moving picture demultiplexing-decompressing unit 114, thereby generating a normal reproduction picture.

(Step S6016) The display unit 112 reproduces the normal reproduction picture generated by the picture signal processing unit 305, and displays the reproduced picture on the monitor or the like.

Thus, in the normal reproduction mode, the recording and reproduction apparatus 300 reads the picture data of 30 frames per second that complies with the conventional standard from the BDMV main folder, and reproduces the read picture data.

(Step S6002) When the reproduction mode is the high-speed reproduction mode, on the other hand, the control unit 304 determines whether or not a high-speed imaging auxiliary file corresponding to a normal moving picture file to be reproduced is recorded on the recording medium 10. When the high-speed imaging auxiliary file is recorded, the control unit 304 advances to Step S6003. When the high-speed imaging auxiliary file is not recorded, the control unit 304 advances to Step S6013.

In the high-speed imaging mode, the recording processing unit 302 records a high-speed imaging auxiliary file corresponding to one clip of a normal moving picture file, in the HIGHRATE main folder. The playlist file 16 of the high-speed imaging auxiliary file shows the clip information file 17 and the reproduction time of the high-speed imaging auxiliary file usable upon reproduction in correspondence with the normal moving picture file. Note that the reproduction time shown in the playlist file 16 is expressed in units of high-speed imaging frames.

The reproduction processing unit 306 first references the playlist file 13 of the normal moving picture file and the playlist file 16 of the high-speed imaging auxiliary file.

The following describes the case of reproducing the first clip #1 included in the playlist file 13. Here, no clip corresponding to the reproduction time of the clip #1 exists in the playlist file 16 of the high-speed imaging auxiliary file. This means the clip #1 is either picture data recorded in the normal imaging mode or picture data recorded by a picture recording apparatus of the conventional standard incapable of high-speed imaging. Note that the absence of the high-speed imaging auxiliary file corresponding to the clip #1 may also be determined by reading the link information file 20 and detecting the value "No_file" in the high-speed imaging auxiliary file name 96.

Since the high-speed imaging auxiliary file is not recorded (Step S6002: No), the recording and reproduction apparatus 300 performs the same process (Steps S6013 to S6016) as the normal reproduction mode. As an alternative, in the case where the corresponding high-speed imaging auxiliary file is not recorded on the recording medium 10 (Step S6002: No), the control unit 304 may display an error message or the like to the user and end the reproduction process. As another alternative, the recording and reproduction apparatus 300 may slow-reproduce the normal moving picture file at normal frame intervals.

The following describes the case of reproducing the clip #2. A clip #11 corresponding to the reproduction time of the clip #2 exists in the playlist file 16 of the high-speed imaging auxiliary file. This means the clip #2 is picture data recorded in the high-speed imaging mode.

(Step S6003) Since the high-speed imaging auxiliary file is recorded (Step S6002: Yes), the reproduction processing unit 306 reads the normal moving picture file to be reproduced and the high-speed imaging auxiliary file relating to the normal moving picture file, from the recording medium 10. In detail, the reproduction processing unit 306 reads the stream file 18 (02000.m2te) of the high-speed imaging auxiliary file associated by the clip information file 17 (02000.clpe). The reproduction processing unit 306 also reads the stream file 15 (02000.m2ts) of the normal moving picture file associated by the clip information file 14 (02000.clpi).

(Step S6004) Next, the first moving picture demultiplexing-decompressing unit 114 demultiplexes and decompresses moving picture data included in the normal moving picture file read by the reproduction processing unit 306. Likewise, the second moving picture demultiplexing-decompressing unit 307 demultiplexes and decompresses high-speed imaging auxiliary data included in the high-speed imaging auxiliary file read by the reproduction processing unit 306.

(Step S6005) Following this, the picture signal processing unit 305 combines (that is, rearrange in chronological order in units of frames) the decompressed normal moving picture data and the decompressed high-speed imaging auxiliary data, thereby restoring a picture signal of 300 fields per second. The picture signal processing unit 305 generates a smooth slow reproduction picture from the restored picture signal of 300 fields per second.

(Step S6006) The display unit 112 reproduces the slow reproduction picture generated by the picture signal processing unit 305, and displays the reproduced picture on the monitor or the like.

Thus, in the high-speed reproduction mode, the recording and reproduction apparatus 300 reads the picture data of 30 frames per second that complies with the conventional standard from the BDMV main folder, and the high-speed imaging auxiliary file from the HIGHRATE main folder. The recording and reproduction apparatus 300 restores the high-speed picture and reproduces it, using the read picture data of 30 frames per second and high-speed imaging auxiliary file.

Note that the above processes by the reproduction processing unit 306, the first moving picture demultiplexing-decompressing unit 114, the second moving picture demultiplexing-decompressing unit 307, and the picture signal processing unit 305 are performed under control of the control unit 304.

A reproduction operation in the case where, during reproduction of a still picture file, slow reproduction is performed using a normal moving picture file and a high-speed imaging auxiliary file in Embodiment 2 of the present invention is substantially the same as the operation described in Embodiment 1 with reference to FIGS. 7 and 8. In particular, the operation is exactly the same as in Embodiment 1 when the user limits moving picture reproduction to normal reproduction, because only the moving picture data in the BDMV folder is reproduced.

On the other hand, the user can also designate slow reproduction for a high-speed imaging moving picture. In such a case, the high-speed imaging auxiliary file name 96 is registered in each set of link information in the link information table in FIG. 19. This being so, when reproducing the linked reproduction section of the normal moving picture file, the high-speed imaging auxiliary file may be reproduced, too. That is, a continuous high-speed imaging picture may be restored from the normal moving picture file and the high-speed imaging auxiliary file, with it being possible to output a smooth slow reproduction picture.

(3. Link Information File Modification Method Upon File Deletion)

The following describes an operation of deleting the still picture file or the moving picture file by the recording and reproduction apparatus 300 in Embodiment 2 of the present invention. This operation has no particular difference from the operation described in Embodiment 1 with reference to FIG. 9 except that, when deleting the moving picture file, the corresponding high-speed imaging auxiliary file is also deleted.

(4. Link Information File Consistency Check and Repair Method when Recorded Medium is Connected)

The following describes an operation of checking the consistency of the link information file 20 and, in the case where inconsistency is detected, repairing the link information file 20 by the recording and reproduction apparatus 300 in Embodiment 2 of the present invention, with reference to drawings.

Figure 23:
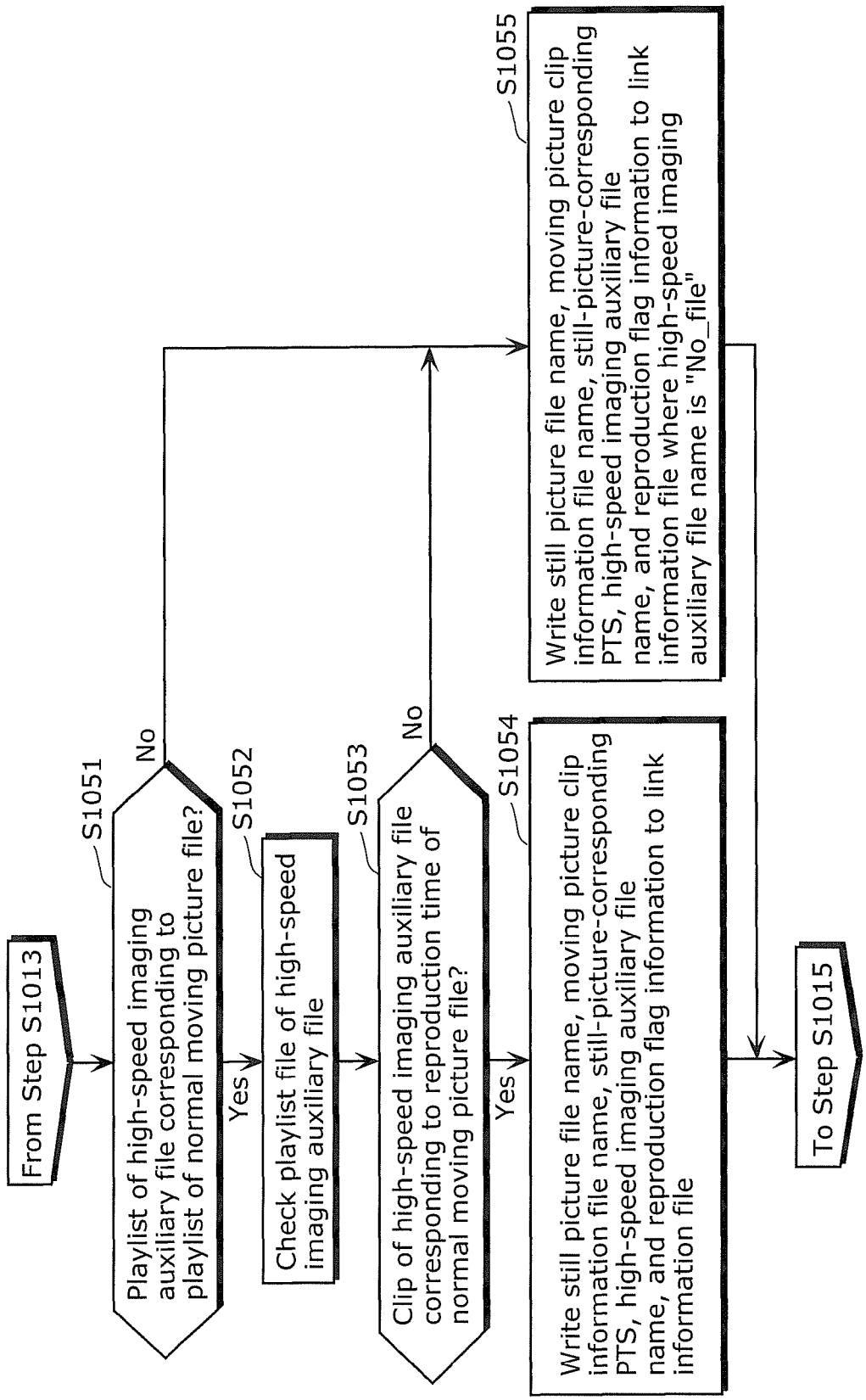
FIG. 23 is a flowchart showing an operation of checking, when the recording medium is connected to the recording and reproduction apparatus, whether or not the link information file exists on the recording medium, and repairing the link information file in the case where the link information file does not exist or there is inconsistency between link information and a still picture file, a normal moving picture file, or a high-speed imaging auxiliary file.
Figure 24:
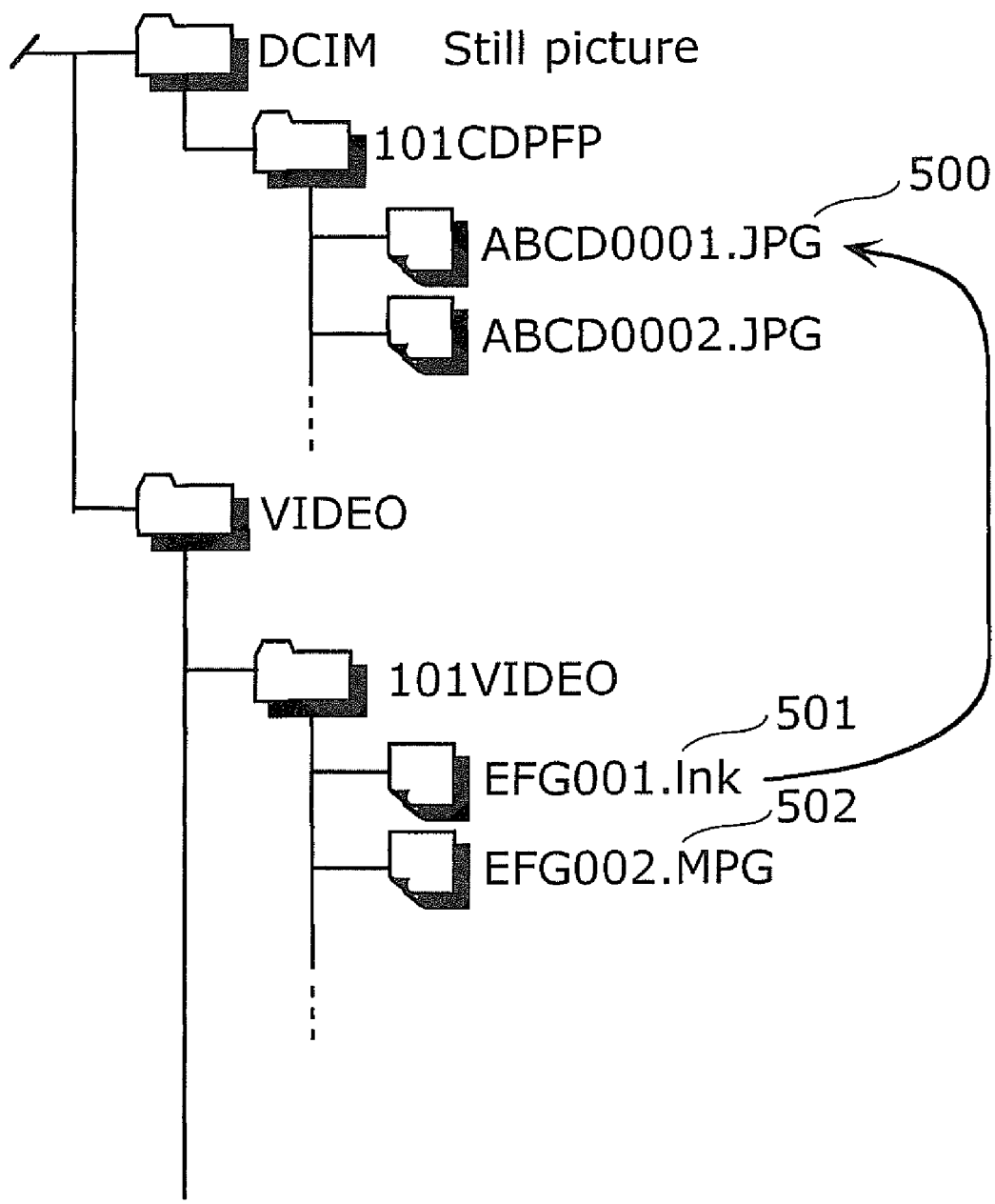
FIG. 24 is a diagram showing an example of a file structure generated by a conventional recording and reproduction apparatus.

When the recording medium 10 is connected to the recording and reproduction apparatus 300, the recording and reproduction apparatus 300 checks whether or not the link information file 20 exists on the recording medium 10. An operation of repairing the link information file 20 when the link information fife 20 does not exist or there is inconsistency between the link information and the still picture file or the moving picture file is basically the same as the operation described in Embodiment 1 with reference to FIGS. 10 and 11. However, since support for the high-speed imaging auxiliary data is necessary, only the process of Step S1014 in FIG. 10 is changed. FIG. 23 is a flowchart in the case where Step S1014 is changed to provide support for the high-speed imaging auxiliary data.

(Step S1051) After the process of Step S1013 in FIG. 10 ends, the control unit 304 checks each file name in the EXT-PLAYLIST folder, and determines whether or not the playlist file 16 of the high-speed imaging auxiliary file corresponding to the playlist file 13 of the normal moving picture file checked in Step S1010 exists. When the corresponding playlist file 16 exists, the control unit 304 advances to Step S1052. When the corresponding playlist file 16 does not exist, the control unit 304 advances to Step S1055.

(Step S1052) The control unit 304 reads the playlist file 16 of the high-speed imaging auxiliary file. The control unit 304 then advances to Step S1053.

(Step S1053) The control unit 304 checks whether or not the clip information file 17 of the high-speed imaging auxiliary file corresponding to the reproduction time of the clip information file 14 of the normal moving picture file that includes the still-picture-corresponding PTS calculated in Step S1013 exists. When the corresponding clip information file 17 exists, the control unit 304 advances to Step S1054. When the corresponding clip information file 17 does not exist, the control unit 304 advances to Step S1055.

(Step S1054) When the clip information file 17 of the high-speed imaging auxiliary file exists, the control unit 304 writes the link information including the still picture file name 91, the moving picture clip information file name 92 of the normal moving picture file, the still-picture-corresponding PTS 93, the high-speed imaging auxiliary file name 96 (the file name of the clip information file 17), and the reproduction flag information 94, to the link information file 20. The control unit 304 then advances to Step S1015.

(Step S1055) When the clip information file 17 of the high-speed imaging auxiliary file does not exist, the control unit 304 writes link information including the still picture file name 91, the moving picture clip information file name 92 of the normal moving picture file, the still-picture-corresponding PTS 93, the high-speed imaging auxiliary file name 96 ("No_file" in this case), and the reproduction flag information 94, to the link information file 20. The control unit 304 then advances to Step S1015.

According to the above structure, when the recording medium on which the still picture file 70 and the moving picture file have already been recorded is connected, the consistency between the link information file 20 and each of the still picture file 70, the normal moving picture file, and the high-speed imaging auxiliary file on the recording medium 10 can be checked and, when there is inconsistency, the link information of the link information file 20 can be repaired.

Therefore, even when a still picture recording and reproduction apparatus that supports only the conventional still picture recording standard performs file deletion on the recording medium 10 or a moving picture recording and reproduction apparatus that supports only the conventional moving picture recording standard performs file deletion or editing on the recording medium 10, no contradiction arises on the part that complies with the conventional standard, and also the link information file 20 can be easily repaired to the state in which the still picture moving picture linkage function that supports the high-speed imaging auxiliary data can be achieved.

Note that the recording and reproduction apparatus 300 in Embodiment 2 of the present invention may also be provided with a start button and the like for receiving, from the user, an instruction to start generating the link information file 20 or to start repairing the link information file 20. In this case, when the start button is operated by the user, the recording and reproduction apparatus 300 determines whether or not the recording medium 10 is connected, as in the flowcharts shown in FIGS. 10, 11, and 23. When the recording medium 10 is connected, the recording and reproduction apparatus 300 executes Steps S1002 to S1029. This allows the link information file 20 to be generated or repaired at an arbitrary time designated by the user.

As described above, according to the recording and reproduction apparatus 300 in Embodiment 2, by performing an operation such as pressing a button when desired still picture data is being displayed during sequential display of still picture data, it is possible to start reproducing a moving picture near the still picture data. In addition, in the case where the moving picture data is imaged at high speed, the still picture moving picture linkage function that supports high-speed imaging for displaying a smooth slow reproduction picture can be achieved.

Moreover, the moving picture position corresponding to the still picture data can be directly specified from the moving picture clip information file name 92 and the still-picture-corresponding PTS 93, which contributes to high-speed processing. An increase in the number of files merely causes an increase in the number of rows of the link information table in FIG. 19. That is, since there is no need to search the moving picture file or the additional information from the information added to the still picture data to specify the moving picture position as has been conventionally done, a decrease in processing speed can be prevented.

Besides, even when an apparatus that supports only the conventional still picture standard or moving picture standard performs reproduction, editing, or file deletion on the recording medium 10 recorded by the recording and reproduction apparatus 300, no contradiction arises on the part that complies with the conventional standard, and also the still picture moving picture linkage function, which supports smooth slow reproduction of a high-speed imaging moving picture, can be easily repaired when the recording medium 10 is connected.

Thus, according to the recording and reproduction apparatus 300 in Embodiment 2, the recording and reproduction apparatus 300 capable of recording a high-speed imaging picture on the recording medium 10 and reproducing a smooth slow reproduction picture can be realized. Such a smooth slow reproduction picture can also be reproduced in the still picture moving picture linkage function.

Though the above describes the case where one folder of the high-speed imaging auxiliary file corresponds to one folder of the normal moving picture file, the high-speed imaging auxiliary file may be divided into a plurality of files which are separately stored in a plurality of folders.

In Embodiments 1 and 2 of the present invention, when the recording medium 10 recorded by the recording and reproduction apparatus 100 or 300 is connected to and reproduced by a picture reproduction apparatus of the conventional standard incapable of reproducing a high-speed reproduction picture, a picture of 30 frames per second can be reproduced without screen reduction or screen division multiplexing.

Moreover, in a recording and reproduction apparatus that does not support high-speed imaging but supports the still picture moving picture linkage function, the still picture moving picture linkage function can be achieved with only the moving picture data.

The recording and reproduction apparatus according to the present invention may be provided with a CPU (Central Processing Unit), a system LSI (Large Scale Integration), a RAM (Random Access Memory), a ROM (Read Only Memory), a HDD (Hard Disk Drive), a network interface, and so on. The recording and reproduction apparatus may also be provided with a drive device capable of reading and writing a portable recording medium such as a DVD-RAM, a Blue-ray disc, and a SD (Secure Digital) memory card.

Moreover, the recording and reproduction apparatus may be an embedded system such as a digital video camera, a digital recorder, a digital television, a game machine, an IP phone, or a mobile phone.

Furthermore, each function of the recording and reproduction apparatus may be realized by installing a program for controlling the recording and reproduction apparatus (hereafter referred to as a recording and reproduction program) in the HDD, the ROM, or the like and executing the recording and reproduction program.

The recording and reproduction program may be recorded on a recording medium readable by a hardware system such as a computer system or an embedded system. The recording and reproduction program may also be read and executed by another hardware system via the recording medium. This enables each function of the recording and reproduction apparatus to be realized on another hardware system. Examples of the recording medium readable by a computer system include an optical recording medium (for example, a CD-ROM), a magnetic recording medium (for example, a hard disk), a magneto-optical recording medium (for example, a MO), and a semiconductor memory (for example, a memory card).

The recording and reproduction program may be held in a hardware system connected to a network such as the Internet or a local area network. Moreover, the recording and reproduction program may be downloaded to and executed by another hardware system via the network. This enables each function of the recording and reproduction apparatus to be realized on another hardware system. Examples of the network include a terrestrial broadcast network, a satellite broadcast network, PLC (Power Line Communication), a mobile phone network, a wired communication network (for example, IEEE 802.3), and a wireless communication network (for example, IEEE 802.11).

As an alternative, each function of the recording and reproduction apparatus may be realized by a recording and reproduction circuit implemented in the recording and reproduction apparatus.

Note that the recording and reproduction circuit may be formed by a full-custom LSI (Large Scale Integration), a semicustom LSI such as an ASIC (Application Specific Integrated Circuit), a programmable logic device such as a FPGA (Field Programmable Gate Array) or a CPLD (Complex Programmable Logic Device), or a dynamic reconfigurable device having a dynamically rewritable circuit structure.

Design data for forming each function of the recording and reproduction apparatus in the recording and reproduction circuit may be a program written in a hardware description language (hereafter referred to as a HDL program). The design data may also be a gate-level netlist obtained by logical synthesis of the HDL program. The design data may also be macro cell information obtained by adding configuration information, process conditions, and the like to the gate-level netlist. The design data may also be mask data with specified dimensions, timings, and the like. Examples of the hardware description language include VHDL (Very high speed integrated circuit Hardware Description Language), Verilog-HDL, and SystemC.

Moreover, the design data may be recorded on a recording medium readable by a hardware system such as a computer system or an embedded system. The design data may also be read and executed by another hardware system via the recording medium. The design data read by another hardware system via the recording medium may be downloaded to a programmable logic device via a download cable.

Alternatively, the design data may be held in a hardware system connected to a network such as the Internet or a local area network. The design data may also be downloaded to and executed by another hardware system via the network. The design data obtained by another hardware system via the network may be downloaded to a programmable logic device via a download cable.

Alternatively, the design data may be recorded in a serial ROM so as to be transferable to a FPGA during power on. The design data recorded in the serial ROM may be directly downloaded to the FPGA during power on.

Alternatively, the design data may be generated by a microprocessor and downloaded to the FPGA during power on.

Though the embodiments of the present invention have been described with reference to the drawings, the present invention is not limited to the illustrated embodiments. Various modifications and changes can be made to the illustrated embodiments within the same or equivalent scope of the present invention.

INDUSTRIAL APPLICABILITY

The present invention is applicable as a recording and reproduction apparatus or the like that records a still picture and a moving picture with audio on a portable recording medium and reproduces the recorded still picture and moving picture with audio. In particular, the present invention is applicable as a video camera or the like that records a still picture and AV data on a recording medium such as a semiconductor memory or an optical disc, records a high-speed imaging picture according to need and, when a still picture being reproduced is designated, reproduces AV data imaged during a time period around an imaging time of the still picture data, or displays a smooth slow reproduction picture.

| [Reference Signs List] | |
|---|---|
| 10 | Recording medium |
| 11 | Information file |
| 12 | Menu file |
| 13, 16 | Playlist file |
| 14, 17 | Clip information file |
| 15, 18 | Stream file |
| 19, 20, 501 | Link information file |
| 21, 22, 23, 70, 500 | Still picture file |
| 30, 502 | Moving picture file |
| 31, 32, 33 | Still picture display screen |
| 41, 42 | Icon |
| 50, 51, 52, 53, 54, 55, 56, 57, 58, 59 | Frame |
| 61, 93 | Still-picture-corresponding PTS |
| 62 | First section |
| 63 | Second section |
| 80 | Start frame |
| 81 | End frame |
| 91 | Still picture file name |
| 92 | Moving picture clip information file name |
| 94 | Reproduction flag information |
| 95 | Digest reproduction flag |
| 96 | High-speed imaging auxiliary file name |
| 100 | Recording and reproduction apparatus |
| 101 | Lens group |
| 102 | Imaging unit |
| 103 | A/D conversion unit |
| 104 | Picture signal processing unit |
| 105 | Moving picture compressing-multiplexing unit |
| 106 | Recording processing unit |
| 108 | Recording control unit |
| 109 | Input unit |
| 110 | Control unit |
| 111 | Picture generation unit |

| -continued | |
|---|---|
| [Reference Signs List] | |
| 112 | Display unit |
| 113 | Picture signal processing unit |
| 114 | Moving picture demultiplexing-decompressing unit |
| 115 | Reproduction processing unit |
| 130 | Still picture compressing-multiplexing unit |
| 131 | Still picture demultiplexing-decompressing unit |
| 200 | Link information generation apparatus |
| 201 | Picture generation and display unit |
| 202 | Input processing unit |
| 203 | Control unit |
| 204 | Recording and reproduction processing unit |
| 205 | Recording control unit |
| 206 | Still picture demultiplexing-decompressing unit |
| 207 | Moving picture demultiplexing-decompressing unit |
| 210 | Display device |
| 211 | Input device |
| 300 | Recording and reproduction apparatus |
| 301 | Picture signal processing unit |
| 302 | Recording processing unit |
| 303 | Second moving picture compressing-multiplexing unit |
| 304 | Control unit |
| 305 | Picture signal processing unit |
| 306 | Reproduction processing unit |
| 307 | Second moving picture demultiplexing-decompressing unit |
| 1110 | Recording control unit |
| 1111 | Moving picture recording unit |
| 1112 | Still picture recording unit |
| 1113 | Link information writing unit |
| 1120 | Reproduction control unit |
| 1121 | Moving picture reproduction unit |
| 1122 | Still picture reproduction unit |
| 1123 | Link information reading unit |
| 1130 | Link information control unit |
| 1131 | Moving picture specification unit |
| 1132 | Position information obtainment unit |
| 1133 | Link information generation unit |
| 1134 | Link information update control unit |
| 1135 | Link information deletion unit |
| 1140 | File monitoring unit |
| 1141 | Moving picture file monitoring unit |
| 1142 | Still picture file monitoring unit |

The invention claimed is:

1. A link information generation apparatus that records a link information file on a recording medium on which a first folder and a second folder are recorded at positions that are not in a containment relationship with each other, the first folder holding a still picture file that includes still picture data and still picture imaging time information showing an imaging time of the still picture data, the second folder holding one or more moving picture files each of which includes moving picture data, and the link information file including link information for associating the still picture data with the moving picture data, said link information generation apparatus comprising:

a moving picture specification unit configured to specify, from among the moving picture data included in each of the one or more moving picture files, a still-picture-linked moving picture imaged during a time period that includes the time shown by the still picture imaging time information of the still picture data;

a position information obtainment unit configured to obtain still-picture-corresponding position information that shows a temporal position in the still-picture-linked moving picture corresponding to the still picture imaging time information; and a link information generation unit configured to generate the link information that includes still picture identification information for identifying the still picture data, moving picture identification information for identifying the still-picture-linked moving picture, and the still-picture-corresponding position information, and record the link information file including the link information on the recording medium at a position not contained in any of the first folder and the second folder, wherein the moving picture data is composed of a plurality of frames imaged at predetermined time intervals, a third folder is further recorded on the recording medium at a position that is not in a containment relationship with any of the first folder and the second folder, the third folder holding a high-speed imaging auxiliary file that corresponds to a different one of the one or more moving picture files and includes an auxiliary frame imaged during a time period between adjacent frames of the plurality of frames, said moving picture specification unit is configured to further specify the high-speed imaging auxiliary file corresponding to the moving picture file that includes the still-picture-linked moving picture, and said link information generation unit is configured to generate the link information that further includes high-speed moving picture identification information for identifying the high-speed imaging auxiliary file specified by said moving picture specification unit.

2. A picture reproduction apparatus that reproduces still picture data and moving picture data recorded on a recording medium on which a first folder and a second folder are recorded at positions that are not in a containment relationship with each other, the first folder holding a still picture file that includes the still picture data and still picture imaging time information showing an imaging time of the still picture data, and the second folder holding one or more moving picture files each of which includes the moving picture data, and the recording medium having recorded thereon a link information file including link information for associating the still picture data with the moving picture data, said picture reproduction apparatus comprising:

a still picture reproduction unit configured to reproduce the still picture data included in the still picture file read from the recording medium;

a link information reading unit configured to, according to a still-picture-linked moving picture reproduction request from a user, read the link information that includes still picture identification information of the still picture data, from the link information file; and a moving picture reproduction unit configured to reproduce only a linked reproduction section in a still-picture-linked moving picture identified by moving picture identification information that is included in the link information read by said link information reading unit, the linked reproduction section including a position shown by still-picture-corresponding position information, wherein the moving picture data is composed of a plurality of frames that include I frames coded by intra-picture prediction coding and P frames coded by inter-picture prediction coding, the linked reproduction section is a section from a reproduction start frame to a reproduction end frame, the reproduction start frame being an I frame closest to a position going backward from the position shown by the still-picture-corresponding position information in the still-picture-linked moving picture by a first section, and the reproduction end frame being a frame at a position going forward from the I frame in the still-picture-linked moving picture by a second section larger than the first section, a third folder is further recorded on the recording medium at a position that is not in a containment relationship with any of the first folder and the second folder, the third folder holding a high-speed imaging auxiliary file that corresponds to a different one of the one or more moving picture files and includes an auxiliary frame imaged during a time period between adjacent frames of the plurality of frames, and said moving picture reproduction unit is configured to read frames included in the linked reproduction section from the moving picture file, read auxiliary frames imaged during a time period between the reproduction start frame and the reproduction end frame from the high-speed imaging auxiliary file, rearrange the read frames and auxiliary frames in chronological order, and reproduce the rearranged frames and auxiliary frames.

3. A link information generation method for recording a link information file on a recording medium on which a first folder and a second folder are recorded at positions that are not in a containment relationship with each other, the first folder holding a still picture file that includes still picture data and still picture imaging time information showing an imaging time of the still picture data, the second folder holding one or more moving picture files each of which includes moving picture data, and the link information file including link information for associating the still picture data with the moving picture data, said link information generation method comprising:

specifying, from among the moving picture data included in each of the one or more moving picture files, a still-picture-linked moving picture imaged during a time period that includes the time shown by the still picture imaging time information of the still picture data;

obtaining still-picture-corresponding position information that shows a temporal position in the still-picture-linked moving picture corresponding to the still picture imaging time information; and generating the link information that includes still picture identification information for identifying the still picture data, moving picture identification information for identifying the still-picture-linked moving picture, and the still-picture-corresponding position information, and recording the link information file including the link information on the recording medium at a position not contained in any of the first folder and the second folder, wherein the moving picture data is composed of a plurality of frames imaged at predetermined time intervals, a third folder is further recorded on the recording medium at a position that is not in a containment relationship with any of the first folder and the second folder, the third folder holding a high-speed imaging auxiliary file that corresponds to a different one of the one or more moving picture files and includes an auxiliary frame imaged during a time period between adjacent frames of the plurality of frames, said specifying further comprises specifying the high-speed imaging auxiliary file corresponding to the moving picture file that includes the still-picture-linked moving picture, and said generating comprises generating the link information that further includes high-speed moving picture identification information for identifying the high-speed imaging auxiliary file specified in said specifying.

4. A picture reproduction method for reproducing still picture data and moving picture data recorded on a recording medium on which a first folder and a second folder are recorded at positions that are not in a containment relationship with each other, the first folder holding a still picture file that includes the still picture data and still picture imaging time information showing an imaging time of the still picture data, and the second folder holding one or more moving picture files each of which includes the moving picture data, and the recording medium having recorded thereon a link information file including link information for associating the still picture data with the moving picture data, said picture reproduction method comprising:

reproducing the still picture data included in the still picture file read from the recording medium;

reading, according to a still-picture-linked moving picture reproduction request from a user, the link information that includes still picture identification information of the still picture data, from the link information file; and reproducing only a linked reproduction section in a still-picture-linked moving picture identified by moving picture identification information that is included in the link information read in said reading, the linked reproduction section including a position shown by still-picture-corresponding position information, wherein the moving picture data is composed of a plurality of frames that include I frames coded by intra-picture prediction coding and P frames coded by inter-picture prediction coding, the linked reproduction section is a section from a reproduction start frame to a reproduction end frame, the reproduction start frame being an I frame closest to a position going backward from the position shown by the still-picture-corresponding position information in the still-picture-linked moving picture by a first section, and the reproduction end frame being a frame at a position going forward from the I frame in the still-picture-linked moving picture by a second section larger than the first section, a third folder is further recorded on the recording medium at a position that is not in a containment relationship with any of the first folder and the second folder, the third folder holding a high-speed imaging auxiliary file that corresponds to a different one of the one or more moving picture files and includes an auxiliary frame imaged during a time period between adjacent frames of the plurality of frames, and said reproducing only the linked reproduction section comprises reading frames included in the linked reproduction section from the moving picture file, reading auxiliary frames imaged during a time period between the reproduction start frame and the reproduction end frame from the high-speed imaging auxiliary file, rearranging the read frames and auxiliary frames in chronological order, and reproducing the rearranged frames and auxiliary frames.

\* \* \* \* \*